United States Patent [19]
Togino et al.

[11] Patent Number: 6,128,136
[45] Date of Patent: Oct. 3, 2000

[54] OPTICAL SYSTEM AND IMAGE DISPLAY APPARATUS

[75] Inventors: Takayoshi Togino, Koganei; Masaya Nakaoka, Hachioji, both of Japan

[73] Assignee: Olympus Optical Co., Ltd., Tokyo, Japan

[21] Appl. No.: 09/035,206

[22] Filed: Mar. 5, 1998

Related U.S. Application Data

[62] Division of application No. 08/697,068, Aug. 20, 1996, Pat. No. 5,768,025.

[30] Foreign Application Priority Data

Aug. 21, 1995 [JP] Japan ................................. 7-211907
Aug. 21, 1995 [JP] Japan ................................. 7-211908
Mar. 25, 1996 [JP] Japan ................................. 8-068191

[51] Int. Cl.[7] ................................................ G02B 27/14
[52] U.S. Cl. ........................................................ 359/630
[58] Field of Search ................................. 359/630, 631, 359/633, 637, 640; 345/7, 8

[56] References Cited

U.S. PATENT DOCUMENTS

| | | | |
|---|---|---|---|
| 4,026,641 | 5/1977 | Bosserman et al. | 359/869 |
| 4,322,135 | 3/1982 | Freeman | 359/643 |
| 4,447,128 | 5/1984 | Ferrer | 349/11 |
| 4,859,030 | 8/1989 | Rotier | 359/631 |
| 5,035,474 | 7/1991 | Moss et al. | 359/13 |
| 5,050,962 | 9/1991 | Monnier et al. | 359/13 |
| 5,459,612 | 10/1995 | Ingleton | 359/630 |
| 5,619,377 | 4/1997 | Rallison | 359/631 |
| 5,774,268 | 6/1998 | Takahashi | 359/630 |

FOREIGN PATENT DOCUMENTS 0 583 116  7/1993  European Pat. Off. .
6-308424  11/1994  Japan .

*Primary Examiner*—Ricky Mack
*Attorney, Agent, or Firm*—Pillsbury Madison & Sutro LLP

[57] ABSTRACT

An optical system which is compact, lightweight and satisfactorily corrected for aberrations and may be suitably used as an imaging optical system or an ocular optical system for a head- or face-mounted image display apparatus which forms no intermediate image. The optical system includes an optical member (7) and a diffraction optical element (8), which are decentered with respect to each other. The optical member (7) has at least three adjacent optical surfaces, at least one of which is a curved surface. At least two reflections take place between the optical surfaces. The space between the optical surfaces is filled with a medium having a refractive index larger than 1. Light rays emitted from an image display device (6) enter the optical member (7) through a first transmitting surface (5) disposed to face the image display device (6) and are reflected by a first reflecting surface (3). The reflected light rays are reflected by a second reflecting surface (4) and led to an observer's eyeball through a second transmitting surface (3).

16 Claims, 27 Drawing Sheets

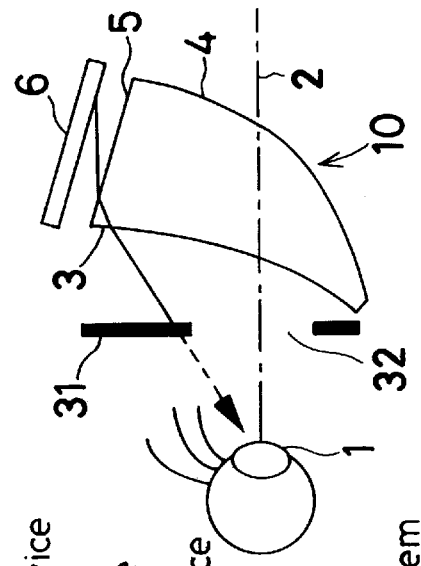
FIG. 24(a)
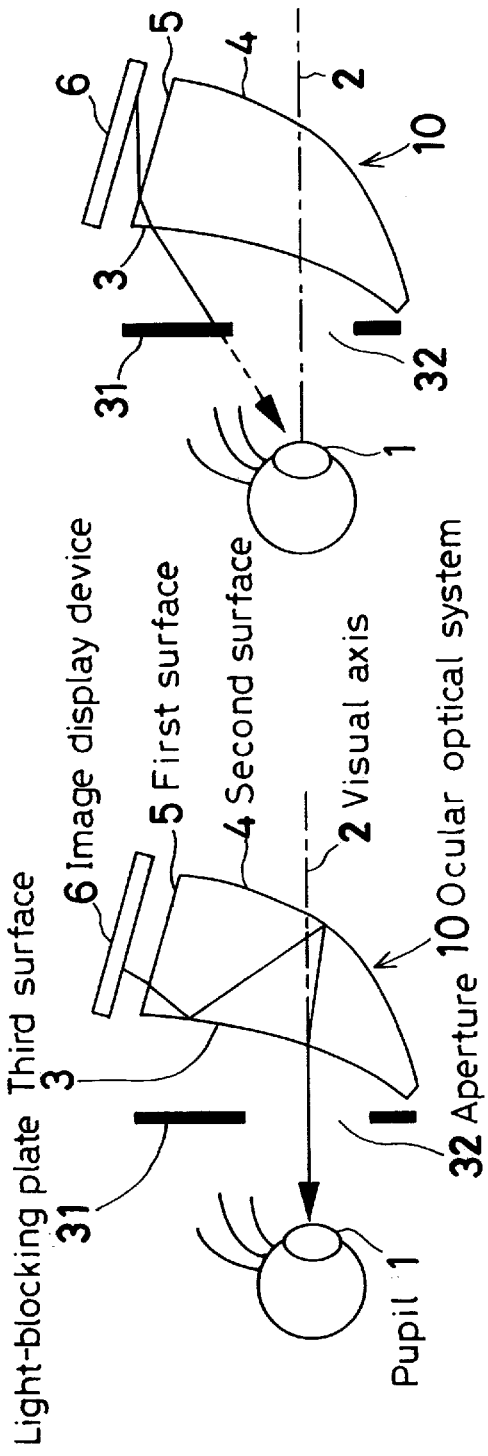
FIG. 24(b)
FIG. 24(c)
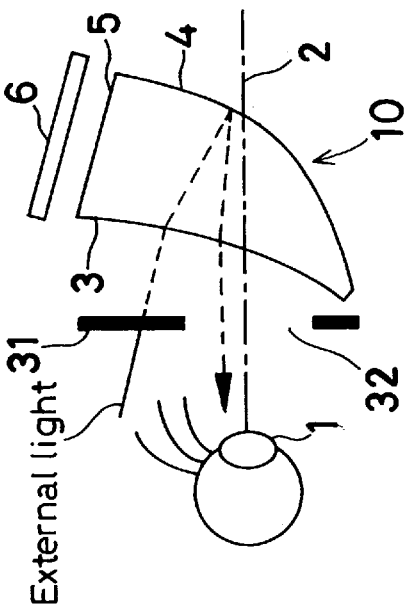
FIG. 24(d)

6 Image display device
5 First surface
4 Second surface
2 Visual axis
10 Ocular optical system
3 Third surface
1 Pupil External light

OPTICAL SYSTEM AND IMAGE DISPLAY APPARATUS

This is a division of application Ser. No. 08/697,068, filed Aug. 20, 1996 now U.S. Pat. No. 5,768,025

BACKGROUND OF THE INVENTION

The present invention relates to a compact imaging optical system and ocular optical system which have favorable aberration correction performance, a wide field angle and high resolution. The present invention also relates to an image display apparatus which uses the ocular optical system.

In recent years, helmet- and goggle-type head- or face-mounted image display apparatuses have been developed for virtual reality or for the purpose of enabling the user to enjoy a wide-screen image personally.

For example, Japanese Patent Application Laid-Open (KOKAI) No. 2-297516 discloses an image display apparatus including, as shown in FIG. 48, a two-dimensional display device 21 for displaying an image, an objective collimator lens 22, and a parallel transparent plate 23 having off-axis parabolic mirrors at both ends thereof. Display light emanating from the two-dimensional display device 21 is formed into parallel rays through the objective collimator lens 22. Thereafter, the light rays are successively subjected to first transmission by one of the parallel surfaces of the parallel transparent plate 23, reflection by the first parabolic mirror, some total reflections in the parallel transparent plate 23, reflection by the second parabolic mirror and second transmission by the other of the parallel surfaces (a total of 8 reflections and a total of 2 transmissions), thereby forming an intermediate image at the point F and projecting the intermediate image into an observer's eyeball 24.

U.S. Pat. No. 4,026,641 discloses an image display apparatus in which, as shown in FIG. 49, an object image displayed by an image display device 25 is converted into a curved object image by a transfer optical element 26, and the object image is projected into an observer's eyeball by a toric reflecting surface 27.

In head-mounted image display apparatuses, it is important to lead an image of an image display device to an observer's eyeball without using a relay optical system and without forming an intermediate image in the optical path, as shown for example in Japanese Patent Application Laid-Open (KOKAI) No. 6-308424.

However, in Japanese Patent Application Laid-Open (KOKAI) No. 6-308424, the optical path is formed with a half-mirror interposed therein. Therefore, there is a loss of light quantity, and it is not easy to perform bright display.

European Patent No. 0,583,116A2 discloses a head-mounted image display apparatus which is capable of displaying a bright image without using a half-mirror. In this case, however, a relay optical system is used, which causes the size of the apparatus to increase unfavorably.

In an image display apparatus of the type in which an image of an image display device is relayed, as shown in FIG. 48, a relay optical system is needed in addition to an ocular optical system. Consequently, the entire optical system increases in both size and weight, and an amount by which the optical system projects from the observer's face or head also increases. Therefore, this type of image display apparatus is not suitable for use as a head- or face-mounted image display apparatus.

In the optical system that focuses parallel rays to form an intermediate image, and also in the optical system that projects an intermediate image into an observer's eyeball, only the parabolic mirror has power. Therefore, exceedingly large aberrations are produced in these optical systems.

When a concave mirror alone is used as an ocular optical system as shown in FIG. 49, even if the concave mirror is a toric surface as in the case of FIG. 49, the ocular optical system produces exceedingly large aberrations, causing the image quality to be degraded. Accordingly, it is necessary to use a transfer optical element 26 such as a fiber plate for correcting field curvature produced by the ocular optical system. However, comatic and other aberrations cannot satisfactorily be corrected even if the transfer optical element 26 and the toric reflecting surface 27 are used.

SUMMARY OF THE INVENTION

In view of the above-described problems of the conventional techniques, an object of the present invention is to provide an optical system of the type having at least three surfaces and in which a space formed by the at least three surfaces is filled with a medium having a refractive index larger than 1. The optical system according to the present invention is compact, lightweight and satisfactorily corrected for aberrations and may be suitably used as an imaging optical system or an ocular optical system and also for an image display apparatus which uses the ocular optical system.

To attain the above-described object, the present invention provides an optical system having an optical member and a diffraction optical element which is adjacent to the optical member. The optical member has at least three adjacent optical surfaces which are decentered with respect to each other. At least one of the three optical surfaces is a curved surface, and-the three optical surfaces are arranged such that at least two reflections take place between them.

In addition, the present invention provides an image display apparatus having an image display device for displaying an image, an ocular optical system for leading the image displayed by the image display device to an observer's eyeball without forming an intermediate real image, and a device for retaining both the image display device and the ocular optical system on an observer's head or face. The ocular optical system includes an optical member having a first surface disposed to face the image display device, a second surface disposed on an observer's visual axis to face an observer's pupil at a tilt to the observer's visual axis, and a third surface disposed on the observer's visual axis between the second surface and the observer's pupil. The second surface is a reflecting surface. Light rays emitted from the image display device enter the optical member through the first surface, and the light rays are reflected by the second surface and led to the observer's eyeball through the third surface. In addition, a correction optical element is disposed at a position between the image display device and the observer's pupil. The correction optical element produces aberrations which are opposite in sign to aberrations produced by the transmitting surfaces of the optical member.

In addition, the present invention provides an image display apparatus having an image display device for displaying an image, an ocular optical system for leading the image displayed by the image display device to an observer's eyeball without forming an intermediate real image, and a device for retaining both the image display device and the ocular optical system on an observer's head or face. A light-blocking member is provided between the ocular optical system and the observer's eyeball.

In addition, the present invention provides an image display apparatus having an image display device for displaying an image, an ocular optical system for leading the image displayed by the image display device to an observer's eyeball without forming an intermediate real image, and a device for retaining both the image display device and the ocular optical system on an observer's head or face. A numerical aperture limiting member is disposed between the image display device and the ocular optical system to limit the numerical aperture of a bundle of light rays emitted from the image display device.

In addition, the present invention provides an image display apparatus having an image display device for displaying an image, an ocular optical system for leading the image displayed by the image display device to an observer's eyeball without forming an intermediate real image, and a device for retaining both the image display device and the ocular optical system on an observer's head or face. The image display device is a transmission type liquid crystal display device. The transmission type liquid crystal display device uses light limited in the numerical aperture as illuminating light therefor.

In addition, the present invention provides an image display apparatus having an image display device for displaying an image, an ocular optical system for leading the image displayed by the image display device to an observer's eyeball without forming an intermediate real image, and a device for retaining both the image display device and the ocular optical system on an observer's head or face. The image display device is a transmission type liquid crystal display device having an illuminating device at the back of it. Assuming that the size of the illuminating device is Sb, the distance d between the illuminating device and the image display device satisfies the following condition:

$$Sb > d > 1 \text{ mm} \tag{24}$$

In addition, the present invention provides an image display apparatus having an image display device for displaying an image, an ocular optical system for leading the image displayed by the image display device to an observer's eyeball without forming an intermediate real image, and a device for retaining both the image display device and the ocular optical system on an observer's head or face. The image display device is a transmission type liquid crystal display device having an illuminating device at the back of it. The illuminating device and the image display device are tilted relative to each other such that the illuminating device and the image display device diverge from each other at ends thereof which are remote from the observer's eyeball.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 24(a), 24(b), 24(c) and 24(d) are views for explanation of optical paths in an image display apparatus according to Example 14 of the present invention.

DESCRIPTION OF THE PREFERRED EMBODIMENTS

Figure 1:
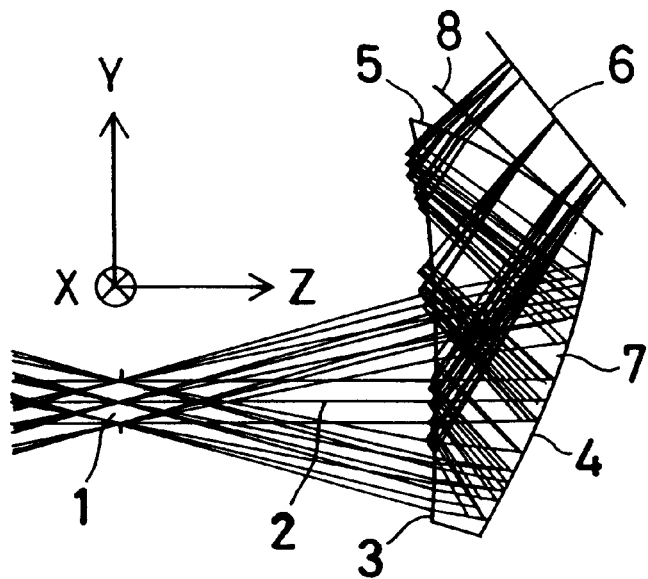
FIG. 1 is a sectional view of an image display apparatus for a single eye which uses an optical system according to Example 1 of the present invention.
Figure 2:
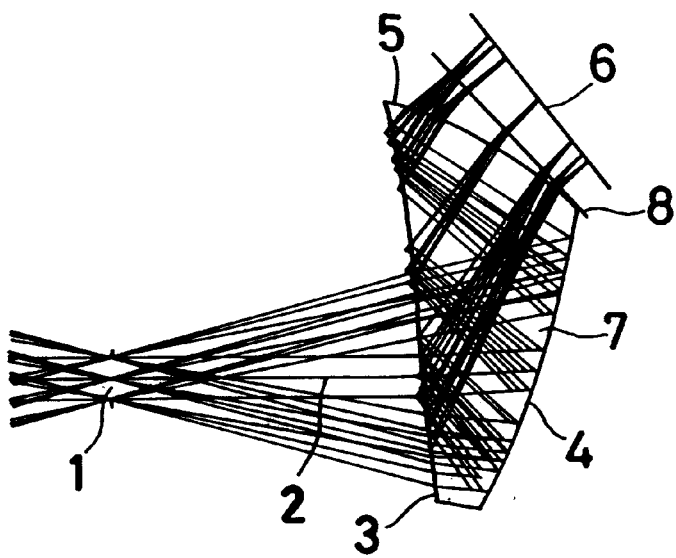
FIG. 2 is a sectional view of an image display apparatus for a single eye which uses an optical system according to Example 2 of the present invention.
Figure 3:
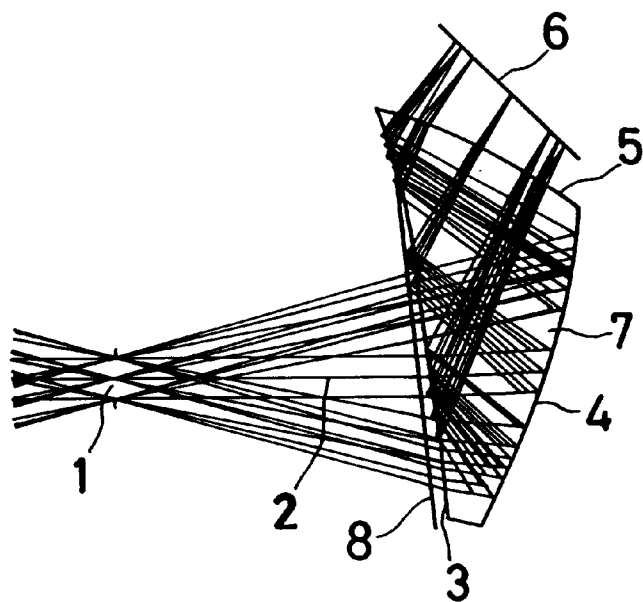
FIG. 3 is a sectional view of an image display apparatus for a single eye which uses an optical system according to Example 3 of the present invention.
Figure 4:
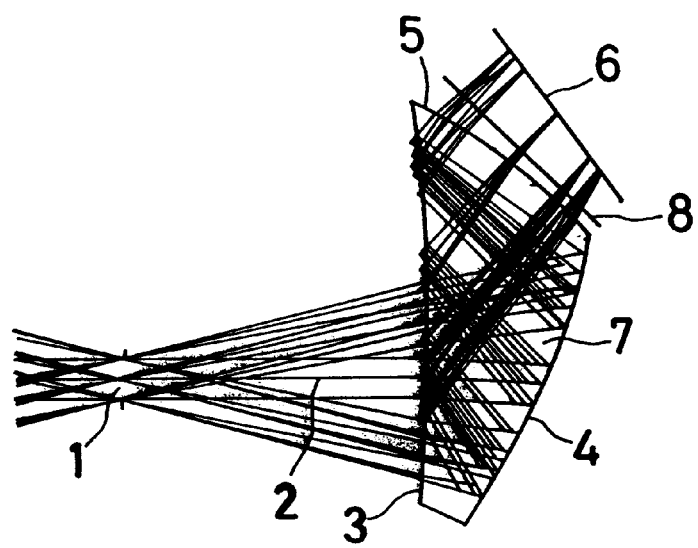
FIG. 4 is a sectional view of an image display apparatus for a single eye which uses an optical system according to Example 4 of the present invention.
Figure 5:
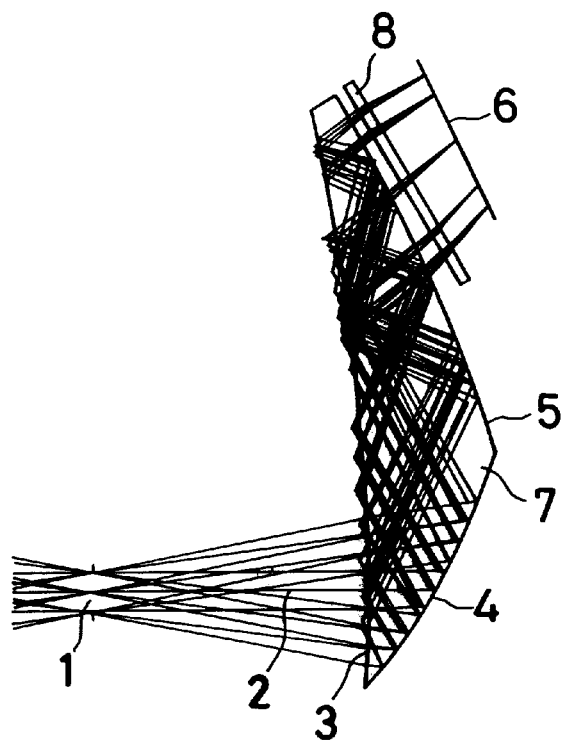
FIG. 5 is a sectional view of an image display apparatus for a single eye which uses an optical system according to Example 5 of the present invention.
Figure 6:
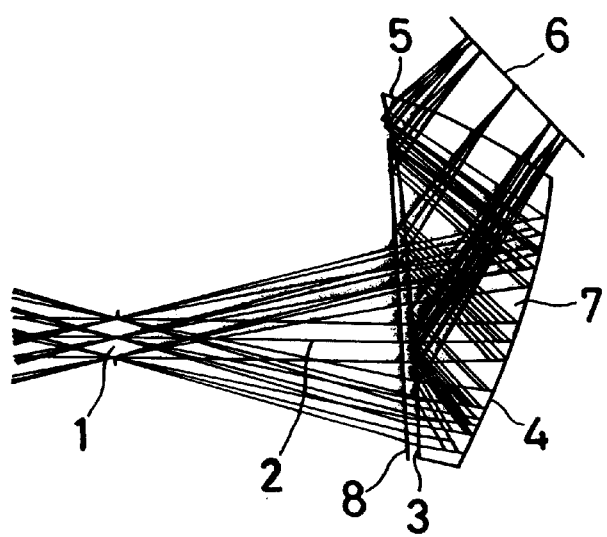
FIG. 6 is a sectional view of an image display apparatus for a single eye which uses an optical system according to Example 6 of the present invention.
Figure 7:
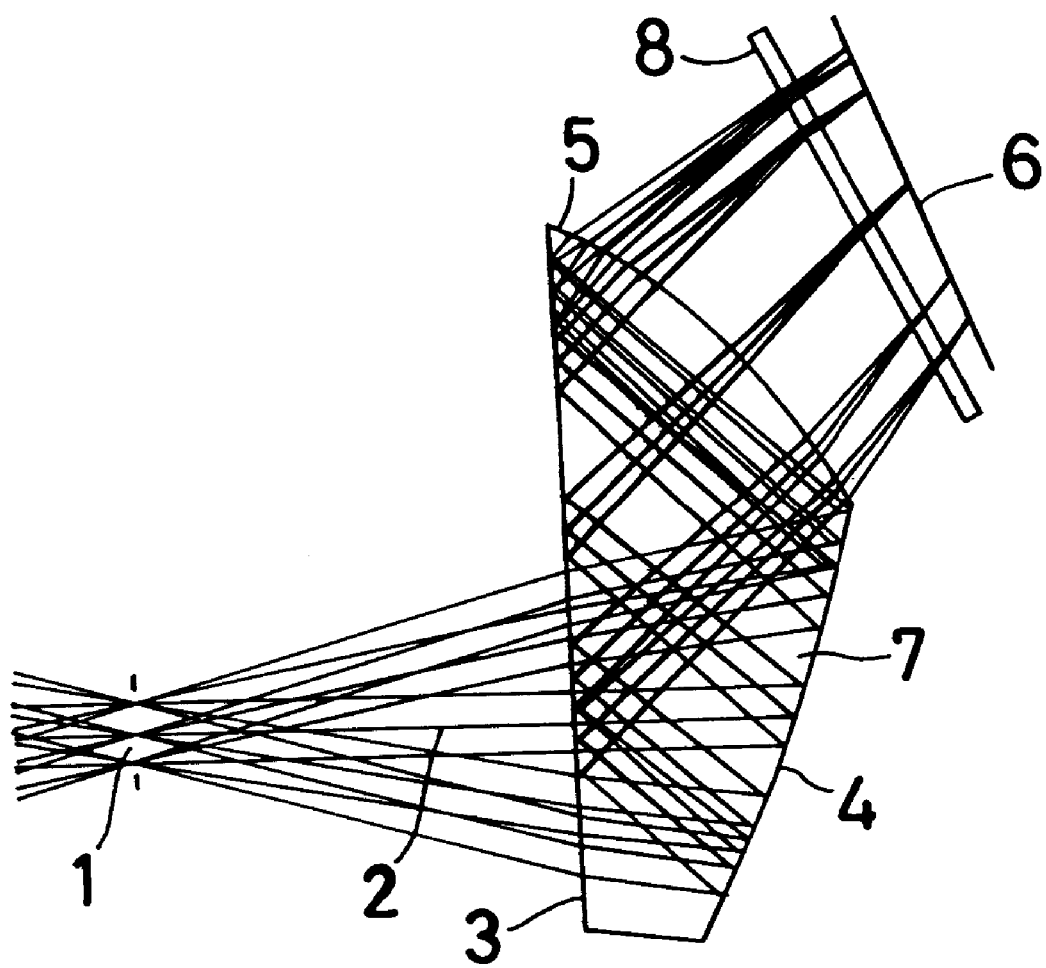
FIG. 7 is a sectional view of an image display apparatus for a single eye which uses an optical system according to Example 7 of the present invention.

First, the reason for adopting the above-described arrangements, together with the operations thereof, will be explained, and then, examples of the present invention will be described.

First, the operation of an optical system according to the present invention as it is used as an image display apparatus will be explained. The operation of the optical system as it is used as an imaging optical system is the same as that in the case of the image display apparatus.

The present invention relates to an layout of an optical system which is needed in order to arrange the optical system in a compact form.

It is important to arrange the optical system in a thin form in order to reduce the overall thickness of the image display apparatus. As the image display apparatus is reduced in thickness, the center of gravity comes close to the center of the observer's head. Therefore, the moment of inertia can be reduced even if the weight is the same. In other words, the capability of the apparatus to follow up the movement of the observer's head is markedly improved.

Accordingly, the present invention adopts an arrangement in which an image of an image display device is projected directly into an observer's eyeball without using a relay optical system.

To form a thin optical system, the system is arrangement such that light rays reciprocate in the optical system, and thus the optical path is folded, thereby succeeding in reducing the thickness of the optical system.

A wide observation field angle cannot be ensured simply by folding the optical path of the optical system. Therefore, it is important to form at least one reflecting surface by a curved surface having a concave surface directed toward the pupil position of the optical system so that light rays are reflected and converged by the curved surface, and it is also important to arrange the optical system such that light rays are repeatedly reflected in the optical system.

The gist of the present invention resides in that a diffraction optical element (DOE) is used to correct even more satisfactorily aberrations remaining in the optical system arranged as described above. A diffraction optical element can refract light rays by diffraction action of a diffraction surface formed on a thin substrate. This is very important in producing a compact and lightweight optical system. That is, a diffraction optical element can be formed on a thin and lightweight substrate, whereas a refracting optical element of glass, i.e. an ordinary glass lens, is exceedingly heavy. Further, an aspherical surface action can also readily be imparted to a diffraction optical element by varying the diffraction grating pitch on the diffraction surface in the radial direction, although a high level of manufacturing technique is usually required to realize an aspherical surface action.

Further, it is important in order to correct coma and astigmatism produced by a decentered optical member that the diffraction optical element should also be decentered in the same plane as the decentration plane in which the optical member is decentered. The decentration of the diffraction optical element enables the coma and astigmatism to be corrected even more satisfactorily.

It is preferable that at least two of the at least three optical surfaces should be disposed with their concave surfaces directed toward a stop (eyeball). The reason for this is that field curvature produced by a concave mirror can be corrected by forming an optical system from two reflecting surfaces, that is, one concave mirror having a concave surface directed toward the stop and one convex mirror having a concave surface directed toward the stop, with respect to light rays entering the optical system through the stop (light rays in backward ray tracing when the optical system is used in an image display apparatus). It should be noted that the decentered optical system does not fall under the category of conventional optical systems which are rotationally symmetric with respect to the optical axis; therefore, the above-described arrangement must be considered in terms of two directions that is, the direction of the decentration plane in which the optical system is decentered, and the direction of a plane which perpendicularly intersects both the stop and the decentration plane. It is important to arrange the above-described positive and negative surfaces, i.e. concave and convex surfaces, with respect to either of the two directions in which residual aberrations are greater, or in which greater importance is attached to the aberration correction.

Further, it is preferable that the at least three adjacent optical surfaces should be at least three reflecting surfaces having different powers. By doing so, the power can be effectively distributed, and it becomes possible to project an image with smaller aberrations when the same power is to be obtained. It should be noted that the term "optical surface" as used herein means a surface which intersects an optical axis.

By filling a space formed by the above-described three surfaces with a medium having a refractive index larger than 1, it becomes possible to form reflecting surfaces by using back-coated mirrors, and thus the occurrence of comatic and spherical aberrations can be suppressed. This is because light rays in backward ray tracing from the pupil are convergently refracted after passing through the second transmitting surface, thereby making it possible to suppress divergence of light rays in the optical system more effectively than in the case of an optical system using surface-coated mirrors when the same observation field angle is to be ensured. Thus, it becomes possible to reduce aberrations produced by the reflecting surfaces. At the same time, no vignetting of light rays occurs, and it is possible to reduce the size of the optical system.

Light rays emitted from the image display device pass through the first transmitting surface to enter a transparent medium which has at least three surfaces and whose refractive index is larger than 1. The incident light rays are reflected twice between the first and second reflecting surfaces, whereby the optical path is folded. Then, the light rays pass through the second transmitting surface, which lies between the stop and the second reflecting surface, to exit from the transparent medium, and then pass through the stop. With this arrangement, it is possible to form the first and second reflecting surfaces as back-coated mirrors. Consequently, it becomes possible to dispose concave and convex mirrors at an appropriate interval such that aberrations, i.e. field curvature and spherical aberration, produced by the reflecting surfaces of the concave and convex mirrors cancel each other. Thus, it is possible to maintain favorable aberration conditions.

It is desirable to arrange the optical system such that an image displayed by the image display device is led to the observer's eyeball without forming an intermediate image on its way to the observer's eyeball. It is possible to provide a compact, lightweight and wide-field image display apparatus by placing the image display device at the image plane, disposing the observer's pupil at the stop position, and appropriately selecting various parameters of the optical system.

One of the at least three optical surfaces is formed such that the curvature in the plane of decentration of the three surfaces is different from the curvature in a plane perpendicularly intersecting the decentration plane. By doing so, it becomes possible to correct astigmatism produced by the decentered concave mirror.

When field angles in two directions, i.e. vertical and horizontal directions, are different from each other, aberration correction is different for the direction of narrower field angle than for the direction of wider field angle. Further, there is a difference in the way in which aberrations due to decentration occur between the decentration direction and a direction in which the optical surfaces are not decentered, and the target of aberration correction in the two planes differs according to each particular combination. Therefore, it is important to form an arbitrary optical surface such that the curvatures in the two planes differ from each other. The arbitrary optical surface is determined according to circumstances under which the optical system is used.

Further, by making the curvature in the decentration plane different from the curvature in a plane perpendicularly intersecting the decentration plane, the aberration correcting load on the diffraction optical element is reduced, so that satisfactory aberration correction can be made even if the diffraction optical element is produced as a rotationally symmetric optical element.

If the first reflecting surface and the second transmitting surface are disposed at the same position and with the same configuration, the number of surface configurations necessary to machine in the production of the optical system reduces. Therefore, the production of the optical system is facilitated. Even if the effective area of the first reflecting surface and that of the second transmitting surface overlap each other, light rays can be properly reflected and transmitted, and it becomes possible to ensure a wide field angle.

Assuming that a light ray which emanates from the center of the display surface (display area) of the image display device and passes through the eyeball is defined as a principal ray, it is desirable for the second reflecting surface to be decentered with respect to the principal ray. If the second reflecting surface is tilted with respect to the principal ray, it is possible to dispose the image surface (display surface) at a position sideward of the stop (eyeball pupil position). Accordingly, it becomes possible to reduce the amount by which the optical system projects from the stop in the optical axis direction.

The second reflecting surface is preferably disposed with a concave surface thereof directed toward the stop, and it is even more desirable for the second reflecting surface to be formed by a back-coated mirror. By doing so, the second reflecting surface becomes a reflecting surface having a relatively strong power in the optical system. Further, comatic aberration is minimized, and hence the coma correcting load imposed on another surface is minimized. Thus, favorable results can be obtained.

Incidentally, diffraction optical elements have negative extremely strong dispersion characteristics (Abbe's number: −3.45), as described in Japanese Patent Application Laid-Open (KOKAI) No. 4-214516, filed by the present applicant. Therefore, even a diffraction optical element of weak power can exhibit powerful chromatic aberration correction capability. If a reflecting mirror is used to form a surface having a principal refracting power in the above-described optical system, light rays can be refracted without producing chromatic aberration at all. However, chromatic aberration that is produced when light rays pass through the first and second transmitting surfaces cannot be corrected by the reflecting surface and remains uncorrected. To correct the chromatic aberration, the diffraction optical element is designed to produce chromatic aberration which corrects the chromatic aberration produced by the first and second transmitting surfaces, thereby enabling the optical system to be satisfactorily corrected for chromatic aberration as a whole. Thus, it is possible to obtain a favorable image, which is corrected for chromatic aberration.

In a case where the first reflecting surface and the second transmitting surface, which are disposed at the same position and with the same configuration, are arranged to operate as a reflecting surface, the surface is disposed such that light rays are incident thereon at an angle greater than the critical angle; in a case where the first reflecting surface and the second transmitting surface are arranged to operate as a transmitting surface, the surface is disposed such that light rays are incident thereon at an angle smaller than the critical angle. By doing so, the loss of light quantity can be minimized, and it is possible to obtain an optical system that provides a bright image.

If the diffraction optical element is disposed between the optical system and the stop (observer's eyeball pupil position), it is possible to increase the focal length of the diffraction optical element. Accordingly, it becomes possible to effect aberration correction by a diffraction optical element which has a wide diffraction grating pitch and thus exhibits favorable productivity.

If the diffraction optical element is disposed between the optical system and the image surface (display surface), the effective area of the diffraction optical element can be minimized, and it becomes possible to effect aberration correction by a small-sized diffraction optical element.

It is desirable to satisfy the following condition:

$$-0.1 < 1/f < 0.1 \text{ (mm}^{-1}) \quad (1)$$

where f is the focal length of the diffraction optical element.

The condition (1) specifies the focal length of the diffraction optical element. If 1/f is not larger than the lower limit of the condition (1), i.e. −0.1, aberrations produced by the diffraction optical element become excessively small in comparison to aberrations produced by the rest of the optical system, resulting in under correction. Accordingly, it becomes impossible to effect favorable aberration correction. If 1/f is not smaller than the upper limit, i.e. 0.1, aberrations produced by the diffraction optical element become excessively large, resulting in over correction with respect to aberrations produced by the rest of the optical system.

In a case where the diffraction optical element is disposed between the optical member and the observer's eyeball, it is desirable to satisfy the following condition:

$$-0.1 < 1/f < 0.1 \text{ (mm}^{-1}) \quad (2)$$

The condition (2) applies in a case where the diffraction optical element is disposed between the optical member and the stop. The condition (2) specifies the focal length of the diffraction optical element, as is the case with the condition (1). By satisfying the condition (2), it becomes possible to effect favorable aberration correction because aberrations produced by the diffraction optical element exactly cancel aberrations produced by the rest of the optical system. The meaning of the upper and lower limits of the condition (2) is the same as in the condition (1).

Further, it is preferable from the viewpoint of aberration correction to satisfy the following condition:

$$-0.05 < 1/f < 0.05 \text{ (mm}^{-1}) \quad (2)'$$

In a case where the diffraction optical element is disposed between the optical member and the display surface, it is desirable to satisfy the following condition:

$$-0.05 < 1/f < 0.05 \text{ (mm}^{-1}) \quad (3)$$

The condition (3) applies in a case where the diffraction optical element is disposed between the optical member and the image surface. The condition (3) specifies the focal length of the diffraction optical element, as is the case with the above-described conditions. By satisfying the condition (3), it becomes possible to effect favorable aberration correction because aberrations produced by the diffraction optical element exactly cancel aberrations produced by the rest of the optical system. The meaning of the upper and lower limits of the condition (3) is the same as in the condition (1).

If a positioning device is provided such that the image display device is disposed at the image surface of the optical system and the observer's eyeball is placed at the pupil position, it becomes possible to construct a compact image display apparatus.

If the positioning device is one that enables the optical system to be fitted on the observer's head, it becomes possible for the observer to see the observation image in a desired posture and from a desired direction. That is, the observer can see the observation image in his/her own easy posture. Thus, it is possible to construct a compact head-mounted image display apparatus which enables even a bedridden sick person, for example, to see the observation image in a lying position with the image display apparatus fitted to his/her head.

Figure 46:
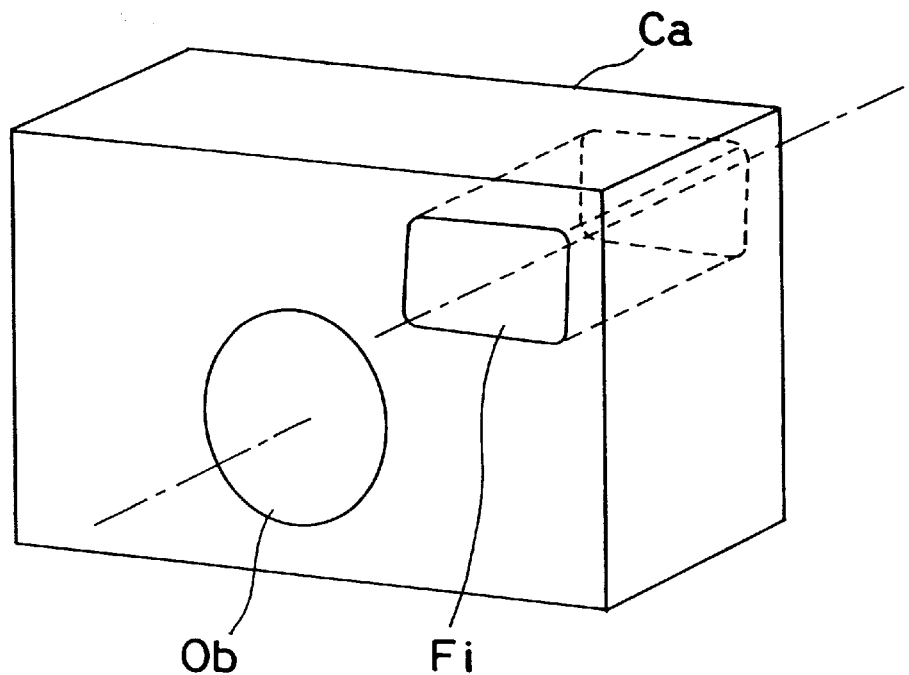
FIG. 46 shows an arrangement in which an optical system according to the present invention is used as an imaging optical system.
Figure 47:
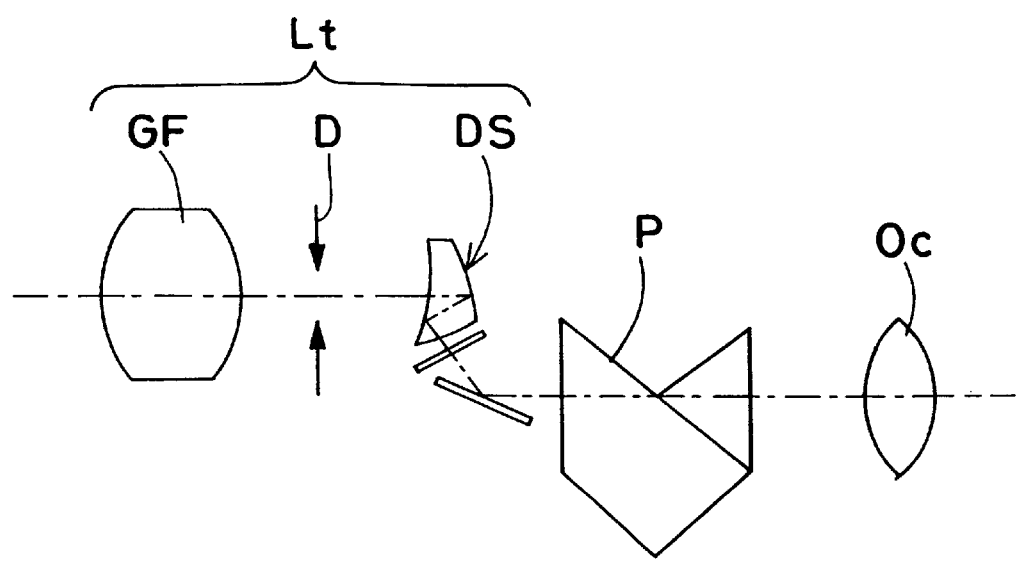
FIG. 47 shows an arrangement of an optical system in which an optical system according to the present invention is used as an imaging optical system.
Figure 48:
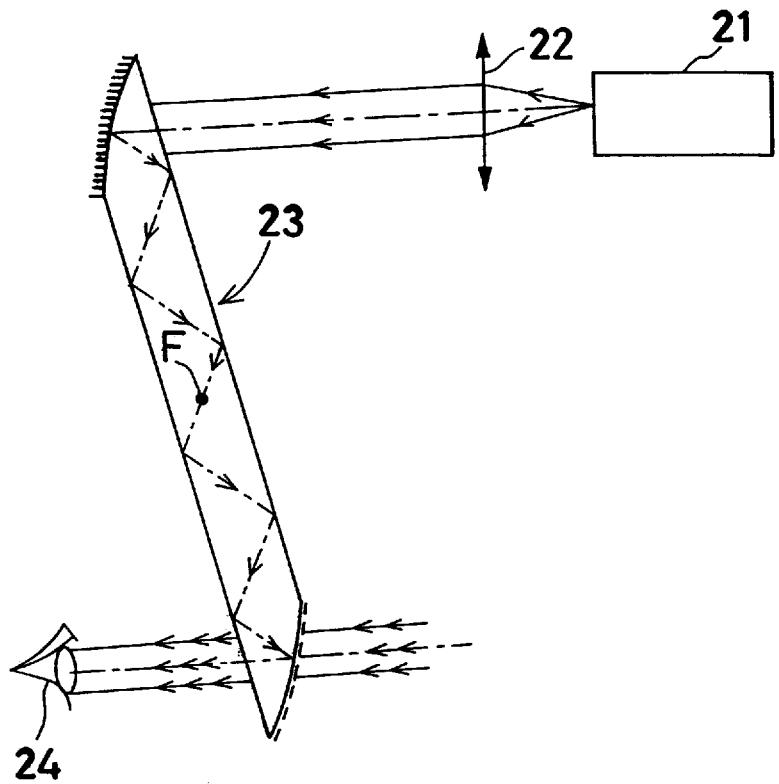
FIG. 48 shows an optical system of a conventional image display apparatus.
Figure 49:
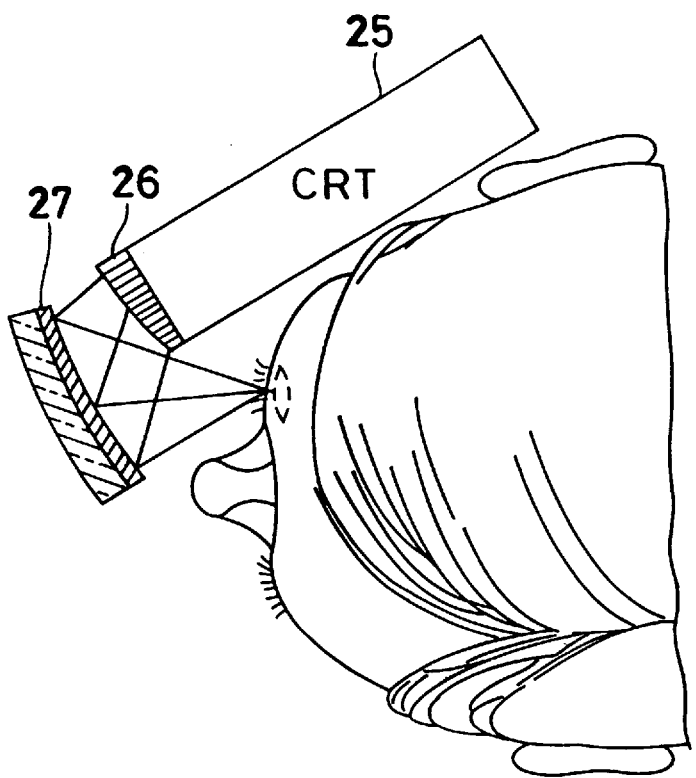
FIG. 49 shows an optical system of another conventional image display apparatus.

If an image recording device is disposed in place of the image display device of the optical system and a stop is provided at the eyeball position in place of the observer's eye, it is possible to provide a compact imaging optical system. If the optical system is arranged to form an image of an object at an infinite distance, the optical system can be used as an imaging optical system, e.g. a camera finder optical system, as shown in FIGS. 46 and 47.

Further, if the first reflecting surface and the second reflecting surface are formed by a convex mirror and a concave mirror, respectively, which have their respective concave surfaces directed toward the pupil, even more favorable results can be obtained in the correction of aberrations such as coma and field curvature.

Further, it is preferable to form the optical system from a single optical member and to combine it with a diffraction optical element. By doing so, it is possible to produce the whole optical system into a simple structure.

Assuming that a light ray which emanates from the center of an object point and reaches the pupil center is defined as a principal ray, it is preferable to satisfy the following condition:

$$70° < \theta_1 < 160° \quad (4)$$

where $\theta_1$ is an angle between the principal ray incident on the first reflecting surface and the principal ray emanating from it.

The condition (4) determines the size of the optical system in the vertical direction. If $\theta_1$ is not larger than the lower limit of the condition (4), i.e. 70°, the first transmitting surface and second reflecting surface of the optical system interfere with each other, making it impossible to obtain a wide observation field angle. If $\theta_1$ is not smaller than the upper limit, i.e. 160°, the optical system lengthens in the vertical direction, making it difficult to achieve a reduction in the size of the optical system.

It is even more desirable to satisfy the following condition:

$$80° < \theta_1 < 140° \quad (4)'$$

Assuming that a light ray which emanates from the center of an object point and reaches the pupil center is defined as a principal ray, it is also preferable to satisfy the following condition:

$$30° < \theta_2 < 120° \tag{5}$$

where $\theta_2$ is an angle between the principal ray incident on the second reflecting surface and the principal ray emanating from it.

The condition (5) determines the size of the optical system in the vertical direction. If $\theta_2$ is not larger than the lower limit of the condition (5), i.e. 30°, the first transmitting surface and second reflecting surface of the optical system interfere with each other, making it impossible to obtain a wide observation field angle. If $\theta_2$ is not smaller than the upper limit, i.e. 120°, the optical system lengthens in the vertical direction, making it difficult to achieve a reduction in the size of the optical system.

It is even more desirable to satisfy the following condition:

$$35° < \theta_2 < 70° \tag{5}'$$

In a case where the diffraction optical element is produced as a rotationally symmetric optical element, it is preferable to decenter the diffraction optical element with respect to the principal ray. Regarding the amount of eccentricity of the diffraction optical element in this case, it is preferable to satisfy the following conditions:

$$-50 < d < 50 \text{ (mm)} \tag{6}$$

$$-50 < \alpha < 50 \text{ (°)} \tag{7}$$

where d is the amount of decentering, and $\alpha$ is the amount of tilt.

If d or $\alpha$ is not within the range defined by the above condition (6) or (7), the amount of eccentricity of the diffraction optical element becomes undesirably large, making it impossible for the diffraction optical element to correct, with good balance, coma and astigmatism produced in the optical system on account of decentration. Accordingly, favorable aberration correction cannot be attained.

It is even more desirable to satisfy the following conditions:

$$-10 < d < 10 \text{ (mm)} \tag{6}'$$

$$-10 < \alpha < 20 \text{ (°)} \tag{7}'$$

By satisfying the above conditions (6)' and (7)', it is possible to effect even more favorable aberration correction.

Let us take notice of a principal ray which passes through the center of the stop and reaches the center of the image surface, and a light ray which passes through the stop at a height h in the vicinity of the principal ray. The focal length of the entire optical system in the vicinity of the principal ray can be obtained by $$f = h/\sin(\tan^{-1} u_1 - \tan^{-1} u_2)$$

where $u_1$ is an angle of intersection of the principal ray and the image surface, and $u_2$ is an angle of intersection of the light ray passing through the stop at the height h in the vicinity of the principal ray and the image surface.

It is preferable to satisfy the following condition:

$$-2 < F < 2 \tag{8}$$

where F is the value of (the focal length f of the entire optical system)/(the focal length f of the diffraction optical element).

The condition (8) also determines a balance between the amount of aberration produced in the entire optical system and the amount of aberration correction made by the diffraction optical element. If F is not larger than the lower limit, i.e. −2, or not smaller than the upper limit, i.e. 2, the amount of aberration correction made by the diffraction optical element becomes undesirably large, making it impossible for the diffraction optical element to correct, with good balance, field curvature and chromatic aberration produced in the optical system. Accordingly, it is impossible to attain favorable aberration correction.

It is even more desirable to satisfy the following condition:

$$-1 < F < 1 \tag{8}'$$

Next, the reason for adopting the above-described arrangements in the image display apparatus according to the present invention, together with the operations thereof, will be explained.

In the optical system of the image display apparatus according to the present invention, a diffraction optical element (hereinafter referred to as "DOE"), represented by a Fresnel zone plate, or a gradient index lens is used to correct chromatic aberration, field curvature and other aberrations remaining uncorrected in a single decentered prism which has three or four optical surfaces and in which a space formed between these optical surfaces is filled with a medium having a refractive index larger than 1. The aberration correction capabilities of DOEs and gradient index lenses will be explained below.

DOEs, represented by zone plates, have high reciprocal dispersion characteristics i.e. Abbe's number $v_d = -3.45$, and exhibit powerful chromatic aberration correction capability. Accordingly, a DOE can effectively correct chromatic aberration remaining in a single decentered prism as a result of the achievement of high-density image display devices, as described above.

Further, because a DOE having aspherical action can be produced by the same method as that for a DOE having spherical action, it is possible to positively give aspherical action to the DOE and hence possible to effectively correct off-axis aberration increased as a result of achievement of a wider field of view. In this case, if the DOE is given such aspherical action (pitch distribution) that the power becomes weaker than the power of a paraxial spherical system as the distance from the optical axis increases, the aberration correction capability increases. Further, with such pitch arrangement, the pitch at the periphery of the clear aperture region of the DOE becomes relatively large, so that the productivity of the DOE also improves. In addition, unlike a refracting lens, a DOE can be produced simply by forming a diffraction surface on the surface of a substrate. Therefore, it is accompanied by practically no increase in volume or weight and hence favorable for use in an optical system of a head-mounted image display apparatus.

Noting that a gradient index lens is capable of correcting Petzval sum and chromatic aberration, the present invention uses a gradient index lens in combination with the above-described single decentered prism to correct chromatic aberration, field curvature and other aberrations remaining in the decentered prism. The Petzval sum and chromatic aberration correcting action of a gradient index lens will be explained below.

A gradient index lens used in the present invention is of the radial type that has a refractive index distribution in a direction perpendicular to the optical axis. The refractive index distribution for the reference wavelength is expressed by $$n(r)=N_0+N_1r^2+N_2r^4+N_3r^6+ \quad (9)$$

where $N_0$ is the refractive index for the reference wavelength of the lens on the optical axis, r is the radial distance from the optical axis, n(r) is the refractive index for the reference wavelength at a position of distance r from the optical axis, and $N_1$, $N_2$, $N_3$, . . . are 2nd-, 4th- and 6th-order coefficients of the reference wavelength, respectively.

First of all, the correction of Petzval sum will be explained. Among quantities that must be particularly noted at the stage of initially designing a lens system is Petzval sum, which is determined by power distribution. The Petzval sum of a homogeneous system may be expressed by $$\phi_s/N_0 \quad (10)$$

where $\phi_s$ is the refracting power of the surface, and $N_0$ is the refractive index of the lens on the optical axis.

The Petzval sum of a single gradient index lens may be expressed by $$\phi_s'/N_0+\phi_M/N_0^2 \quad (11)$$

where $\phi_s'$ is the refracting power of the surface, and $\phi_M$ is the refracting power of the medium.

As will be clear from the expression (11), a gradient index lens can correct Petzval sum because its medium has refracting power.

Next, the correction of chromatic aberration will be explained. In the case of a gradient index lens, a medium thereof also has capability of correcting chromatic aberration. The condition that must be satisfied by a single gradient index lens to correct axial chromatic aberration is as follows:

$$\phi_s'/\nu_{0d}+\phi_M/\nu_{1d}=0 \quad (12)$$

Assuming the refractive indices of the lens on the optical axis for the d-line, F-line and C-line are $N_{0d}$, $N_{0F}$ and $N_{0C}$, respectively, $\nu_{0d}$ is expressed by $$\nu_{0d}=(N_{0d}-1)/(N_{0F}-N_{0C}) \quad (13)$$

From 2nd-order coefficients $N_{1d}$, $N_{1F}$ and $N_{1C}$ in the refractive index distribution expression (9) for the d-line, F-line and C-line, $\nu_{1d}$ is obtained as follows:

$$\nu_{1d}=N_{1d}/(N_{1F}-N_{1C}) \quad (14)$$

In other words, it is possible to correct chromatic aberration by varying the medium distribution configuration of a gradient index lens for each wavelength.

In the present invention, chromatic aberration, field curvature and other aberrations which remain in a decentered prism having three or four optical surfaces, as shown in FIGS. 14 to 20, are corrected by producing aberrations which are opposite in sign to the residual aberrations with a correction optical element comprising the above-described diffraction optical element or gradient index lens. Such a correction optical element may be disposed on either the observer's eyeball side or the image display device side of the decentered prism (optical member).

In a case where a diffraction optical element is used as a correction optical element, it is desirable to satisfy the following condition:

$$-1<1/f<1 \quad (a)$$

where f (mm) is the focal length of the diffraction optical element.

It is more desirable to satisfy the following condition:

$$-0.1<1/f<0.1 \quad (a')$$

It is even more desirable to satisfy the following condition:

$$0<1/f<0.01 \quad (a'')$$

In a case where a gradient index lens is used as a correction optical element, it is desirable to satisfy the following condition:

$$0.5<N0/N1<1.5 \quad (b)$$

where N0 is the refractive index at the center of the gradient index lens, and N1 is the refractive index at the periphery of the gradient index lens.

It is more desirable to satisfy the following condition:

$$0.8<N0/N1<1.2 \quad (b')$$

The conditions (a), (a'), (a''), (b) and (b') are conditions that must be satisfied for the diffraction optical element or gradient index lens to have approximately no power because it is desirable to use an approximately non-power diffraction optical element or gradient index lens in order to effect the desired aberration correction without substantially changing the eye point, focal length, magnification, etc. of the entire ocular optical system.

Next, some numerical examples in a case where the optical system according to the present invention is arranged in the form of an image display apparatus will be explained with reference to the accompanying drawings.

First, a method of designing an optical system including a DOE used in the present invention will be explained.

The principle of a DOE, which is an optical element based on a diffractive phenomenon, is detailed, for example, in Chapters VI and VII of "Small-Sized Optical Elements for Optical Designers" (Optronics). Let us explain it briefly.

Figure 21:
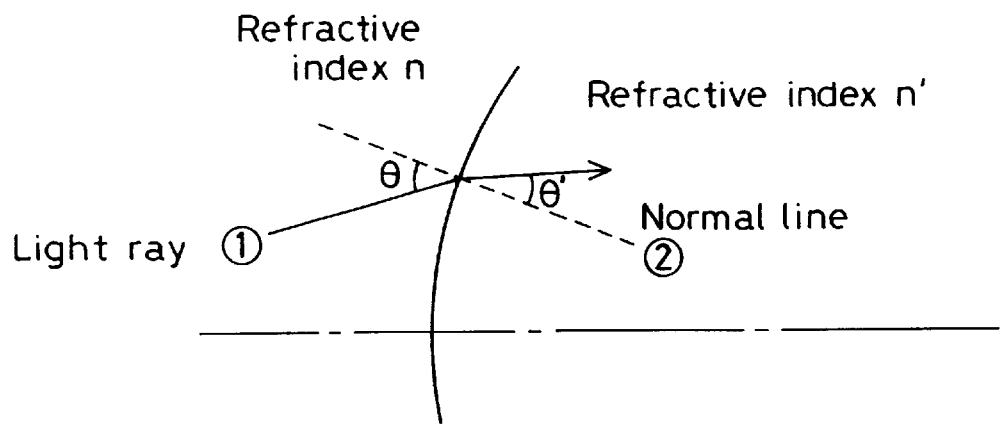
FIG. 21 shows the principle of refraction to explain a diffraction optical element used in the present invention.
Figure 22:
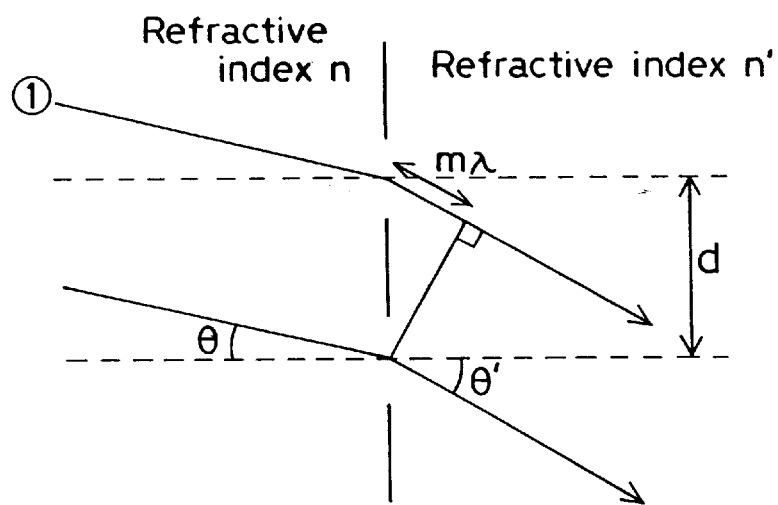
FIG. 22 shows the principle of diffraction to explain a diffraction optical element used in the present invention.

In the case of an optical element based on a refractive phenomenon, a light ray ① is bent, as shown in FIG. 21, on the basis of Snell's law given by $$n\cdot\sin\theta=n'\cdot\sin\theta' \quad (15)$$

where n: the refractive index of the entrance-side medium n': the refractive index of the exit-side medium θ: the incident angle of the ray θ': the exit angle of the ray On the other hand, in the case of a DOE, a light ray ① is bent, as shown in FIG. 22, by a diffractive phenomenon expressed by $$n\cdot\sin\theta-n'\cdot\sin\theta'=m\lambda/d \quad (16)$$

where n: the refractive index of the entrance-side medium n': the refractive index of the exit-side medium θ: the incident angle of the ray θ': the exit angle of the ray m: the order of diffraction λ: the wavelength d: the pitch of the DOE It should be noted that if the DOE is blazed or approximatively blazed, high diffraction efficiency can be maintained.

As a technique of designing an optical system including a DOE, Sweatt model is known; this is detailed in W. C. Sweatt "NEW METHODS OF DESIGNING HOLOGRAPHIC OPTICAL ELEMENTS", SPIE, Vol. 126, pp. 46–53 (1977). Sweatt model will be briefly explained below with reference to FIG. 23.

Figure 23:
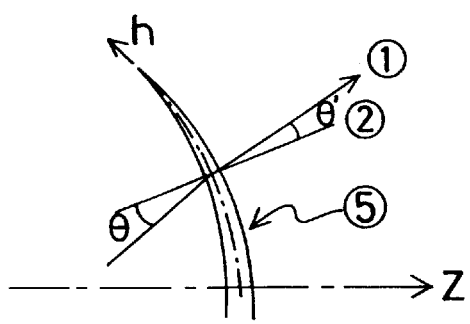
FIG. 23 is a view for explanation of an ultra-high index lens.

In FIG. 23, reference numeral ⑤ denotes a refracting lens (ultra-high index lens) in which n>>1, and ② a normal line. Reference symbol z denotes coordinates in the direction of an optical axis, h coordinates in the direction lying along the substrate.

According to the above-mentioned paper, the following equation holds:

$$(n_u-1)dz/dh = n \cdot \sin\theta - n' \cdot \sin\theta' \quad (17)$$

where $n_u$: the refractive index of the ultra-high index lens ($n_u$=1001 in the design explained below)

z: the coordinates in the optical axis direction of the ultra-high index lens h: the coordinates along the medium of the ultra-high index lens n: the refractive index of the entrance-side medium n': the refractive index of the exit-side medium θ: the incident angle of the ray θ': the exit angle of the ray Therefore, the following equation holds from Eqs. (16) and (17):

$$(n_u-1)dz/dh = m\lambda/d \quad (18)$$

That is, the equivalent relationship expressed by Eq. (18) is established between "the surface configuration of the refracting lens in which n>>1" and "the pitch of the DOE". Accordingly, the pitch distribution on the DOE can be obtained from the surface configuration of the ultra-high index lens designed on the basis of Sweatt model.

More specifically, let us assume that the ultra-high index lens is designed as an aspherical lens defined by $$z = ch^2/\{1+[1-c^2(k+1)h^2]^{1/2}\} + Ah^4 + Bh^6 + Ch^8 + Dh^{10} \quad (19)$$

where z: the displacement (sag value) from a plane tangent to the lens at the optical axis c: the curvature h: the distance from the optical axis k: the conical constant A: the 4th-order aspherical coefficient B: the 6th-order aspherical coefficient C: the 8th-order aspherical coefficient D: the 10th-order aspherical coefficient Assuming that one surface of the ultra-high index lens is a plane surface for simplification of the explanation, the following equation is obtained from Eqs. (18) and (19), $$d = m\lambda/[(n-1)dz/dh] \quad (20)$$

$$= [m\lambda/(n-1)] \times [ch/[1-c^2(k+1)h^2]^{1/2} +$$

-continued
$$4Ah^3 + 6Bh^5 + 8Ch^7 + 10Dh^9]^{-1}$$

Thus, the DOE should be given a pitch distribution defined by Eq. (20).

Further, it is necessary for Eq. (18) to hold for any desired wavelength.

$$\therefore n(\lambda) - 1 = K\lambda \quad (21)$$

where K=m/[d·dz/dh]

Since $n_d$ is herein assumed to be 1001, K=1.7020.

Thus, the dispersion characteristics of the DOE can be expressed according to Eq. (21) by assuming that $n_c$=1118.0, $N_e$=930.39, $n_F$=828.37 and $n_g$=742.78.

Although in the following examples aspherical surface terms for only 4th- to 10th-orders are used, it should be noted that aspherical surface terms for 12th-, 14th-... orders may be used, as a matter of course.

In those of the following examples which use a DOE, only one DOE is used. However, two or more DOEs may be used, as a matter of course.

Next, the optical system according to the present invention will be described with reference to FIGS. 1 to 13 which are sectional views of optical systems for a single eye according to Examples 1 to 13 in which the optical system is used in an image display apparatus.

It should be noted that the following explanation will be made on the basis of backward ray tracing in which light rays are traced from the pupil position toward the image display device. The object position is a virtual image position which is −1 m away from the pupil.

Constituent parameters of each example will be shown later. In the following description, the surface Nos. are shown as ordinal numbers in backward tracing from an exit pupil position (observer's pupil position) 1 of an optical system toward an image display device 6. A coordinate system is defined as shown in FIGS. 1 to 8: With the center of the optical system exit pupil 1 defined as an origin, the direction of an observer's visual axis 2 is taken as a Z-axis. Regarding the sign of the Z-axis, the direction that extends away from the center of the pupil 1 is defined as a positive direction. A direction which is perpendicular to the Z-axis in the plane of the figure is taken as a Y-axis, where the upward direction as viewed in the figure is defined as a positive direction. A direction perpendicularly intersecting both the Z- and Y-axes, i.e. a direction perpendicular to the plane of the figure, is taken as an X-axis. It should be noted that the direction of the X-axis that extends from the obverse side to the reverse side of the plane of the figure is defined as a positive direction.

In constituent parameters of Examples 1 to 7 (shown later), regarding each surface for which eccentricities Y and Z and tilt angle θ are shown, the eccentricity Y is a distance by which the vertex of the surface decenters in the Y-axis direction from the surface No. 1 (pupil position 1) as a reference surface, and the eccentricity Z is a distance by which the vertex of the surface decenters in the Z-axis direction from the reference surface. The tilt angle θ is the tilt angle of the central axis of the surface from the Z-axis. In this case, positive θ means counterclockwise rotation. The three surfaces of the diffraction optical element, i.e. from the substrate surface to the diffraction surface, are coaxial with respect to each other; therefore, eccentricities Y and Z and tilt angle θ are shown only for the diffraction optical element substrate surface. In this case, the eccentricity Y is a distance by which the vertex of the substrate surface decenters in the Y-axis direction from the surface No. 1 (pupil position 1), and the eccentricity Z is a distance by which the vertex of the substrate surface decenters in the Z-axis from the surface No. 1. The tilt angle θ is the tilt angle of the central axis of the substrate surface from the Z-axis. Regarding the other surfaces, the positional arrangement of each surface is shown by the surface separation.

In constituent parameters of Examples 8 to 13 (shown later), regarding each surface for which eccentricities Y and Z and tilt angle θ are shown, the eccentricity Y is a distance by which the vertex of the surface decenters in the Y-axis direction from the surface No. 1 (pupil position 1) as a reference surface, and the eccentricity Z is a distance by which the vertex of the surface decenters in the Z-axis direction from the reference surface. The tilt angle θ is the tilt angle of the central axis of the surface from the Z-axis. In this case, positive θ means counterclockwise rotation. It should be noted that a surface without indication of eccentricities Y, Z and tilt angle θ is coaxial with respect to the preceding surface. Surface separations are shown only for coaxial portions. The surface separation is the axial distance from the surface concerned to the next surface. It should be noted that surface separations are shown with the direction of backward tracing along the optical axis defined as positive direction.

The non-rotationally symmetric aspherical configuration of each surface may be expressed in the coordinate system defining the surface as follows:

$$Z = [(X^2/R_x) + (Y^2/R_y)]/[1 + \{1 - (1 + K_x)(X^2/R_x^2) - (1 + K_y)(Y^2/R_y^2)\}^{1/2}] +$$
$$AR[(1 - AP)X^2 + (1 + AP)Y^2]^2 +$$
$$BR[(1 - BP)X^2 + (1 + BP)Y^2]^3 +$$
$$CR[(1 - CP)X^2 + (1 + CP)Y^2]^4 +$$
$$DR[(1 - DP)X^2 + (1 + DP)Y^2]^5$$

where $R_y$ is the paraxial curvature radius of the surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR, BR, CR and DR are 4th-, 6th-, 8th- and 10th-order aspherical coefficients, respectively, which are rotationally symmetric with respect to the Z-axis; and AP, BP, CP and DP are 4th-, 6th-, 8th- and 10th-order aspherical coefficients, respectively, which are rotationally asymmetric with respect to the Z-axis.

The rotationally symmetric aspherical configuration of each surface may be expressed in the coordinate system defining the surface as follows:

$$Z = [(h^2/R)/[1 + \{1 - (1+K)(h^2/R^2)\}^{1/2} + Ah^4 + Bh^6 + Ch^8 + Dh^{10}(h^2 = X^2 + Y^2)$$

where R is the paraxial curvature radius; K is the conical coefficient; and A, B, C and D are 4th-, 6th-, 8th- and 10th-order aspherical coefficients, respectively.

In the coordinate system of each of the formulae that express surface configurations, the vertex of each surface is defined as an origin, and the center axis of each surface is defined as a Z-axis.

In constituent parameters (shown later), those which are not given any values are zero. The refractive index of a medium lying between a pair of surfaces is expressed by the refractive index for the spectral d-line (wavelength: 587.56 nm). Lengths are given in millimeters.

In an actual apparatus, needless to say, the direction in which light rays are reflected by the optical system may be either of the upward and sideward directions of the observer.

The optical system according to the present invention is also usable as an imaging optical system that forms an image of a distant object point.

FIGS. 1 to 7 are sectional views of image display apparatuses designed for a single eye according to Examples 1 to 7.

In each sectional view, reference numeral 1 denotes an observer's pupil position (exit pupil position), 2 an observer's visual axis, 6 an image display device, 7 an optical member, 8 a diffraction optical element, 3 a first surface of the optical member 7, 4 a second surface of the optical member 7, and 5 a third surface of the optical member 7.

The actual path of light rays in each example is as follows: In Examples 1, 2, 4 and 7, a bundle of light rays emitted from the image display device 6 enters the optical member 7 through the diffraction optical element 8 while being refracted by the third surface 5 of the optical member 7. The incident ray bundle is internally reflected by the first surface 3 and then reflected by the second surface 4 so as to be incident on the first surface 3 again. The ray bundle is refracted by the first surface 3 and projected into the observer's eyeball with the observer's iris position or eyeball rolling center as the exit pupil 1. In these examples, the first transmitting surface is the third surface 5, the first reflecting surface is the first surface 3, the second reflecting surface is the second surface 4, and the second transmitting surface is the first surface 3. The first reflecting surface and the second transmitting surface are provided at the same position and with the same configuration.

In Examples 3 and 6, a bundle of light rays emitted from the image display device 6 enters the optical member 7 while being refracted by the third surface 5 of the optical member 7. The incident ray bundle is internally reflected by the first surface 3 and then reflected by the second surface 4 so as to be incident on the first surface 3 again. The ray bundle exits from the optical member 7 while being refracted by the first surface 3, and is projected through the diffraction optical element 8 into the observer's eyeball with the observer's iris position or eyeball rolling center as the exit pupil 1. In these examples, the first transmitting surface is the third surface 5, the first reflecting surface is the first surface 3, the second reflecting surface is the second surface 4, and the second transmitting surface is the first surface 3. The first reflecting surface and the second transmitting surface are provided at the same position and with the same configuration.

In Example 5, a bundle of light rays emitted from the image display device 6 enters the optical member 7 through the diffraction optical element 8 while being refracted by the third surface 5 of the optical member 7. The incident ray bundle is internally reflected by the first surface 3 so as to be incident on the third surface 5. This time, the ray bundle is internally reflected by the third surface 5. The reflected ray bundle is internally reflected by the first surface 3 and then reflected by the second surface 4 so as to be incident on the first surface 3 once again. This time, the ray bundle is refracted by the first surface 3 and projected into the observer's eyeball with the observer's iris position or eyeball rolling center as the exit pupil 1. In this example, the first transmitting surface is the third surface 5, the first reflecting surface is the first surface 3, the second reflecting surface is the third surface 5, the third reflecting surface is the first surface 3, the fourth reflecting surface is the second surface 4, and the second transmitting surface is the first surface 3. The first transmitting surface and the second reflecting surface are provided at the same position and with the same configuration. The first reflecting surface, the third reflecting surface and the second transmitting surface are provided at the same position and with the same configuration.

Field angles and pupil diameters in Examples 1 to 7 are as follows:

EXAMPLE 1

The horizontal field angle is 40°, the vertical field angle is 30°, and the pupil diameter is 4 millimeters.

EXAMPLE 2

The horizontal field angle is 40°, the vertical field angle is 30°, and the pupil diameter is 4 millimeters.

EXAMPLE 3

The horizontal field angle is 40°, the vertical field angle is 30°, and the pupil diameter is 4 millimeters.

EXAMPLE 4

The horizontal field angle is 40°, the vertical field angle is 30°, and the pupil diameter is 4 millimeters.

EXAMPLE 5

The horizontal field angle is 30°, the vertical field angle is 22.5°, and the pupil diameter is 4 millimeters.

EXAMPLE 6

The horizontal field angle is 40°, the vertical field angle is 30°, and the pupil diameter is 4 millimeters.

EXAMPLE 7

The horizontal field angle is 40°, the vertical field angle is 30°, and the pupil diameter is 4 millimeters.

FIGS. 8 to 13 are sectional views of image display apparatuses designed for a single eye according to Examples 8 to 13. In the figures, reference numeral 1 denotes an observer's pupil position, 2 an observer's visual axis, 6 an image display device, 10 an ocular optical system, 5 a first surface of the ocular optical system 10, 4 a second surface of the ocular optical system 10, 3 a third surface of the ocular optical system 10, 9 a fourth surface of the ocular optical system 10, 7 a decentered prism, 8 a DOE, and 13 a gradient index lens (hereinafter referred to as "GRIN").

The actual path of light rays in each of Examples 8 to 13 is as follows: A bundle of light rays emitted from the image display device 6 enters the ocular optical system 10 while being refracted by the first surface 5 of the ocular optical system 10. The incident ray bundle is internally reflected by the fourth surface (the third surface 3 also serves as the fourth surface) 9 and then reflected by the second surface 4 so as to be incident on the third surface 3 again. The ray bundle is refracted by the third surface 3 and projected into the observer's eyeball with the observer's iris position or eyeball rolling center as the exit pupil 1.

EXAMPLE 8

Figure 8:
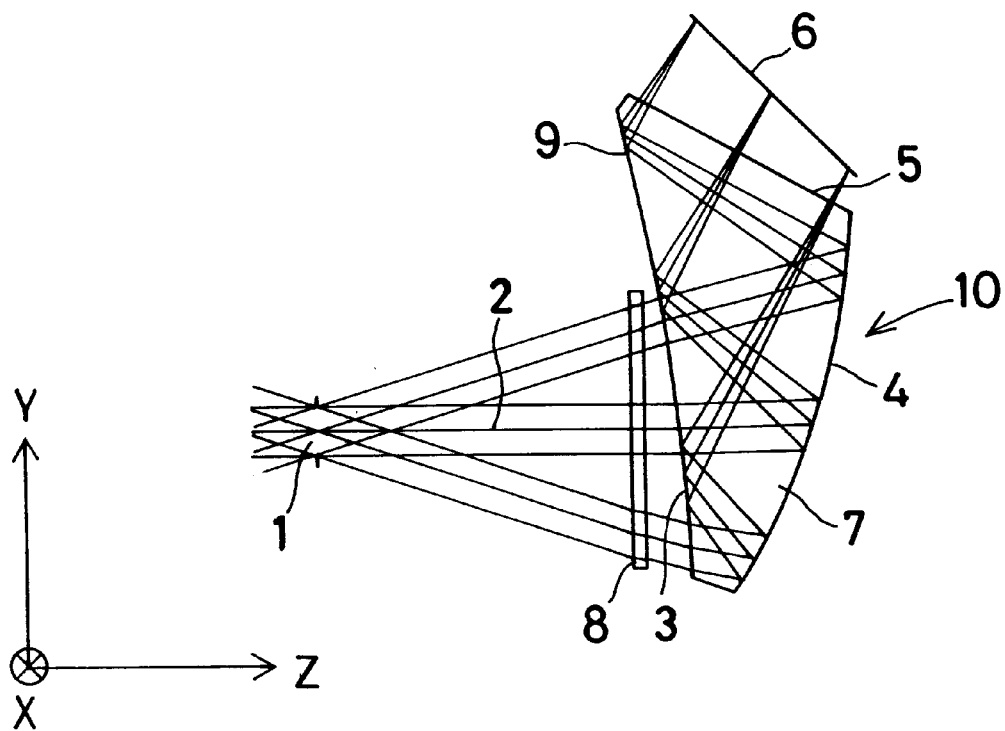
FIG. 8 is a sectional view of an image display apparatus for a single eye which uses an optical system according to Example 8 of the present invention.

In this example, as shown in the sectional view of FIG. 8, the horizontal field angle is 45.4°, the vertical field angle is 34.4°, and the pupil diameter is 4 millimeters. In this example, an approximately non-power DOE 8 is disposed between the exit pupil 1 and the decentered prism 7. In the constituent parameters (shown later), the surface Nos. 5, 6 and 7 are anamorphic aspherical surfaces, and the surface No. 8 is a plane surface.

EXAMPLE 9

Figure 9:
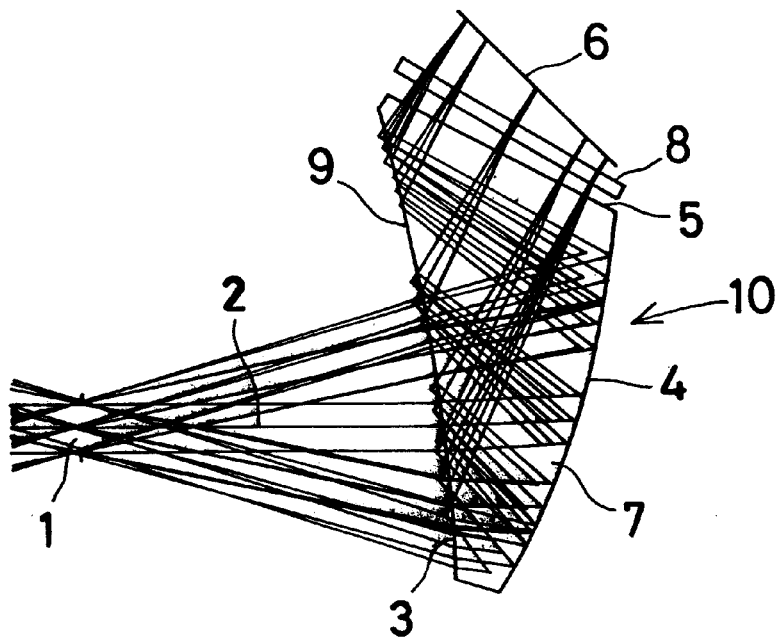
FIG. 9 is a sectional view of an image display apparatus for a single eye which uses an optical system according to Example 9 of the present invention.

In this example, as shown in the sectional view of FIG. 9, the horizontal field angle is 45.4°, the vertical field angle is 34.4°, and the pupil diameter is 4 millimeters. In this example, an approximately non-power DOE 8 is disposed between the decentered prism 7 and the image display device 6. In the constituent parameters (shown later), the surface Nos. 2, 3 and 4 are anamorphic aspherical surfaces, and the surface No. 5 is a plane surface.

EXAMPLE 10

Figure 10:
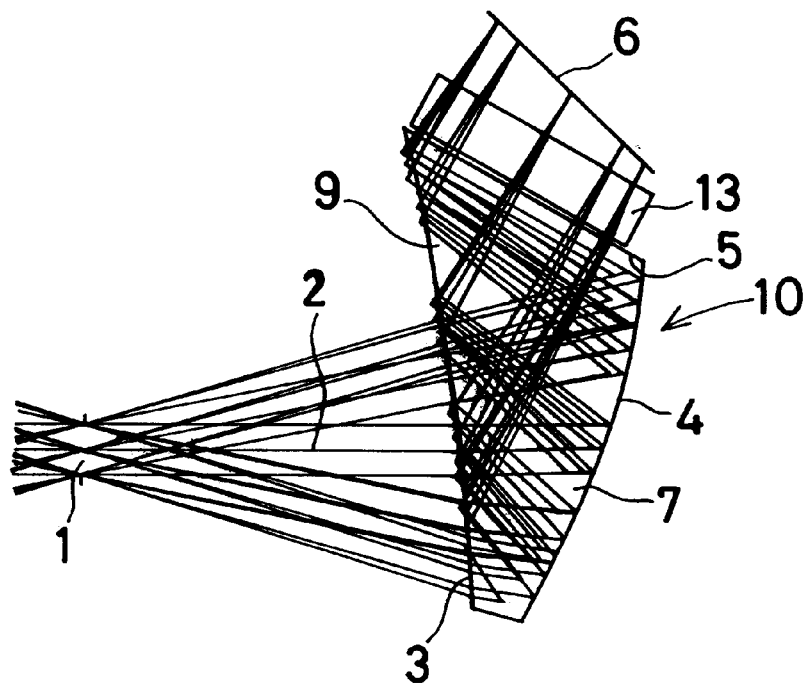
FIG. 10 is a sectional view of an image display apparatus for a single eye which uses an optical system according to Example 10 of the present invention.

In this example, as shown in the sectional view of FIG. 10, the horizontal field angle is 45.4°, the vertical field angle is 34.4°, and the pupil diameter is 4 millimeters. In this example, an approximately non-power GRIN 13 having plane surfaces on both sides thereof is disposed between the decentered prism 7 and the image display device 6. In the constituent parameters (shown later), the surface Nos. 2, 3 and 4 are anamorphic aspherical surfaces, and the surface No. 5 is a plane surface.

EXAMPLE 11

Figure 11:
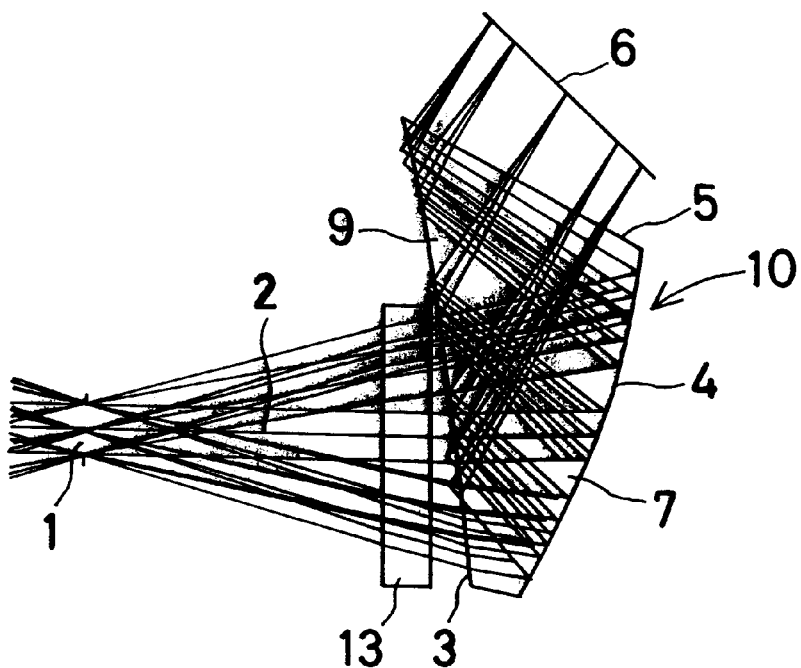
FIG. 11 is a sectional view of an image display apparatus for a single eye which uses an optical system according to Example 11 of the present invention.

In this example, as shown in the sectional view of FIG. 11, the horizontal field angle is 45.4°, the vertical field angle is 34.4°, and the pupil diameter is 4 millimeters. In this example, an approximately non-power GRIN 13 having plane surfaces on both sides thereof is disposed between the exit pupil 1 and the decentered prism 7. In the constituent parameters (shown later), the surface Nos. 4, 5 and 6 are anamorphic aspherical surfaces, and the surface No. 7 is a plane surface.

EXAMPLE 12

Figure 12:
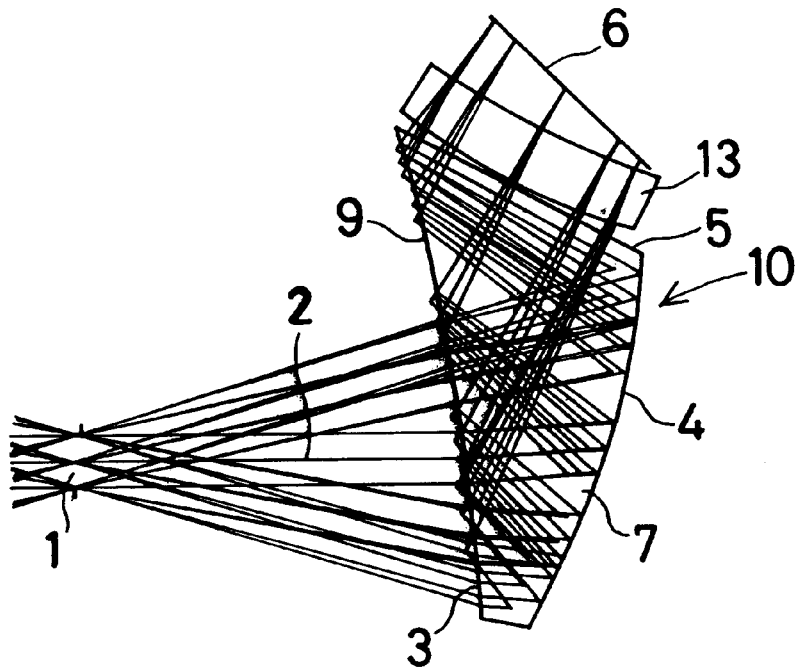
FIG. 12 is a sectional view of an image display apparatus for a single eye which uses an optical system according to Example 12 of the present invention.

In this example, as shown in the sectional view of FIG. 12, the horizontal field angle is 45.4°, the vertical field angle is 34.4°, and the pupil diameter is 4 millimeters. In this example, an approximately non-power meniscus-shaped GRIN 13 having a concave surface directed toward the image display device 6 is disposed between the decentered prism 7 and the image display device 6. In the constituent parameters (shown later), the surface Nos. 2, 3 and 4 are anamorphic aspherical surfaces, and the surface No. 5 is a plane surface.

EXAMPLE 13

Figure 13:
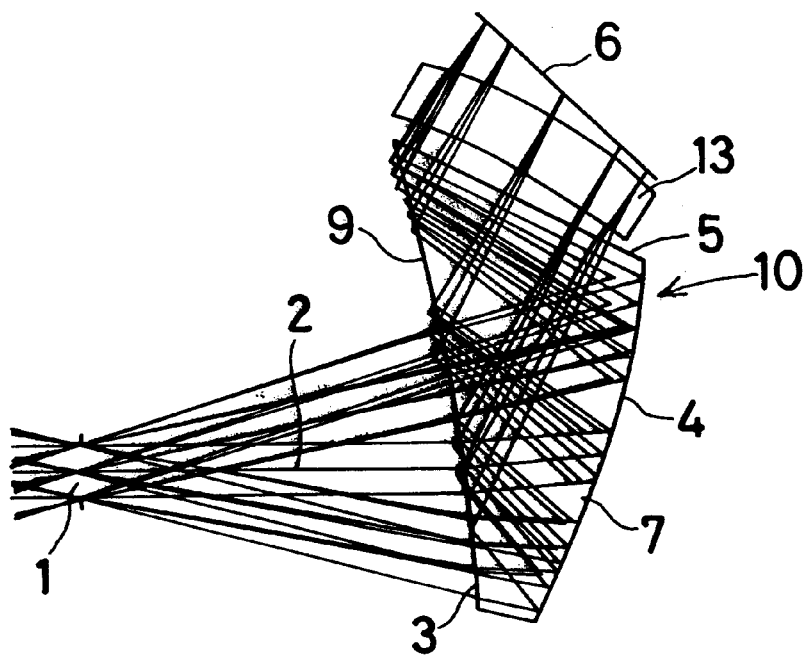
FIG. 13 is a sectional view of an image display apparatus for a single eye which uses an optical system according to Example 13 of the present invention.

In this example, as shown in the sectional view of FIG. 13, the horizontal field angle is 45.4°, the vertical field angle is 34.4°, and the pupil diameter is 4 millimeters. In this example, an approximately non-power meniscus-shaped GRIN 13 having a convex surface directed toward the image display device 6 is disposed between the decentered prism 7 and the image display device 6. In the constituent parameters (shown later), the surface Nos. 2, 3 and 4 are anamorphic aspherical surfaces, and the surface No. 5 is a plane surface.

Constituent parameters in the above-described Examples 1 to 13 will be shown below. It should be noted that the above-described $N_{1d}$, $N_{1F}$ and $N_{1C}$ are also shown in regard to the GRIN 13.

EXAMPLE 1

| Surface No. | | Radius of curvature | Surface separation | Refractive index (Eccentricity) | | Abbe's No. (Tilt angle) |
|---|---|---|---|---|---|---|
| 1 | | ∞ (pupil) | | | | |
| 2 | $R_y$ | −71.17939 | | 1.4922 | | 57.50 |
| | $R_x$ | −64.5987 | Y | 43.462 | θ | 21.63° |
| | $K_y$ | 0 | Z | 24.298 | | |
| | $K_x$ | 0 | | | | |
| | AR | 0.189094× $10^{-5}$ | | | | |
| | BR | 0.502157×$10^{-15}$ | | | | |
| | CR | −0.279487×$10^{-13}$ | | | | |
| | DR | −0.109879×$10^{-15}$ | | | | |
| | AP | −0.164076 | | | | |
| | BP | 53.350587 | | | | |
| | CP | 0.031156 | | | | |
| | DP | −0.572366 | | | | |
| 3 | $R_y$ | −77.512310 | | 1.4922 | | 57.50 |
| | $R_x$ | −59.71490 | Y | 14.711 | θ | −10.29° |
| | $K_y$ | 0 | Z | 46.484 | | |
| | $K_x$ | 0 | | | | |
| | AR | −0.869330×$10^{-12}$ | | | | |
| | BR | 0.233397×$10^{-10}$ | | | | |
| | CR | −0.939132×$10^{-13}$ | | | | |
| | DR | −0.269891×$10^{-15}$ | | | | |
| | AP | −341.628501 | | | | |
| | BP | 1.998719 | | | | |
| | CP | 0.538375 | | | | |
| | DP | −0.017896 | | | | |
| 4 | $R_y$ | −71.17939 | | 1.4922 | | 57.50 |
| | $R_x$ | −64.5987 | Y | 43.462 | θ | 21.63° |
| | $K_y$ | 0 | Z | 24.298 | | |
| | $K_x$ | 0 | | | | |
| | AR | 0.189094× $10^{-5}$ | | | | |
| | BR | 0.502157×$10^{-15}$ | | | | |
| | CR | −0.279487×$10^{-13}$ | | | | |
| | DR | −0.109879×$10^{-15}$ | | | | |
| | AP | −0.164076 | | | | |
| | BP | 53.350587 | | | | |
| | CP | 0.031156 | | | | |
| | DP | −0.572366 | | | | |
| 5 | $R_y$ | −52.225998 | Y | 29.105 | θ | 78.19° |
| | $R_x$ | −39.65538 | Z | 21.624 | | |
| | $K_y$ | 0 | | | | |
| | $K_x$ | 0 | | | | |
| | AR | 0.290484× $10^{-4}$ | | | | |
| | BR | −0.875623× $10^{-7}$ | | | | |
| | CR | 0.144496× $10^{-9}$ | | | | |
| | DR | −0.779302×$10^{-13}$ | | | | |
| | AP | −0.787876 | | | | |
| | BP | −0.424320 | | | | |
| | CP | −0.261606 | | | | |
| | DP | −0.191974 | | | | |
| 6 | | ∞ | | 1.5163 | | 64.10 |
| | | | Y | 23.095 | θ | 49.79° |
| | | | Z | 39.274 | | |
| 7 | | ∞ (DOE) | 0.000 | 1001 | | −3.45 |
| 8 | | −244948.903275 | | | | |
| | K | 0 | | | | |
| | A | −0.590641× $10^{-8}$ | | | | |
| | B | 0.524567×$10^{-10}$ | | | | |
| | C | 0.914818×$10^{-13}$ | | | | |
| | D | −0.907250×$10^{-15}$ | | | | |

-continued

| Surface No. | | Radius of curvature | Surface separation | | Refractive index (Eccentricity) | | Abbe's No. (Tilt angle) |
|---|---|---|---|---|---|---|---|
| 9 | | ∞ (display surface) | | Y | 27.171 | θ | 39.16° |
| | | | | Z | 43.254 | | |

EXAMPLE 2

| Surface No. | | Radius of curvature | Surface separation | | Refractive index (Eccentricity) | | Abbe's No. (Tilt angle) |
|---|---|---|---|---|---|---|---|
| 1 | | ∞ (pupil) | | | | | |
| 2 | $R_y$ | −79.38031 | | | 1.4922 | | 57.50 |
| | $R_x$ | −80.18493 | | Y | 41.448 | θ | 21.53° |
| | $K_y$ | 0 | | Z | 23.485 | | |
| | $K_x$ | 0 | | | | | |
| | AR | $0.146956 \times 10^{-5}$ | | | | | |
| | BR | $0.549579 \times 10^{-15}$ | | | | | |
| | CR | $-0.258466 \times 10^{-13}$ | | | | | |
| | DR | $-0.732260 \times 10^{-15}$ | | | | | |
| | AP | −0.147439 | | | | | |
| | BP | 55.826649 | | | | | |
| | CP | 0.12500 | | | | | |
| | DP | −0.775575 | | | | | |
| 3 | $R_y$ | −80.70890 | | | 1.4922 | | 57.50 |
| | $R_x$ | −61.92076 | | Y | 10.566 | θ | −12.08° |
| | $K_y$ | 0 | | Z | 45.313 | | |
| | $K_x$ | 0 | | | | | |
| | AR | $0.37995 \times 10^{-12}$ | | | | | |
| | BR | $0.587113 \times 10^{-10}$ | | | | | |
| | CR | $-0.577526 \times 10^{-13}$ | | | | | |
| | DR | $-0.107906 \times 10^{-14}$ | | | | | |
| | AP | −151.584065 | | | | | |
| | BP | 1.826841 | | | | | |
| | CP | 0.952204 | | | | | |
| | DP | −0.242091 | | | | | |
| 4 | $R_y$ | −79.38031 | | | 1.4922 | | 57.50 |
| | $R_x$ | −80.18493 | | Y | 41.448 | θ | 21.53° |
| | $K_y$ | 0 | | Z | 23.485 | | |
| | $K_x$ | 0 | | | | | |
| | AR | $0.146956 \times 10^{-5}$ | | | | | |
| | BR | $0.549579 \times 10^{-15}$ | | | | | |
| | CR | $-0.258466 \times 10^{-13}$ | | | | | |
| | DR | $-0.732260 \times 10^{-15}$ | | | | | |
| | AP | −0.147439 | | | | | |
| | BP | 55.826649 | | | | | |
| | CP | 0.012500 | | | | | |
| | DP | −0.775575 | | | | | |
| 5 | $R_y$ | −42.27641 | | Y | 27.378 | θ | 86.34° |
| | $R_x$ | −89.13397 | | Z | 21.361 | | |
| | $K_y$ | 0 | | | | | |
| | $K_x$ | 0 | | | | | |
| | AR | $0.362749 \times 10^{-7}$ | | | | | |
| | BR | $-0.123433 \times 10^{-7}$ | | | | | |
| | CR | 0 | | | | | |
| | DR | 0 | | | | | |
| | AP | −14.544698 | | | | | |
| | BP | 0.088670 | | | | | |
| | CP | 0 | | | | | |
| | DP | 0 | | | | | |
| 6 | | ∞ | 0.250 | | 1.5163 | | 64.10 |
| | | | | Y | 27.521 | θ | 44.04° |
| | | | | Z | 35.248 | | |
| 7 | | ∞ (DOE) | 0.000 | | 1001 | | −3.45 |
| 8 | | −259967.754835 | | | | | |
| | K | 0 | | | | | |
| | A | $0.295513 \times 10^{-7}$ | | | | | |
| | B | $-0.270162 \times 10^{-10}$ | | | | | |
| | C | $0.223860 \times 10^{-12}$ | | | | | |
| | D | $-0.328751 \times 10^{-15}$ | | | | | |

-continued

| Surface No. | Radius of curvature | Surface separation | Refractive index (Eccentricity) | | Abbe's No. (Tilt angle) |
|---|---|---|---|---|---|
| 9 | ∞ (display surface) | Y<br>Z | 26.947<br>42.638 | θ | 38.98° |

EXAMPLE 3

| Surface No. | Radius of curvature | | Surface separation | Refractive index (Eccentricity) | | Abbe's No. (Tilt angle) |
|---|---|---|---|---|---|---|
| 1 | | ∞ (pupil) | | | | |
| 2 | | ∞ | 0.280 | 1.5163 | | 64.10 |
| | | | Y | 4.361 | θ | 6.46° |
| | | | Z | 30.506 | | |
| 3 | | ∞ (DOB) | 0.000 | 1001 | | −3.45 |
| 4 | | −1210471.75072 | | | | |
| | K | 0 | | | | |
| | A | $0.681966 \times 10^{-9}$ | | | | |
| | B | $-0.294141 \times 10^{-11}$ | | | | |
| | C | $0.635773 \times 10^{-14}$ | | | | |
| | D | $-0.316842 \times 10^{-17}$ | | | | |
| 5 | $R_y$ | −91.85932 | | 1.4922 | | 57.50 |
| | $R_x$ | −85.77710 | Y | 42.786 | θ | 25.01° |
| | $K_y$ | 0 | Z | 21.186 | | |
| | $K_x$ | 0 | | | | |
| | AR | $0.150944 \times 10^{-5}$ | | | | |
| | BR | $0.581341 \times 10^{-15}$ | | | | |
| | CR | $-0.309854 \times 10^{-13}$ | | | | |
| | DR | $-0.622017 \times 10^{-15}$ | | | | |
| | AP | −0.238195 | | | | |
| | BP | 55.180495 | | | | |
| | CP | 0.096230 | | | | |
| | DP | −0.784416 | | | | |
| 6 | $R_y$ | −80.263766 | | 1.4922 | | 57.50 |
| | $R_x$ | −65.58356 | Y | 12.859 | θ | −8.05° |
| | $K_y$ | 0 | Z | 46.986 | | |
| | $K_x$ | 0 | | | | |
| | AR | $-0.320509 \times 10^{-8}$ | | | | |
| | BR | $0.441212 \times 10^{-10}$ | | | | |
| | CR | $-0.320183 \times 10^{-12}$ | | | | |
| | DR | $-0.790570 \times 10^{-15}$ | | | | |
| | AP | −0.748250 | | | | |
| | BP | 1.67572 | | | | |
| | CP | 0.472263 | | | | |
| | DP | −0.340182 | | | | |
| 7 | $R_y$ | −91.85932 | | 1.4922 | | 57.50 |
| | $R_x$ | −85.77710 | Y | 42.786 | θ | 25.01° |
| | $K_y$ | 0 | Z | 21.186 | | |
| | $K_x$ | 0 | | | | |
| | AR | $0.150944 \times 10^{-5}$ | | | | |
| | BR | $0.581341 \times 10^{-15}$ | | | | |
| | CR | $-0.309854 \times 10^{-13}$ | | | | |
| | DR | $-0.622017 \times 10^{-15}$ | | | | |
| | AP | −0.238195 | | | | |
| | BP | 55.180495 | | | | |
| | CP | 0.096230 | | | | |
| | DP | −0.784416 | | | | |
| 8 | $R_y$ | −60.476554 | Y | 28.128 | θ | 81.46° |
| | $R_x$ | −34.92352 | Z | 20.175 | | |
| | $K_y$ | 0 | | | | |
| | $K_x$ | 0 | | | | |
| | AR | $0.445485 \times 10^{-4}$ | | | | |
| | BR | $-0.169231 \times 10^{-6}$ | | | | |
| | CR | $0.331085 \times 10^{-9}$ | | | | |
| | DR | $-0.217700 \times 10^{-12}$ | | | | |
| | AP | −0.785547 | | | | |
| | BP | −0.518386 | | | | |
| | CP | −0.402954 | | | | |
| | DP | −0.355235 | | | | |

-continued

| Surface No. | | Radius of curvature | Surface separation | | Refractive index (Eccentricity) | | Abbe's No. (Tilt angle) |
|---|---|---|---|---|---|---|---|
| 9 | | ∞ (display surface) | Y | | 27.946 | θ | 47.35° |
| | | | Z | | 40.648 | | |

EXAMPLE 4

| Surface No. | | Radius of curvature | Surface separation | | Refractive index (Eccentricity) | | Abbe's No. (Tilt angle) |
|---|---|---|---|---|---|---|---|
| 1 | | ∞ (pupil) | | | | | |
| 2 | $R_y$ | −63.687638 | | | 1.4922 | | 57.50 |
| | $R_x$ | −52.93087 | Y | | 42.650 | θ | 21.79° |
| | $K_y$ | 0 | Z | | 25.411 | | |
| | $K_x$ | 0 | | | | | |
| | AR | 0.237756× $10^{-5}$ | | | | | |
| | BR | 0.497821× $10^{-15}$ | | | | | |
| | CR | −0.279870× $10^{-13}$ | | | | | |
| | DR | −0.880162× $10^{-16}$ | | | | | |
| | AP | −0.194847 | | | | | |
| | BP | 54.229862 | | | | | |
| | CP | −0.082177 | | | | | |
| | DP | −0.563852 | | | | | |
| 3 | $R_y$ | −74.468047 | | | 1.4922 | | 57.50 |
| | $R_x$ | −56.85709 | Y | | 12.514 | θ | −12.67° |
| | $K_y$ | 0 | Z | | 46.582 | | |
| | $K_x$ | 0 | | | | | |
| | AR | −0.175162× $10^{-12}$ | | | | | |
| | BR | 0.101402× $10^{-10}$ | | | | | |
| | CR | −0.133271× $10^{-12}$ | | | | | |
| | DR | −0.313264× $10^{-15}$ | | | | | |
| | AP | −102.638843 | | | | | |
| | BP | 2.769603 | | | | | |
| | CP | 0.488057 | | | | | |
| | DP | −0.048522 | | | | | |
| 4 | $R_y$ | −63.687638 | | | 1.4922 | | 57.50 |
| | $R_x$ | −52.93087 | Y | | 42.650 | θ | 21.79° |
| | $K_y$ | 0 | Z | | 25.411 | | |
| | $K_x$ | 0 | | | | | |
| | AR | 0.237756× $10^{-5}$ | | | | | |
| | BR | 0.497821× $10^{-15}$ | | | | | |
| | CR | −0.279870× $10^{-13}$ | | | | | |
| | DR | −0.880162× $10^{-16}$ | | | | | |
| | AP | −0.194847 | | | | | |
| | BP | 54.229862 | | | | | |
| | CP | −0.082177 | | | | | |
| | DP | −0.563852 | | | | | |
| 5 | $R_y$ | −32.35945 | Y | | 28.650 | θ | 71.97° |
| | $R_x$ | −28.57891 | Z | | 28.100 | | |
| | $K_y$ | 0 | | | | | |
| | $K_x$ | 0 | | | | | |
| | AR | 0.180717× $10^{-4}$ | | | | | |
| | BR | −0.215221× $10^{-7}$ | | | | | |
| | CR | 0.107474× $10^{-9}$ | | | | | |
| | DR | −0.117215× $10^{-12}$ | | | | | |
| | AP | −1.132480 | | | | | |
| | BP | −0.971905 | | | | | |
| | CP | 0.000688 | | | | | |
| | DP | 0.051621 | | | | | |
| 6 | | ∞ | 0.250 | | 1.5163 | | 64.10 |
| | | | Y | | 23.040 | θ | 47.79° |
| | | | Z | | 40.285 | | |
| 7 | | ∞ (DOE) | 0.000 | | 1001 | | −3.45 |
| 8 | | −464779 | | | | | |
| | K | 0 | | | | | |
| | A | −0.796488× $10^{-8}$ | | | | | |
| | B | 0.233311× $10^{-10}$ | | | | | |
| 9 | | ∞ (display surface) | Y | | 27.154 | θ | 37.36° |
| | | | Z | | 43.842 | | |

EXAMPLE 5

| Surface No. | | Radius of curvature | Surface separation | Refractive index (Eccentricity) | | Abbe's No. (Tilt angle) |
|---|---|---|---|---|---|---|
| 1 | | ∞ (pupil) | | | | |
| 2 | $R_y$ | −292.331787 | | 1.5163 | | 64.10 |
| | $R_x$ | −64.47050 | Y | 33.943 | θ | 7.70° |
| | $K_y$ | 0 | Z | 27.360 | | |
| | $K_x$ | 0 | | | | |
| | AR | $0.401020 \times 10^{-6}$ | | | | |
| | AP | −0.693944 | | | | |
| 3 | $R_y$ | −1501.496515 | | 1.5163 | | 64.10 |
| | $R_x$ | −102.59918 | Y | 94.211 | θ | −10.16° |
| | $K_y$ | 0 | Z | 64.769 | | |
| | $K_x$ | 0 | | | | |
| | AR | $-0.870453 \times 10^{-7}$ | | | | |
| | AP | −0.042140 | | | | |
| 4 | $R_y$ | −292.331787 | | 1.5163 | | 64.10 |
| | $R_x$ | −64.47050 | Y | 33.943 | 0 | 7.70° |
| | $K_y$ | 0 | Z | 27.360 | | |
| | $K_x$ | 0 | | | | |
| | AR | $0.401020 \times 10^{-6}$ | | | | |
| | AP | −0.693944 | | | | |
| 5 | $R_y$ | −119.796883 | | 1.5163 | | 64.10 |
| | $R_x$ | −49.36833 | Y | 63.187 | θ | 38.77° |
| | $K_y$ | 0 | Z | 19.430 | | |
| | $K_x$ | 0 | | | | |
| | AR | $0.946153 \times 10^{-6}$ | | | | |
| | AP | −0.548848 | | | | |
| 6 | $R_y$ | −292.31787 | | 1.5163 | | 64.10 |
| | $R_x$ | −64.47050 | Y | 33.943 | θ | 7.70° |
| | $K_y$ | 0 | Z | 27.360 | | |
| | $K_x$ | 0 | | | | |
| | AR | $0.401020 \times 10^{-6}$ | | | | |
| | AP | −0.693944 | | | | |
| 7 | $R_y$ | −119.796883 | Y | 63.187 | θ | 38.77° |
| | $R_x$ | −49.3683 | Z | 19.430 | | |
| | $K_y$ | 0 | | | | |
| | $K_x$ | 0 | | | | |
| | AR | $0.946153 \times 10^{-6}$ | | | | |
| | AP | −0.548848 | | | | |
| 8 | | ∞ | 1.000 | 1.5163 | | 64.10 |
| | | | Y | 40.627 | θ | 30.59° |
| | | | Z | 35.332 | | |
| 9 | | ∞ (DOE) | 0.000 | 1001 | | −3.45 |
| 10 | | −43047.588167 | | | | |
| | K | 0 | | | | |
| | A | $0.436299 \times 10^{-8}$ | | | | |
| 11 | | ∞ (display surface) | Y | 47.9 | θ | 27.12° |
| | | | Z | 40 | | |

EXAMPLE 6

| Surface No. | | Radius of curvature | Surface separation | | Refractive index (Eccentricity) | | Abbe's No. (Tilt angle) |
|---|---|---|---|---|---|---|---|
| 1 | | ∞ (pupil) | | | | | |
| 2 | | ∞ | 0.300 | | 1.5163 | | 64.10 |
| | | | | Y | 0.528 | θ | 3.52° |
| | | | | Z | 30.968 | | |
| 3 | | ∞ (DOE) | 0.000 | | 1001 | | −3.45 |
| 4 | | −1014751.75463 | | | | | |
| | K | 0 | | | | | |
| | A | $0.787268 \times 10^{-9}$ | | | | | |
| | B | $0.182929 \times 10^{-11}$ | | | | | |
| | C | $-0.131126 \times 10^{-13}$ | | | | | |
| | D | $0.130609 \times 10^{-16}$ | | | | | |
| 5 | $R_y$ | −73.944129 | | | 1.4922 | | 57.50 |
| | $R_x$ | −69.91809 | | Y | 46.027 | θ | 24.71° |
| | $K_y$ | 0 | | Z | 22.895 | | |
| | $K_x$ | 0 | | | | | |
| | AR | $0.173092 \times 10^{-5}$ | | | | | |
| | BR | $0.394778 \times 10^{-15}$ | | | | | |
| | CR | $-0.310330 \times 10^{-13}$ | | | | | |
| | DR | $-0.421275 \times 10^{-16}$ | | | | | |
| | AP | −0.180837 | | | | | |
| | BP | 56.720372 | | | | | |
| | CP | −0.033823 | | | | | |
| | DP | −0.622396 | | | | | |
| 6 | $R_y$ | −80.26792 | | | 1.4922 | | 57.50 |
| | $R_x$ | −62.52811 | | Y | 17.982 | θ | −6.91° |
| | $K_y$ | 0 | | Z | 47.566 | | |
| | $K_x$ | 0 | | | | | |
| | AR | $-0.406113 \times 10^{-12}$ | | | | | |
| | BR | $0.137027 \times 10^{-10}$ | | | | | |
| | CR | $-0.478711 \times 10^{-13}$ | | | | | |
| | DR | $-0.107178 \times 10^{-15}$ | | | | | |
| | AP | −640.994824 | | | | | |
| | BP | 2.330409 | | | | | |
| | CP | 0.475262 | | | | | |
| | DP | 0.169588 | | | | | |
| 7 | $R_y$ | −73.94129 | | | 1.4922 | | 57.50 |
| | $R_x$ | −69.91809 | | Y | 46.027 | θ | 24.71° |
| | $K_y$ | 0 | | Z | 22.895 | | |
| | $K_x$ | 0 | | | | | |
| | AR | $0.173092 \times 10^{-5}$ | | | | | |
| | BR | $0.394778 \times 10^{-15}$ | | | | | |
| | CR | $-0.31030 \times 10^{-13}$ | | | | | |
| | DR | $-0.421275 \times 10^{-16}$ | | | | | |
| | AP | −0.180837 | | | | | |
| | BP | 56.720372 | | | | | |
| | CP | −0.033823 | | | | | |
| | DP | −0.622396 | | | | | |
| 8 | $R_y$ | −53.64091 | | Y | 28.627 | θ | 83.27° |
| | $R_x$ | −36.56938 | | Z | 20.211 | | |
| | $K_y$ | 0 | | | | | |
| | $K_x$ | 0 | | | | | |
| | AR | $0.313093 \times 10^{-4}$ | | | | | |
| | BR | $-0.981865 \times 10^{-7}$ | | | | | |
| | CR | $0.153577 \times 10^{-9}$ | | | | | |
| | DR | $-0.710929 \times 10^{-13}$ | | | | | |
| | AP | −0.887541 | | | | | |
| | BP | −0.531847 | | | | | |
| | CP | −0.347911 | | | | | |
| | DP | −0.245694 | | | | | |
| 9 | | ∞ (display surface) | | Y | 27.588 | θ | 43.23° |
| | | | | Z | 43.381 | | |

EXAMPLE 7

| Surface No. | | Radius of curvature | Surface separation | | Refractive index (Eccentricity) | | Abbe's No. (Tilt angle) |
|---|---|---|---|---|---|---|---|
| 1 | | ∞ (pupil) | | | | | |
| 2 | | ∞ | | | 1.4922 | | 57.50 |
| | | | | Y | 0 | θ | 1.79° |
| | | | | Z | 31 | | |
| 3 | $R_y$ | −141.407945 | | | 1.4922 | | 57.50 |
| | $R_x$ | −126.83786 | | Y | −5.513 | θ | −22.10° |
| | $K_y$ | 0 | | Z | 43.891 | | |
| | $K_x$ | 0 | | | | | |
| | AR | $0.514241 \times 10^{-6}$ | | | | | |
| | BR | $0.691483 \times 10^{-10}$ | | | | | |
| | CR | $0.237472 \times 10^{-12}$ | | | | | |
| | DR | $-0.978814 \times 10^{-16}$ | | | | | |
| | AP | −0.079009 | | | | | |
| | BP | 0.169964 | | | | | |
| | CP | −0.300765 | | | | | |
| | DP | −0.242091 | | | | | |
| 4 | | ∞ | | | 1.4922 | | 57.50 |
| | | | | Y | 0 | θ | 1.79° |
| | | | | Z | 31 | | |
| 5 | | −41.519166 | | Y | 23.703 | θ | 44.32° |
| | | | | Z | 43.596 | | |
| 6 | | ∞ | 1.000 | | 1.5163 | | 64.10 |
| | | | | Y | 32.575 | θ | 28.99° |
| | | | | Z | 51.228 | | |
| 7 | | ∞ (DOE) | 0.000 | | 1001 | | −3.45 |
| 8 | | 91082.1383941 | | | | | |
| | K | 0 | | | | | |
| | A | $-0.201624 \times 10^{-6}$ | | | | | |
| | B | $0.177572 \times 10^{-8}$ | | | | | |
| | C | $-0.722700 \times 10^{-11}$ | | | | | |
| | D | $0.108209 \times 10^{-13}$ | | | | | |
| 9 | | ∞ (display surface) | | Y | 50.265 | θ | 24.87° |
| | | | | Z | 47.812 | | |

EXAMPLE 8

| Surface No. | | Radius of curvature | Surface separation | | Refractive index (Eccentricity) | | Abbe's No. (Tilt angle) |
|---|---|---|---|---|---|---|---|
| 1 | | ∞ (pupil) | | | | | |
| 2 | | ∞ | | | 1.58875 | | 64.1 |
| | | | | Y | 0.000 | θ | 0.00° |
| | | | | Z | 27.000 | | |
| 3 | | ∞ (DOE) | | | 1001.00000 | | −3.45 |
| | | | | Y | 0.000 | θ | 0.00° |
| | | | | Z | 28.000 | | |
| 4 | | $-2.2939 \times 10^{+6}$ | | Y | 0.000 | θ | 0.00 |
| | | | | Z | 28.000 | | |
| 5 | $R_y$ | −209.268 | | | 1.49216 | | 57.5 |
| | $R_x$ | −95.115 | | Y | 18.335 | θ | 12.00° |
| | $K_y$ | 0.000000 | | Z | 27.921 | | |
| | $K_x$ | 0.000000 | | | | | |
| | AR | $0.783868 \times 10^{-6}$ | | | | | |
| | BR | $0.299472 \times 10^{-12}$ | | | | | |
| | CR | $0.152974 \times 10^{-13}$ | | | | | |
| | DR | $-0.502892 \times 10^{-16}$ | | | | | |
| | AP | 0.449899 | | | | | |
| | BP | $-0.794713 \times 10^{+1}$ | | | | | |
| | CP | 0.654541 | | | | | |
| | DP | −0.138730 | | | | | |
| 6 | $R_y$ | 67.801 | | | 1.49216 | | 57.5 |
| | $R_x$ | 58.220 | | Y | −9.356 | θ | −27.44° |
| | $K_y$ | 0.000000 | | Z | 38.348 | | |
| | $K_x$ | 0.000000 | | | | | |
| | AR | $0.427047 \times 10^{-6}$ | | | | | |
| | BR | $-0.770285 \times 10^{-10}$ | | | | | |

-continued

| Surface No. | | Radius of curvature | Surface separation | Refractive index (Eccentricity) | | Abbe's No. (Tilt angle) |
|---|---|---|---|---|---|---|
| | CR | $0.407932 \times 10^{-21}$ | | | | |
| | DR | $0.105909 \times 10^{-16}$ | | | | |
| | AP | 0.107024 | | | | |
| | BP | 0.496744 | | | | |
| | CP | $0.119380 \times 10^{+3}$ | | | | |
| | DP | $-0.923056 \times 10^{+2}$ | | | | |
| 7 | $R_y$ | $-209.268$ | | 1.49216 | | 57.5 |
| | $R_x$ | $-95.115$ | Y | 18.335 | θ | 12.00° |
| | $K_y$ | 0.000000 | Z | 27.921 | | |
| | $K_x$ | 0.000000 | | | | |
| | AR | $0.783868 \times 10^{-6}$ | | | | |
| | BR | $0.299472 \times 10^{-12}$ | | | | |
| | CR | $0.152974 \times 10^{-13}$ | | | | |
| | DR | $-0.502892 \times 10^{-16}$ | | | | |
| | AP | $-0.449899$ | | | | |
| | BP | $-0.794713 \times 10^{+1}$ | | | | |
| | CP | 0.654541 | | | | |
| | DP | $-0.138730$ | | | | |
| 8 | | ∞ | Y | 27.164 | θ | 62.56° |
| | | | Z | 27.921 | | |
| 9 | | ∞ (display surface) | Y | 27.796 | θ | 46.89° |
| | | | Z | 39.073 | | |

EXAMPLE 9

| Surface No. | | Radius of curvature | Surface separation | Refractive index (Eccentricity) | | Abbe's No. (Tilt angle) |
|---|---|---|---|---|---|---|
| 1 | | ∞ (pupil) | | | | |
| 2 | $R_y$ | $-209.268$ | | 1.49216 | | 57.5 |
| | $R_x$ | $-95.115$ | Y | 18.335 | θ | 12.00° |
| | $K_y$ | 0.000000 | Z | 27.921 | | |
| | $K_x$ | 0.000000 | | | | |
| | AR | $0.783868 \times 10^{-6}$ | | | | |
| | BR | $0.299472 \times 10^{-12}$ | | | | |
| | CR | $0.152974 \times 10^{-13}$ | | | | |
| | DR | $-0.502892 \times 10^{-16}$ | | | | |
| | AP | $-0.449899$ | | | | |
| | BP | $0.794713 \times 10^{+1}$ | | | | |
| | CP | 0.654541 | | | | |
| | DP | $-0.138730$ | | | | |
| 3 | $R_y$ | $-67.801$ | | 1.49216 | | 57.5 |
| | $R_x$ | $-58.220$ | Y | $-9.356$ | θ | $-27.44°$ |
| | $K_y$ | 0.000000 | Z | 38.348 | | |
| | $K_x$ | 0.000000 | | | | |
| | AR | $0.427047 \times 10^{-6}$ | | | | |
| | BR | $-0.770285 \times 10^{-10}$ | | | | |
| | CR | $0.40932 \times 10^{-21}$ | | | | |
| | DR | $0.105909 \times 10^{-16}$ | | | | |
| | AP | 0.107024 | | | | |
| | BP | 0.496744 | | | | |
| | CP | $0.119380 \times 10^{+3}$ | | | | |
| | DP | $-0.923056 \times 10^{-2}$ | | | | |
| 4 | $R_y$ | $-209.268$ | | 1.49216 | | 57.5 |
| | $R_x$ | $-95.115$ | Y | 18.335 | θ | 12.00° |
| | $K_y$ | 0.000000 | Z | 27.921 | | |
| | $K_x$ | 0.000000 | | | | |
| | AR | $0.783868 \times 10^{-6}$ | | | | |
| | BR | $0.299472 \times 10^{-12}$ | | | | |
| | CR | $0.152974 \times 10^{-13}$ | | | | |
| | DR | $-0.502892 \times 10^{-16}$ | | | | |
| | AP | $-0.449899$ | | | | |
| | BP | $0.794713 \times 10^{+1}$ | | | | |
| | CP | 0.654541 | | | | |
| | DP | $-0.138730$ | | | | |
| 5 | | ∞ | Y | 27.164 | θ | 62.56° |
| | | | Z | 27.921 | | |
| 6 | | ∞ | 1.000 | 1.58875 | | 64.1 |

-continued

| Surface No. | Radius of curvature | | Surface separation | Refractive index (Eccentricity) | | Abbe's No. (Tilt angle) |
|---|---|---|---|---|---|---|
| | | | Y | 25.000 | θ | 60.00° |
| | | | Z | 36.000 | | |
| 7 | ∞ (DOE) | | 0.000 | 1001.00000 | | −3.45 |
| 8 | −0.344807×10$^{+6}$ | | | | | |
| 9 | ∞ (display surface) | | Y | 28.388 | θ | 46.88° |
| | | | Z | 39.413 | | |

EXAMPLE 10

| Surface No. | Radius of curvature | | Surface separation | Refractive index (Eccentricity) | | Abbe's No. (Tilt angle) |
|---|---|---|---|---|---|---|
| 1 | | ∞ (pupil) | | | | |
| 2 | $R_y$ | −209.268 | | 1.49216 | | 57.5 |
| | $R_x$ | −95.115 | Y | 18.335 | θ | 12.00° |
| | $K_y$ | 0.000000 | Z | 27.921 | | |
| | $K_x$ | 0.000000 | | | | |
| | AR | 0.783868× 10$^{-6}$ | | | | |
| | BR | 0.299472×10$^{-12}$ | | | | |
| | CR | 0.152974×10$^{-13}$ | | | | |
| | DR | −0.502892×10$^{-16}$ | | | | |
| | AP | −0.449899 | | | | |
| | BP | −0.794713× 10$^{+1}$ | | | | |
| | CP | 0.654541 | | | | |
| | DP | −0.138730 | | | | |
| 3 | $R_y$ | −67.801 | | 1.49216 | | 57.5 |
| | $R_x$ | −58.220 | Y | −9.356 | θ | −27.44° |
| | $K_y$ | 0.000000 | Z | 8.348 | | |
| | $K_x$ | 0.000000 | | | | |
| | AR | 0.427047× 10$^{-6}$ | | | | |
| | BR | −0.770285×10$^{-10}$ | | | | |
| | CR | 0.407932×10$^{-21}$ | | | | |
| | DR | 0.105909×10$^{-16}$ | | | | |
| | AP | 0.107024 | | | | |
| | BP | 0.496744 | | | | |
| | CP | 0.119380× 10$^{+3}$ | | | | |
| | DP | −0.923056× 10$^{-2}$ | | | | |
| 4 | $R_y$ | −209.268 | | 1.49216 | | 57.5 |
| | $R_x$ | −95.115 | Y | 18.335 | θ | 12.00° |
| | $K_y$ | 0.000000 | Z | 27.921 | | |
| | $K_x$ | 0.000000 | | | | |
| | AR | 0.783868× 10$^{-6}$ | | | | |
| | BR | 0.299472×10$^{-12}$ | | | | |
| | CR | 0.152974×10$^{-13}$ | | | | |
| | DR | −0.502892×10$^{-16}$ | | | | |
| | AP | −0.449899 | | | | |
| | BP | −0.794713× 10$^{+1}$ | | | | |
| | CP | 0.654541 | | | | |
| | DP | 0.138730 | | | | |
| 5 | | ∞ | Y | 25.000 | θ | 62.56° |
| | | | Z | 27.921 | | |
| 6 | | ∞ (GRIN) | 5.000 | 1.49216 | | 57.5 |
| | | | | $N_{1d}$ −0.1005 × 10$^{-3}$ | | |
| | | | | $N_{1F}$ −0.1068 × 10$^{-3}$ | | |
| | | | | $N_{1C}$ −0.9399 × 10$^{-4}$ | | |
| | | | Y | 21.500 | θ | 62.56° |
| | | | Z | 35.222 | | |
| 7 | | ∞ | | | | |
| 8 | | ∞ (display surface) | Y | 29.022 | θ | 46.89° |
| | | | Z | 39.742 | | |

EXAMPLE 11

| Surface No. | Radius of curvature | | Surface separation | Refractive index (Eccentricity) | Abbe's No. (Tilt angle) |
|---|---|---|---|---|---|
| 1 | | ∞ (pupil) | | | |
| 2 | | ∞ (GRIN) | | 1.49216 | 57.5 |
| | | | | $N_{1d}$ 0.1005 × 10$^{-3}$ | |
| | | | | $N_{1F}$ 0.1068 × 10$^{-3}$ | |
| | | | | $N_{1C}$ 0.9399 × 10$^{-4}$ | |
| | | | Y 0.000 | θ | 0.00° |
| | | | Z 25.000 | | |
| 3 | | ∞ | Y 0.000 | θ | 0.00° |
| | | | Z 29.000 | | |
| 4 | $R_y$ | −209.268 | | 1.49216 | 57.5 |
| | $R_x$ | −95.115 | Y 18.335 | θ | 12.00° |
| | $K_y$ | 0.000000 | Z 27.921 | | |
| | $K_x$ | 0.000000 | | | |
| | AR | 0.783868× 10$^{-6}$ | | | |
| | BR | 0.299472×10$^{-12}$ | | | |
| | CR | 0.152974×10$^{-13}$ | | | |
| | DR | −0.502892×10$^{-16}$ | | | |
| | AP | −0.449899 | | | |
| | BP | −0.794713× 10$^{+1}$ | | | |
| | CP | 0.654541 | | | |
| | DP | −0.138730 | | | |
| 5 | $R_y$ | −67.801 | | 1.49216 | 57.5 |
| | $R_x$ | −58.220 | Y −9.356 | θ | −27.44° |
| | $K_y$ | 0.000000 | Z 38.348 | | |
| | $K_x$ | 0.000000 | | | |
| | AR | 0.427047× 10$^{-6}$ | | | |
| | BR | −0.770285×10$^{-10}$ | | | |
| | CR | 0.407932×10$^{-21}$ | | | |
| | DR | 0.105909×10$^{-16}$ | | | |
| | AP | 0.107024 | | | |
| | BP | 0.496744 | | | |
| | CP | 0.119380× 10$^{+3}$ | | | |
| | DP | −0.923056× 10$^{-2}$ | | | |
| 6 | $R_y$ | −209.268 | | 1.49216 | 57.5 |
| | $R_x$ | −95.115 | Y 18.335 | θ | 12.00° |
| | $K_y$ | 0.000000 | Z 27.921 | | |
| | $K_x$ | 0.000000 | | | |
| | AR | 0.783868× 10$^{-6}$ | | | |
| | BR | 0.299472×10$^{-12}$ | | | |
| | CR | 0.152974×10$^{-13}$ | | | |
| | DR | −0.502892×10$^{-16}$ | | | |
| | AP | −0.449899 | | | |
| | BP | −0.794713× 10$^{+1}$ | | | |
| | CP | 0.654541 | | | |
| | DP | −0.138730 | | | |
| 7 | | ∞ | Y 25.000 | θ | 62.56° |
| | | | Z 27.921 | | |
| 8 | | ∞ (display surface) | Y 28.166 | θ | 46.89° |
| | | | Z 39.360 | | |

EXAMPLE 12

| Surface No. | Radius of curvature | | Surface separation | Refractive index (Eccentricity) | Abbe's No. (Tilt angle) |
|---|---|---|---|---|---|
| 1 | | ∞ (pupil) | | | |
| 2 | $R_y$ | −209.268 | | 1.49216 | 57.5 |
| | $R_x$ | −95.115 | Y 18.335 | θ | 12.00° |
| | $K_y$ | 0.000000 | Z 27.921 | | |
| | $K_x$ | 0.000000 | | | |
| | AR | 0.783868× 10$^{-6}$ | | | |
| | BR | 0.299472×10$^{-12}$ | | | |
| | CR | 0.152974×10$^{-13}$ | | | |
| | DR | −0.502892×10$^{-16}$ | | | |
| | AP | −0.449899 | | | |
| | BP | −0.794713× 10$^{+1}$ | | | |

-continued

| Surface No. | | Radius of curvature | | Surface separation | | Refractive index (Eccentricity) | | Abbe's No. (Tilt angle) |
|---|---|---|---|---|---|---|---|---|
| | CP | 0.654541 | | | | | | |
| | DP | −0.138730 | | | | | | |
| 3 | $R_y$ | −67.801 | | | | 1.49216 | | 57.5 |
| | $R_x$ | −58.220 | | | Y | −9.356 | θ | −27.44° |
| | $K_y$ | 0.000000 | | | Z | 38.348 | | |
| | $K_x$ | 0.000000 | | | | | | |
| | AR | 0.427047 | $\times 10^{-6}$ | | | | | |
| | BR | −0.770285 | $\times 10^{-10}$ | | | | | |
| | CR | 0.407932 | $\times 10^{-21}$ | | | | | |
| | DR | 0.105909 | $\times 10^{-16}$ | | | | | |
| | AP | 0.107024 | | | | | | |
| | BP | 0.496744 | | | | | | |
| | CP | 0.119380 | $\times 10^{+3}$ | | | | | |
| | DP | −0.923056 | $\times 10^{-2}$ | | | | | |
| 4 | $R_y$ | −209.268 | | | | 1.49216 | | 57.5 |
| | $R_x$ | −95.115 | | | Y | 18.335 | θ | 12.00° |
| | $K_y$ | 0.000000 | | | Z | 27.921 | | |
| | $K_x$ | 0.000000 | | | | | | |
| | AR | 0.783868 | $\times 10^{-6}$ | | | | | |
| | BR | 0.299472 | $\times 10^{-12}$ | | | | | |
| | CR | 0.152974 | $\times 10^{-13}$ | | | | | |
| | DR | −0.502892 | $\times 10^{-16}$ | | | | | |
| | AP | −0.449899 | | | | | | |
| | BP | −0.794713 | $\times 10^{+1}$ | | | | | |
| | CP | 0.654541 | | | | | | |
| | DP | −0.138730 | | | | | | |
| 5 | | ∞ | | | Y | 25.000 | θ | 62.56° |
| | | | | | Z | 27.921 | | |
| 6 | | 54.928 | (GRIN) | 5.000 | | 1.49216 | | 57.5 |
| | | | | | | $N_{1d}$ −0.1005 × 10⁻³ | | |
| | | | | | | $N_{1F}$ −0.1068 × 10⁻³ | | |
| | | | | | | $N_{1C}$ −0.9399 × 10⁻⁴ | | |
| | | | | | Y | 21.500 | θ | 62.56° |
| | | | | | Z | 35.222 | | |
| 7 | | 84.049 | | | | | | |
| 8 | | ∞ (display surface) | | | Y | 28.637 | θ | 46.89° |
| | | | | | Z | 39.508 | | |

EXAMPLE 13

| Surface No. | | Radius of curvature | Surface separation | | Refractive index (Eccentricity) | | Abbe's No. (Tilt angle) |
|---|---|---|---|---|---|---|---|
| 1 | | ∞ (pupil) | | | | | |
| 2 | $R_y$ | −209.268 | | | 1.49216 | | 57.5 |
| | $R_x$ | −95.115 | | Y | 18.335 | θ | 12.00° |
| | $K_y$ | 0.000000 | | Z | 27.921 | | |
| | $K_x$ | 0.000000 | | | | | |
| | AR | 0.783868× 10⁻⁶ | | | | | |
| | BR | 0.299472×10⁻¹² | | | | | |
| | CR | 0.152974×10⁻¹³ | | | | | |
| | DR | −0.502892×10⁻¹⁶ | | | | | |
| | AP | −0.449899 | | | | | |
| | BP | −0.794713× 10⁺¹ | | | | | |
| | CP | 0.654541 | | | | | |
| | DP | −0.138730 | | | | | |
| 3 | $R_y$ | −67.801 | | | 1.49216 | | 57.5 |
| | $R_x$ | −58.220 | | Y | −9.356 | θ | −27.44° |
| | $K_y$ | 0.000000 | | Z | 38.348 | | |
| | $K_x$ | 0.000000 | | | | | |
| | AR | 0.427047× 10⁻⁶ | | | | | |
| | BR | −0.770285×10⁻¹⁰ | | | | | |
| | CR | 0.407932×10⁻²¹ | | | | | |
| | DR | 0.105909×10⁻¹⁶ | | | | | |
| | AP | 0.107024 | | | | | |
| | BP | 0.496744 | | | | | |
| | CP | 0.119380× 10⁺³ | | | | | |
| | DP | −0.923056× 10⁻² | | | | | |

-continued

| Surface No. | Radius of curvature | | Surface separation | Refractive index (Eccentricity) | | Abbe's No. (Tilt angle) |
|---|---|---|---|---|---|---|
| 4 | $R_y$ | −209.268 | | 1.49216 | | 57.5 |
| | $R_x$ | −95.115 | Y | 18.335 | θ | 12.00° |
| | $K_y$ | 0.000000 | Z | 27.921 | | |
| | $K_x$ | 0.000000 | | | | |
| | AR | $0.783868 \times 10^{-6}$ | | | | |
| | BR | $0.299472 \times 10^{-12}$ | | | | |
| | CR | $0.152974 \times 10^{-13}$ | | | | |
| | DR | $0.502892 \times 10^{-16}$ | | | | |
| | AP | −0.449899 | | | | |
| | BP | $-0.794713 \times 10^{+1}$ | | | | |
| | CP | 0.654541 | | | | |
| | DP | −0.138730 | | | | |
| 5 | | ∞ | Y | 25.000 | θ | 62.56° |
| | | | Z | 27.921 | | |
| 6 | | −52.463 (GRIN) | 5.000 | 1.49216 | | 57.5 |
| | | | | $N_{1d}\ -0.1005 \times 10^{-3}$ | | |
| | | | | $N_{1F}\ -0.1068 \times 10^{-3}$ | | |
| | | | | $N_{1C}\ -0.9399 \times 10^{-4}$ | | |
| | | | Y | 24.263 | θ | 62.56° |
| | | | Z | 34.395 | | |
| 7 | | −41.145 | | | | |
| 8 | | ∞ (display surface) | Y | 29.137 | θ | 46.89° |
| | | | Z | 39.882 | | |

In the above-described examples, particularly Examples 1 to 7, the values of the focal length f of the entire optical system, the focal length f of the diffraction optical element, $\theta_1$ in the condition (4), $\theta_2$ in the condition (5), d in the condition (6), α in the condition (7) and F in the condition (8) are as follows:

| Example | f of entire optical system | f of diffraction optical element | $\theta_1$ (°) | $\theta_2$ (°) | d (mm) | α (°) | F |
|---|---|---|---|---|---|---|---|
| 1 | 27.715 mm | 244.948 mm | 95.047 | 44.658 | −0.248 | −1.69 | 0.11315 |
| 2 | 27.715 mm | 259.967 mm | 93.263 | 42.891 | −5.867 | 3.89 | 0.10661 |
| 3 | 27.286 mm | 1210.471 mm | 96.631 | 40.897 | −4.410 | −6.26 | 0.02254 |
| 4 | 28.775 mm | 464.779 mm | 94.909 | 45.589 | 0.026 | 1.07 | 0.06191 |
| 5 | 36.201 mm | 43.047 mm | 128.768 | 60.972 | 2.933 | 8.07 | 0.84096 |
| 6 | 27.778 mm | 1014.751 mm | 96.191 | 43.475 | −0.542 | −3.49 | 0.02737 |
| 7 | 38.531 mm | −91.082 mm | 83.442 | 40.511 | −0.037 | 13.23 | −0.42304 |

Although in the above-described examples anamorphic surfaces are used as surfaces that constitute an optical member, it is also possible to use toric surfaces, rotationally symmetric aspherical surfaces, spherical surfaces, or three-dimensional surfaces (free-form surfaces) which are expressed by $$z = \sum_{n=0}^{k} \sum_{m=0}^{k'} c_{nm} x^n y^{n-m}$$

where x, y and z denote orthogonal coordinates, $c_{nm}$ is an arbitrary coefficient, and k and k' are also arbitrary values, respectively.

Further, conditions for the curvature, power, etc. of a surface can also be obtained from a curvature in an arbitrary region which is obtained from a surface configuration of a portion of the surface which is struck by axial light rays traveling on the visual axis to reach the image display device, along the axial light rays.

If a system is arranged by using a pair of optical systems according to each example, it is possible to project a pair of images into both eyes of the observer.

Figure 14:
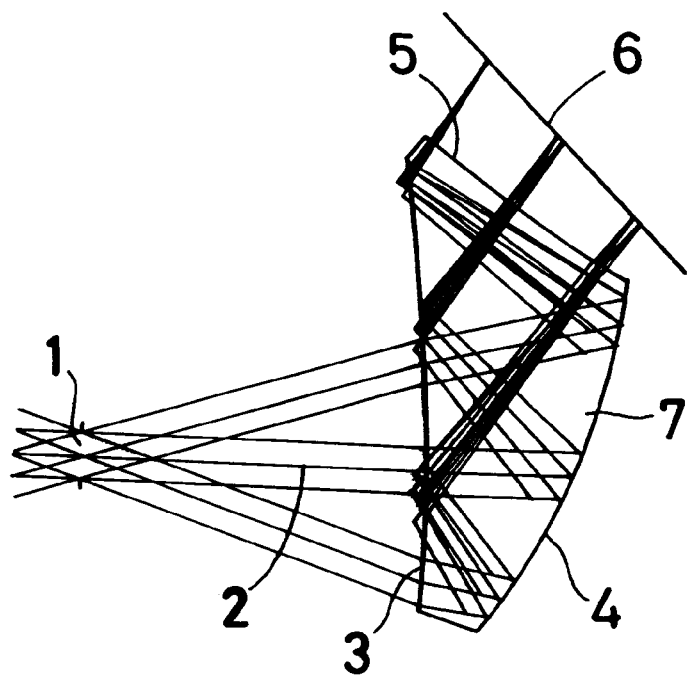
FIG. 14 is a sectional view of one example of an optical member to which the present invention can be applied.
Figure 15:
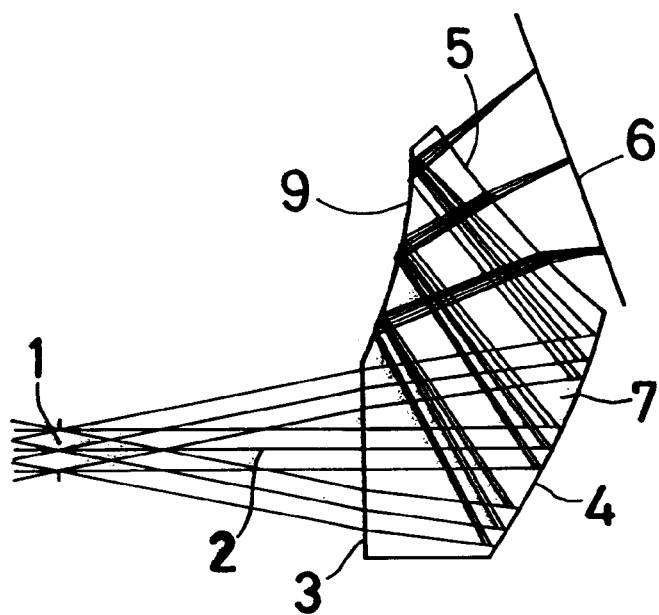
FIG. 15 is a sectional view of another example of an optical member to which the present invention can be applied.

Although the above-described Examples 1 to 4, 6, and 7 to 13 basically use the optical member 7 shown in FIG. 14, it should be noted that optical members 7 such as those shown in FIGS. 15 to 20 may also be used in combination with a diffraction optical element. In the case of FIG. 15, the optical member 7 has a first surface 3, a second surface 4, a third surface 5, and a fourth surface 9. A bundle of light rays emitted from the image display device 6 enters the optical member 7 while being refracted by the third surface 5. The incident ray bundle is internally reflected by the fourth surface 9 and then internally reflected by the second surface 4 so as to be incident on the first surface 3. The ray bundle is refracted by the first surface 3 and projected into the observer's eyeball with the observer's iris position or eyeball rolling center as the exit pupil 1.

Figure 16:
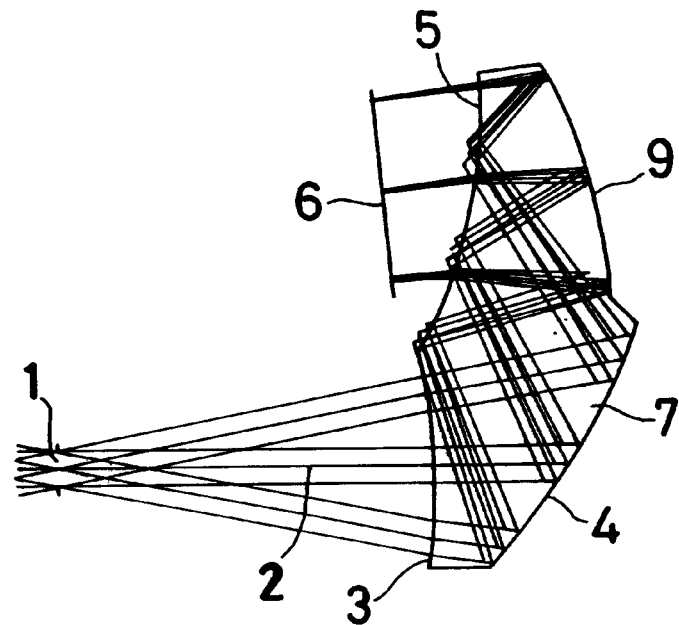
FIG. 16 is a sectional view of still another example of an optical member to which the present invention can be applied.

In the case of FIG. 16, the optical member 7 has a first surface 3, a second surface 4, a third surface 5, and a fourth surface 9. A bundle of light rays emitted from the image display device 6 enters the optical member 7 while being refracted by the third surface 5. The incident ray bundle is internally reflected by the fourth surface 9 so as to be incident on the third surface 5. This time, the ray bundle is internally reflected by the third surface 5. Then, the ray bundle is internally reflected by the second surface 4 so as to be incident on the first surface 3. The ray bundle is refracted by the first surface 3 and projected into the observer's eyeball with the observer's iris position or eyeball rolling center as the exit pupil 1.

Figure 17:
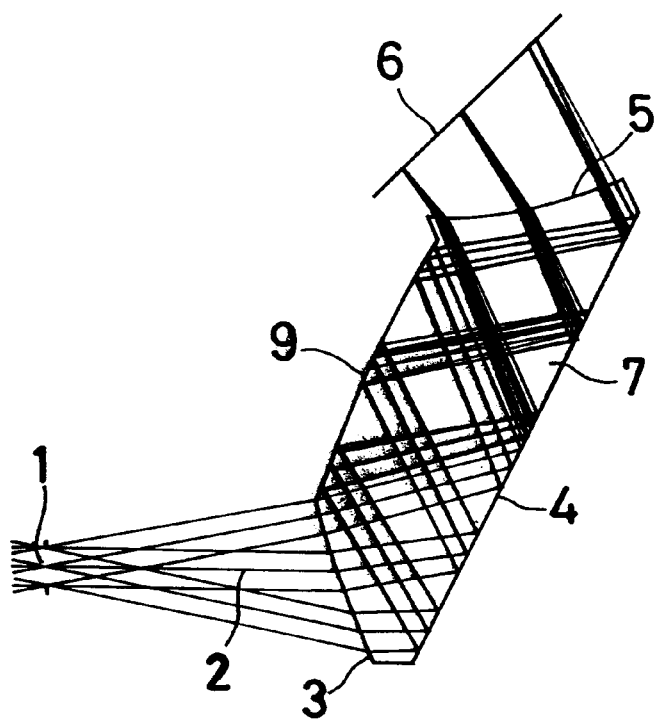
FIG. 17 is a sectional view of a further example of an optical member to which the present invention can be applied.

In the case of FIG. 17, the optical member 7 has a first surface 3, a second surface 4, a third surface 5, and a fourth surface 9. A bundle of light rays emitted from the image display device 6 enters the optical member 7 while being refracted by the third surface 5. The incident ray bundle is internally reflected by the second surface 4 and then internally reflected by the fourth surface 9 so as to be incident on the second surface 4 again. The ray bundle is internally reflected by the second surface 4 so as to be incident on the first surface 3. The ray bundle is refracted by the first surface 3 and projected into the observer's eyeball with the observer's iris position or eyeball rolling center as the exit pupil 1.

Figure 18:
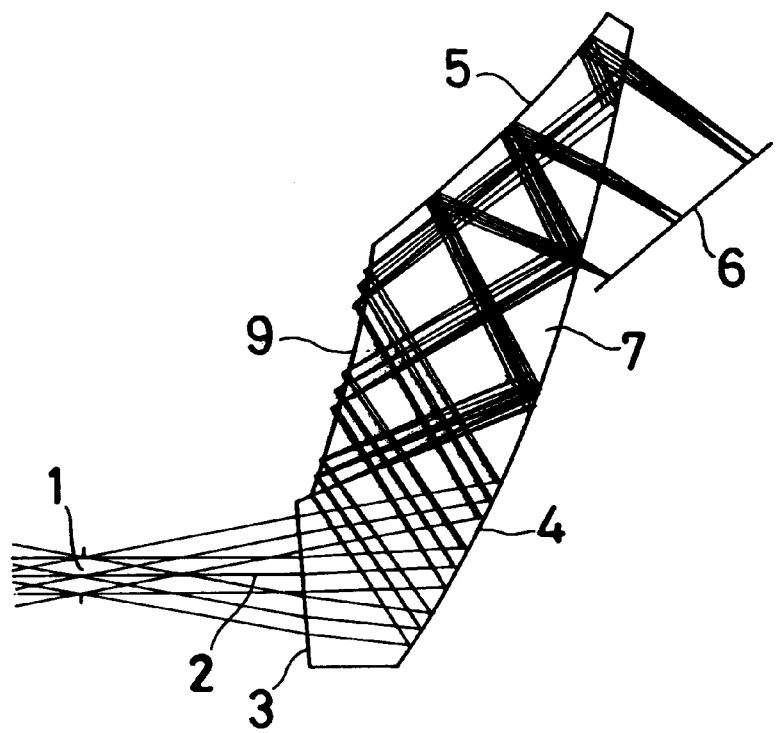
FIG. 18 is a sectional view of a still further example of an optical member to which the present invention can be applied.

In the case of FIG. 18, the optical member 7 has a first surface 3, a second surface 4, a third surface 5, and a fourth surface 9. A bundle of light rays emitted from the image display device 6 enters the optical member 7 while being refracted by the second surface 4. The incident ray bundle is internally reflected by the third surface 5 and then internally reflected by the second surface 4. The reflected ray bundle is then internally reflected by the fourth surface 9 so as to be incident on the second surface 4 again. The ray bundle is internally reflected by the second surface 4 so as to be incident on the first surface 3. The ray bundle is refracted by the first surface 3 and projected into the observer's eyeball with the observer's iris position or eyeball rolling center as the exit pupil 1.

Figure 19:
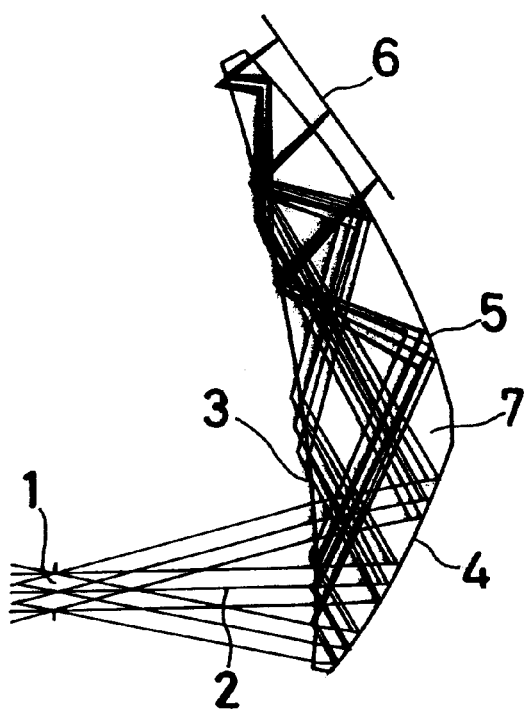
FIG. 19 is a sectional view of a still further example of an optical member to which the present invention can be applied.

In the case of FIG. 19, the optical member 7 is similar to that in Example 5. A bundle of light rays emitted from the image display device 6 enters the optical member 7 while being refracted by the third surface 5. The incident ray bundle is internally reflected by the first surface 3 so as to be incident on the third surface 5 again. This time, the ray bundle is internally reflected by the third surface 5 and then internally reflected by the first surface 3. The reflected ray bundle is reflected by the second surface 4 so as to be incident on the first surface 3 once again. The ray bundle is refracted by the first surface 3 and projected into the observer's eyeball with the observer's iris position or eyeball rolling center as the exit pupil 1.

Figure 20:
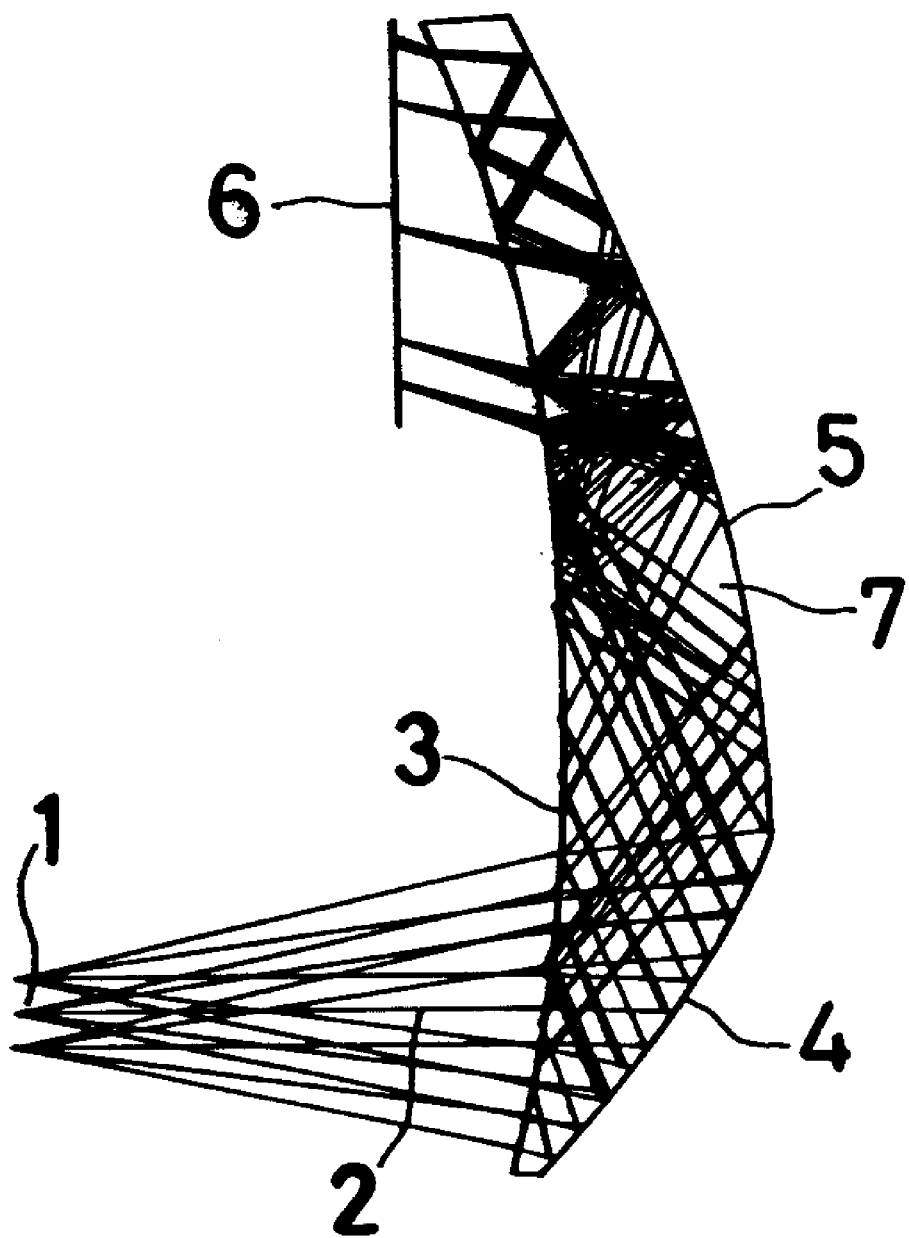
FIG. 20 is a sectional view of a still further example of an optical member to which the present invention can be applied.

In the case of FIG. 20, a bundle of light rays emitted from the image display device 6 enters the optical member 7 while being refracted by the first surface 3. The incident ray bundle is internally reflected by the third surface 5 so as to be incident on the first surface 3 again. This time, the ray bundle is internally reflected by the first surface 3 and then internally reflected by the third surface 5 again so as to be incident on the first surface 3 once again. The ray bundle is internally reflected by the first surface 3 and then reflected by the second surface 4 so as to be incident on the first surface 3 once again. The ray bundle is refracted by the first surface 3 and projected into the observer's eyeball with the observer's iris position or eyeball rolling center as the exit pupil 1.

Thus, in the optical system according to the present invention, a DOE or a GRIN is used to correct chromatic aberration, field curvature and other aberrations remaining uncorrected in a single decentered prism which has three or four optical surfaces and in which a space formed between these optical surfaces is filled with a medium having a refractive index larger than 1. When the optical system is used as an ocular optical system, the arrangement is not necessarily limited to one that is designed for a single eye. It is also possible to use a pair of optical systems arranged according to the present invention. If a pair of optical systems are used to enable observation with both eyes, it is possible for the observer to see the observation image without fatigue. Further, if images with a disparity therebetween are presented to both eyes, it is possible to view the observation image as a stereoscopic image. If a pair of ocular optical systems according to the present invention are used in combination with a mechanism for supporting them on the observer's head, it becomes possible for the observer to see the observation image in his/her own easy posture.

Incidentally, the problem of flare or ghost light is associated with an image display apparatus that uses an ocular optical system 10 comprising, for example, a decentered prism which has two to four optical surfaces and in which a space formed by the optical surfaces is filled with a medium having a refractive index larger than 1, as described above. More specifically, light from the image display device 6 which does not participate in display may enter the observer's eyeball directly or by being irregularly reflected, thus forming flare light or ghost light. Further, external light may enter the observer's eyeball by being reflected by some surface of the ocular optical system 10, thus forming flare light or ghost light. Such flare or ghost light causes the displayed image quality to be degraded. This will be briefly explained below by taking the optical system shown in FIG. 14 as an example.

Figure 44B:
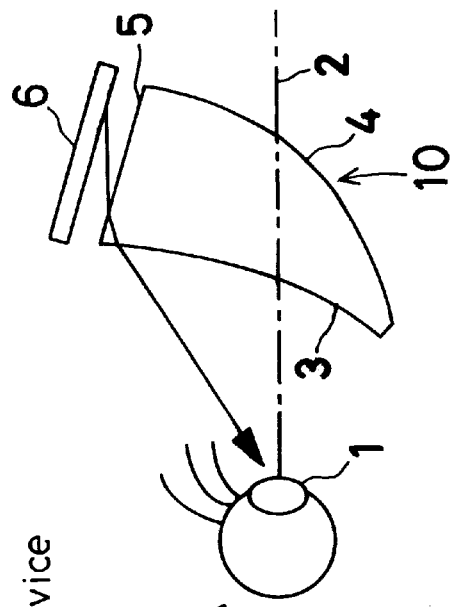
FIGS. 44(a), 44(b), 44(c) and 44(d) are views for explanation of optical paths of display light and flare light in one image display apparatus.
Figure 44A:
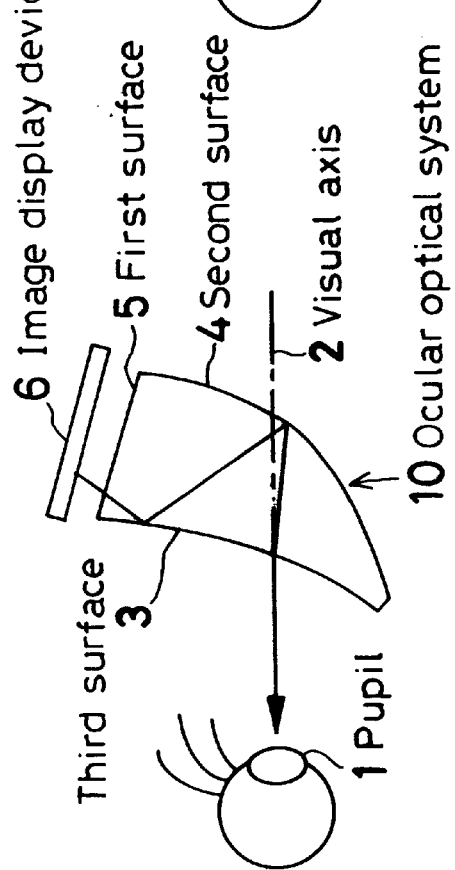
Figure 44D:
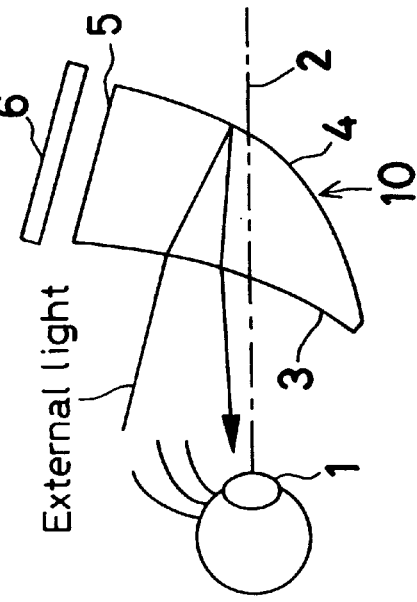
Figure 44C:
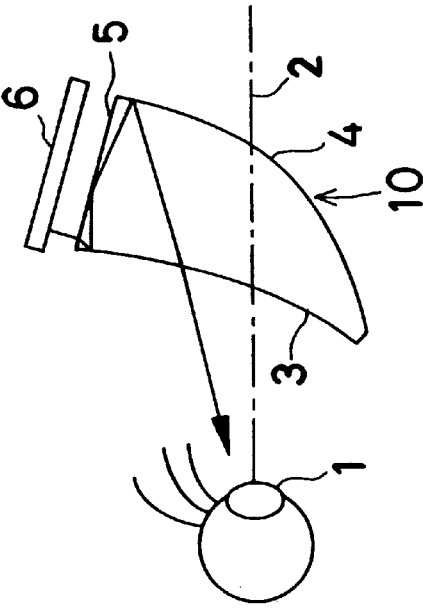

FIG. 44(a) shows an optical path of normal display light. In the case of the ocular optical system 10 shown in FIG. 14, display light from the image display device 6, e.g. an LCD (Liquid Crystal Display), enters the ocular optical system 10 through the first surface 5 and is totally reflected by the fourth surface, which is formed by the third surface 3 serving as both transmitting and reflecting surfaces. The reflected light is then reflected by the second surface 4 and exits from the ocular optical system 10 through the third surface 3 to enter the observer's pupil 1, thereby allowing an image displayed by the image display device 6 to be viewed as an enlarged image. FIG. 44(b) shows an optical path of a first type of ghost light. A part of light from the image display device 6 enters the pupil 1 directly through the first surface 5 and fourth surface (third surface 3) of the ocular optical system 10 as ghost light, thus undesirably forming a ghost or other unwanted image outside the display area. FIG. 44(c) shows an optical path of a second type of ghost light. A part of light from the image display device 6 enters the ocular optical system 10 through the first surface 5 and is reflected by the fourth surface (third surface 3) so as to return to the first surface 5. The reflected light is reflected at the back of the first surface 5 and then enters the pupil 1 via the second surface 4 sand the third surface 3 as ghost light, as shown in the figure, thus similarly forming a ghost or other unwanted image outside the display area. FIG. 44(d) shows an optical path of a third type of ghost light. In this case, external light from the outside world is reflected by some surface (the second surface 4 in the case of the illustrated example) constituting the ocular optical system 10 so as to enter the pupil 1 as flare or ghost light, causing the displayed image quality to be degraded.

FIGS. 24(a) to 24(d) are views for explanation of optical paths in an image display apparatus according to Example 14 of the present invention, which correspond to FIGS. 44(a) to 44(d). That is, FIG. 24(a) shows an optical path of normal display light, and FIGS. 24(b), 24(c) and 24(d) show optical paths of the first, second and third types of ghost light, respectively. Although the ocular optical system 10 shown in FIG. 14 is used in this example, the same is true of the ocular optical systems 10 shown in FIGS. 15 to 20. In this example, a light-blocking plate 31 of light absorption properties, which is provided with a horizontally elongate rectangular aperture 32, is disposed between the ocular optical system 10 and the observer's pupil 1, thereby preventing flare or ghost light from entering the pupil 1.

More specifically, in the case of normal display light in FIG. 24(a), display light from the image display device 6, e.g. an LCD, enters the ocular optical system 10 through the first surface 5 and is totally reflected by the fourth surface, which is formed by the third surface 3 serving as both transmitting and reflecting surfaces. Then, the reflected light is reflected by the second surface 4 and exits from the ocular optical system 10 through the third surface 3 to enter the observer's pupil 1 through the aperture 32 without being blocked by the light-blocking plate 31, thus enabling an image displayed by the image display device 6 to be viewed as an enlarged image. In the case of the first type of ghost light shown in FIG. 24(b), light from the image display device 6 passes directly through the first surface 5 and fourth surface (third surface 3) of the ocular optical system 10, but it is prevented from entering the pupil 1 by the light-blocking plate 31 because the angle of incidence on the pupil 1 is larger than the field angle of the display area. Accordingly, no ghost light is introduced. In the case of the second type of ghost light shown in FIG. 24(c), light from the image display device 6 enters the ocular optical system 10 through the first surface 5 to reach the fourth surface (the third surface 3). The light is reflected by the fourth surface to return to the first surface 5 and then reflected at the back of the first surface 5 so as to exit from the ocular optical system 10 via the second surface 4 and the third surface 3, as shown in the figure. In this case also, the light is prevented from entering the pupil 1 by the light-blocking plate 31 because the angle of incidence on the pupil 1 is larger than the field angle of the display area. Accordingly, no ghost light is introduced. The third type of ghost light shown in FIG. 24(d) is external light from the outside world. Such external light is blocked by the light-blocking plate 31 of light absorption properties and cannot enter the ocular optical system 10. Therefore, no external light is reflected by any surface of the ocular optical system 10. Accordingly, neither flare nor ghost light is produced.

Thus, by disposing the light-blocking plate 31 having the aperture 32 between the ocular optical system 10 and the observer's pupil 1, it is possible to block flare and ghost light without intercepting display light from the image display device 6, and hence possible to effectively prevent degradation of the displayed image quality due to flare or ghost light based on light from the image display device 6 and light from the outside world.

Figure 25:
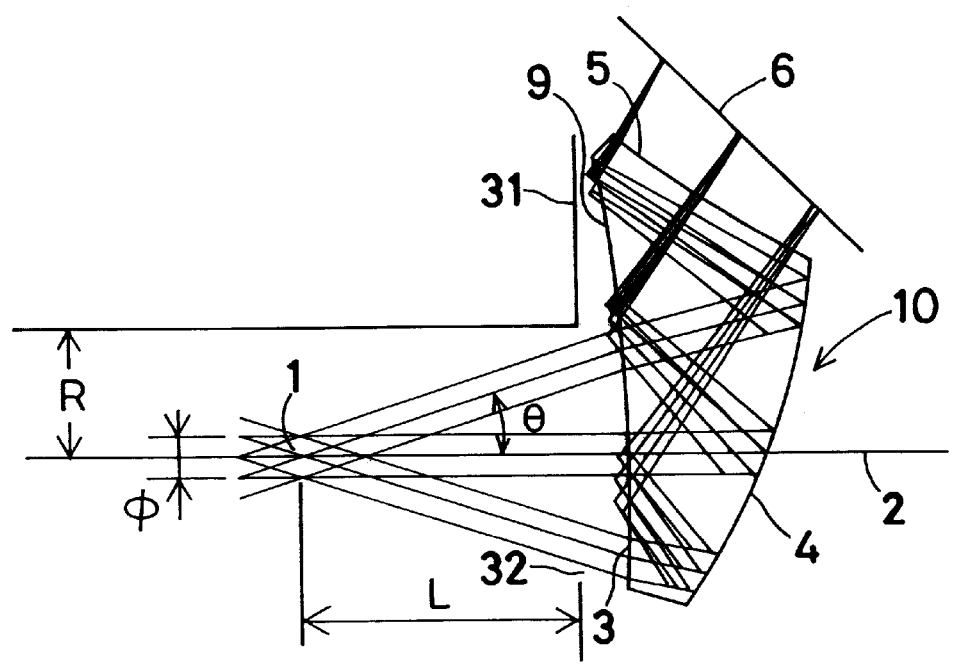
FIG. 25 is a view for examination of the size of an aperture in a light-blocking plate.

Let us discuss the size of the aperture 32 in the light-blocking plate 31 that enables flare and ghost light to be effectively blocked. With a view to effectively blocking the three types of flare and ghost light, shown in FIGS. 44(a) to 44(d) without eclipsing normal display light, it is desirable to satisfy the following condition:

$$L\tan\theta + \phi/2 \leq R \leq 2 (L\tan\theta + \phi/2) \qquad (22)$$

where, as shown in FIG. 25, R is the distance from the edge of the aperture 32 in the light-blocking plate 31 to the visual axis 2 in a section containing the center of the image display device 6 and the visual axis 2, $\phi$ is the diameter of the exit pupil of the ocular optical system 10, L is the eye relief of the ocular optical system 10, and $\theta$ is the half view angle in the section containing the center of the image display device 6 and the visual axis 2.

It is more desirable to satisfy the following condition:

$$L\tan\theta + \phi/2 \leq R \leq 1.2 (L\tan\theta + \phi/2) \qquad (22')$$

FIGS. 26 to 37 each show the way in which the same light-blocking plate 31 is disposed in another type of ocular optical system 10 and the observer's pupil 1. Ocular optical systems 10 shown in FIGS. 28 to 31 correspond to the optical systems shown in FIGS. 15 to 18; therefore, description thereof is omitted. The operation of the light-blocking plate 31 will, however, be clear from the foregoing description. Let us give a brief explanation of ocular optical systems 10 shown in FIGS. 26, 27 and 32 to 37. In these ocular optical systems 10, the operation of the light-blocking plate 31 will be clear from the foregoing description.

Figure 26:
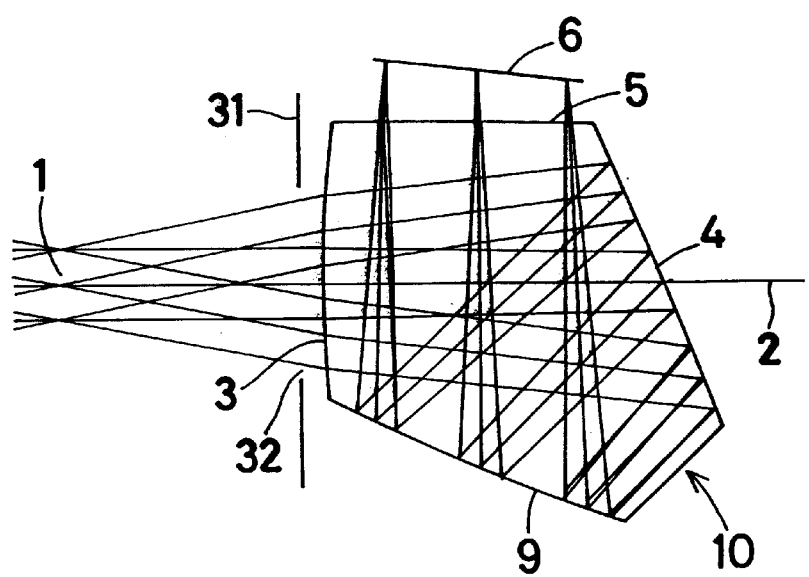
FIG. 26 shows the way in which the light-blocking plate is disposed in another image display apparatus.

The ocular optical system 10 shown in FIG. 26 is a decentered prism which has four optical surfaces 3, 4, 5 and 9 and in which a space formed between these optical surfaces is filled with a medium having a refractive index larger than 1. Display light from the image display device 6 enters the ocular optical system 10 through the first surface 5, which is a transmitting surface disposed to face the image display device 6. The incident light is reflected by the fourth surface 9, which is a decentered reflecting surface. The reflected light is reflected by the second surface 4, which is a decentered reflecting surface disposed on the observer's visual axis 2 to face the observer's pupil 1. The reflected light intersects the light incident on the fourth surface 9 and exits from the ocular optical system 10 through the third surface 3, which is a transmitting surface disposed on the observer's visual axis 2 between the second surface 4 and the observer's pupil 1. Then, the light travels along the observer's visual axis 2, enters the observer's pupil 1 without forming an intermediate image, and forms an image on the observer's retina.

Figure 27:
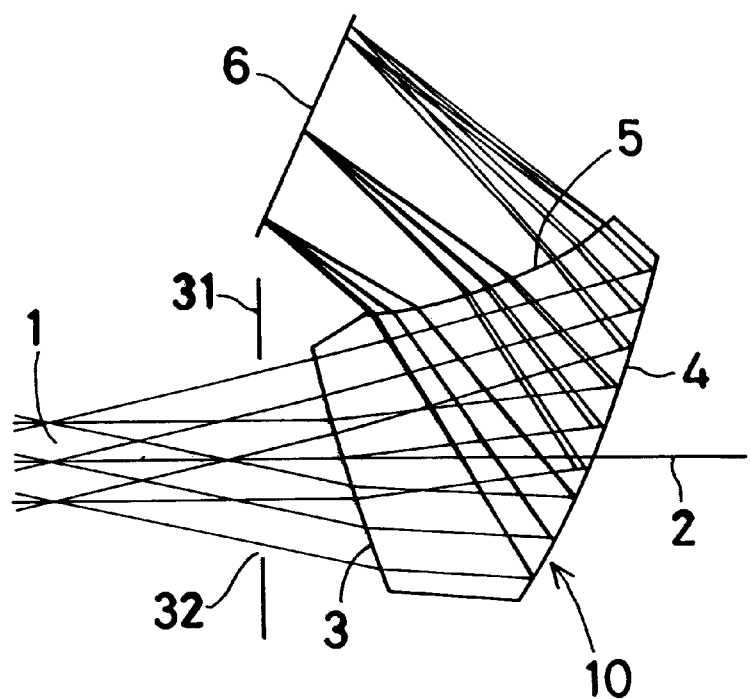
FIG. 27 shows the way in which the light-blocking plate is disposed in still another image display apparatus.
Figure 28:
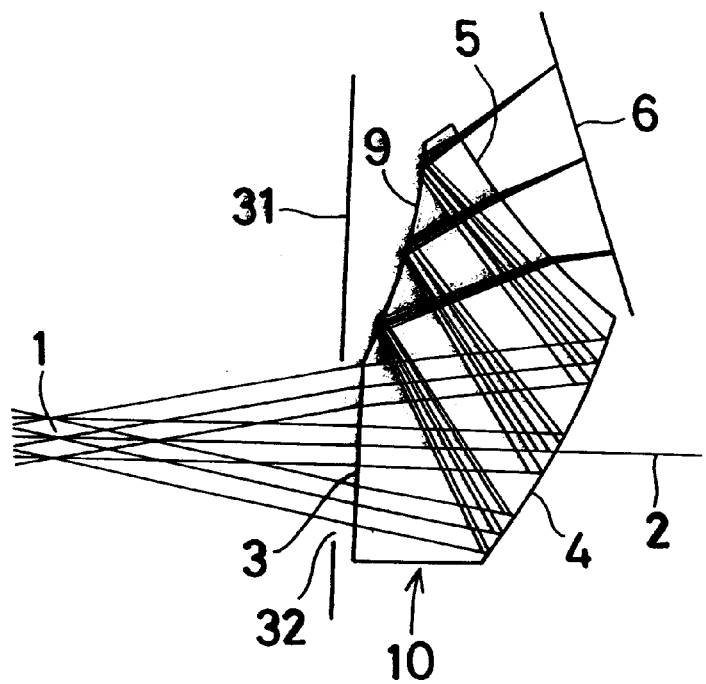
FIG. 28 shows the way in which the light-blocking plate is disposed in a further image display apparatus.
Figure 29:
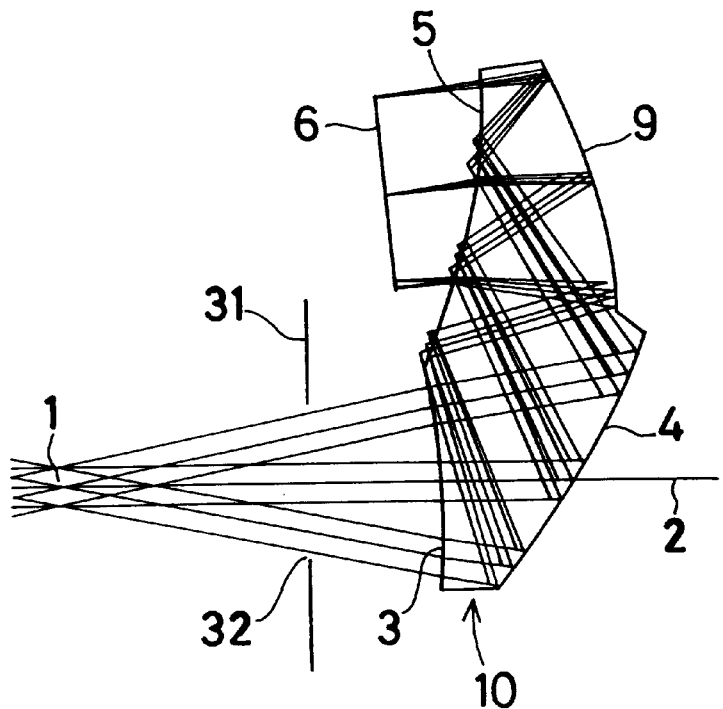
FIG. 29 shows the way in which the light-blocking plate is disposed in a still further image display apparatus.
Figure 30:
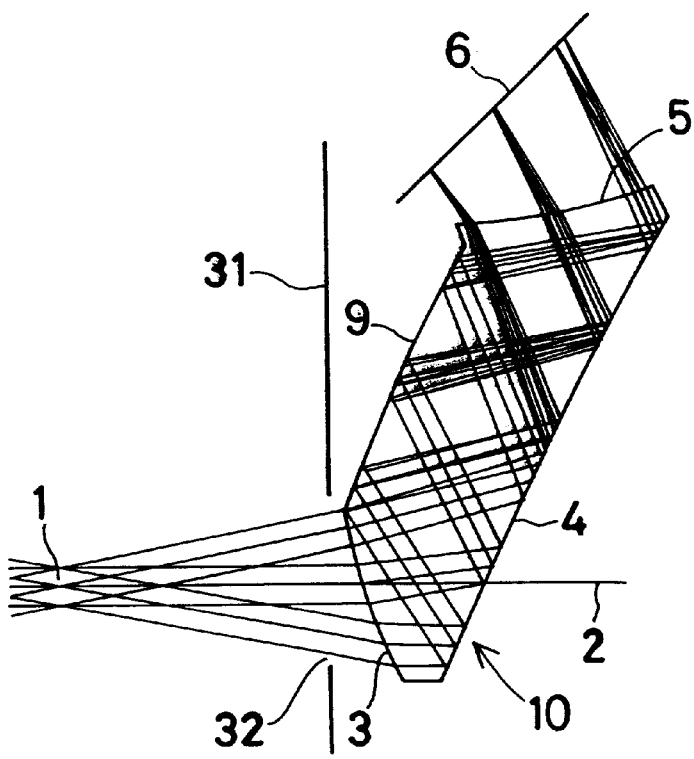
FIG. 30 shows the way in which the light-blocking plate is disposed in a still further image display apparatus.
Figure 31:
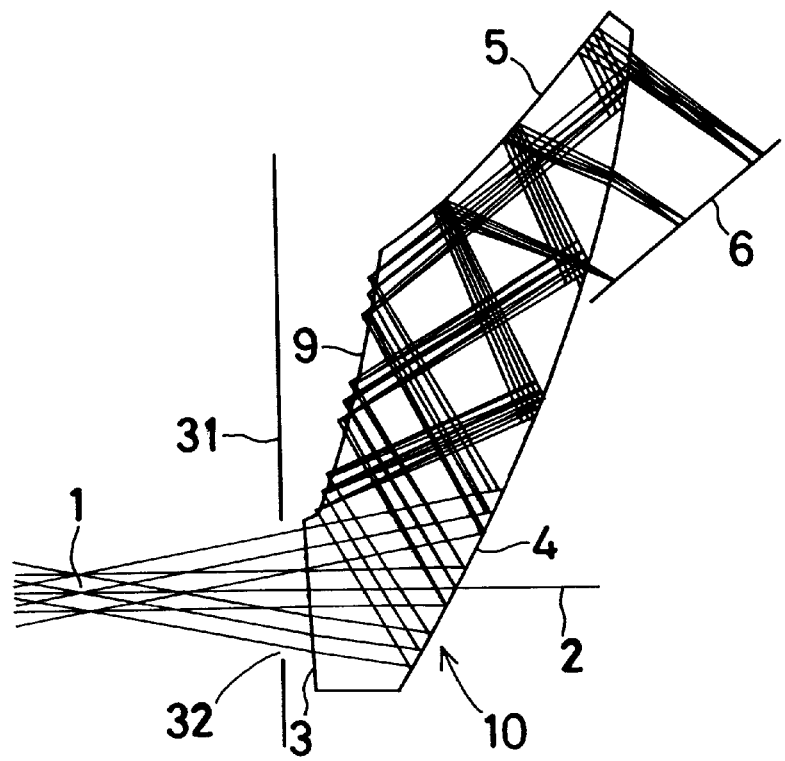
FIG. 31 shows the way in which the light-blocking plate is disposed in a still further image display apparatus.

The ocular optical system 10 shown in FIG. 27 is a decentered prism which has three optical surfaces 3 to 5 and in which a space formed between these optical surfaces is filled with a medium having a refractive index larger than 1. Display light from the image display device 6 enters the ocular optical system 10 through the first surface 5, which is a transmitting surface disposed to face the image display device 6. The incident light is reflected by the second surface 4, which is a decentered reflecting surface. The reflected light exits from the ocular optical system 10 through the third surface 3, which is a transmitting surface disposed on the observer's visual axis 2 between the second surface 4 and the observer's pupil 1. Then, the light travels along the observer's visual axis 2, enters the observer's pupil 1 without forming an intermediate image, and forms an image on the observer's retina.

Figure 32:
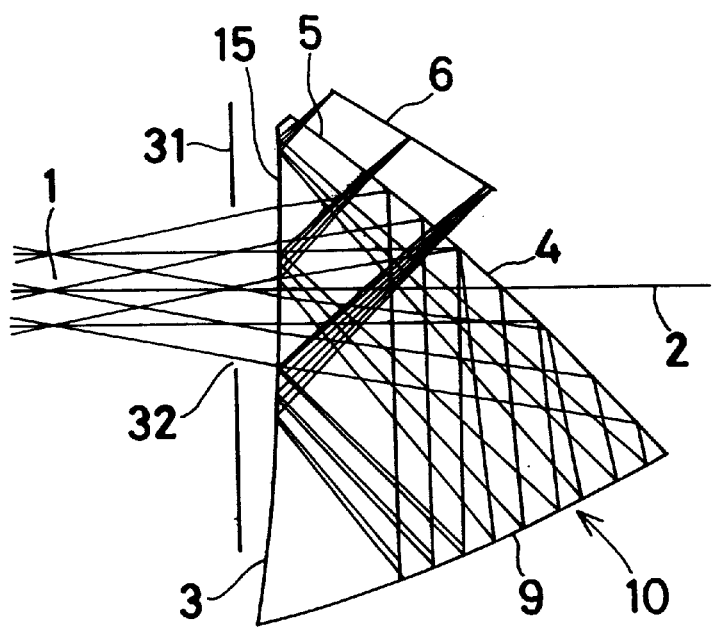
FIG. 32 shows the way in which the light-blocking plate is disposed in a still further image display apparatus.

The ocular optical system 10 shown in FIG. 32 is a decentered prism which has three optical surfaces 3, 4 and 9 and in which a space formed between these optical surfaces is filled with a medium having a refractive index larger than 1. Display light from the image display device 6 enters the ocular optical system 10 through the first surface 5, which is a transmitting surface disposed to face the image display device 6. The first surface 5 is formed by the second surface 4, which serves as both reflecting and transmitting surfaces. The second surface 4 is a decentered surface disposed on the observer's visual axis 2 to face the observer's pupil 1. The incident light is reflected by the fifth surface 15, which is a reflecting surface formed by the third surface 3 serving as both transmitting and reflecting surfaces. The third surface 3 is disposed on the observer's visual axis 2 between the second surface 4 and the observer's pupil 1. The reflected light is reflected by the fourth surface 9, which is a reflecting surface. The reflected light is reflected by the second surface 4, which is a decentered reflecting surface disposed on the observer's visual axis 2 to face the observer's pupil 1. The reflected light intersects the light reflected by the fifth surface 15 and exits from the ocular optical system 10 through the third surface 3, which is a transmitting surface disposed on the observer's visual axis 2 between the second surface 4 and the observer's pupil 1. Then, the light travels along the observer's visual axis 2, enters the observer's pupil 1 without forming an intermediate image, and forms an image on the observer's retina.

Figure 33:
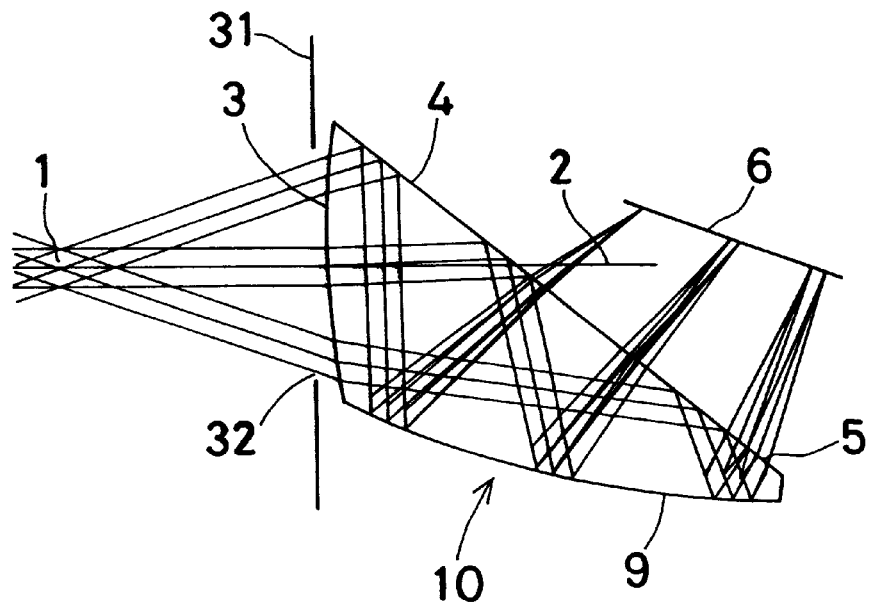
FIG. 33 shows the way in which the light-blocking plate is disposed in a still further image display apparatus.

The ocular optical system 10 shown in FIG. 33 is a decentered prism which has three optical surfaces 3, 4 and 9 and in which a space formed between these optical surfaces is filled with a medium having a refractive index larger than 1. Display light from the image display device 6 enters the ocular optical system 10 through the first surface 5, which is a transmitting surface disposed to face the image display device 6. The first surface 5 is formed by the second surface 4, which serves as both reflecting and transmitting surfaces. The second surface 4 is a decentered surface disposed on the observer's visual axis 2 to face the observer's pupil 1. The incident light is reflected by the fourth surface 9, which is a reflecting surface. The reflected light is reflected by the second surface 4, which is a decentered reflecting surface disposed on the observer's visual axis 2 to face the observer's pupil 1. The reflected light exits from the ocular optical system 10 through the third surface 3, which is a transmitting surface disposed on the observer's visual axis 2 between the second surface 4 and the observer's pupil 1. Then, the light travels along the observer's visual axis 2, enters the observer's pupil 1 without forming an intermediate image, and forms an image on the observer's retina.

Figure 34:
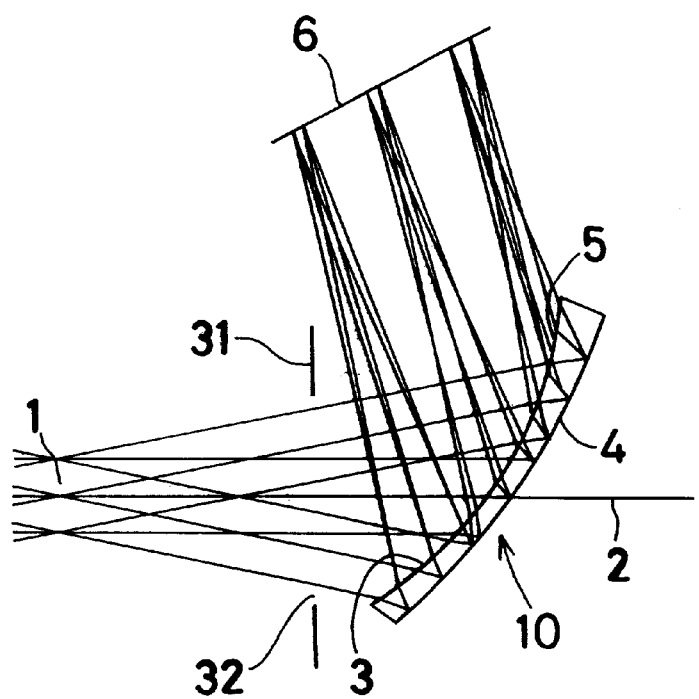
FIG. 34 shows the way in which the light-blocking plate is disposed in a still further image display apparatus.

The ocular optical system 10 shown in FIG. 34 is a decentered back-coated mirror which has two optical surfaces 4 and 5 and in which a space formed between these optical surfaces is filled with a medium having a refractive index larger than 1. Display light from the image display device 6 enters the ocular optical system 10 through the first surface 5, which is a transmitting surface disposed to face the image display device 6. The incident light is reflected by the second surface 4, which is a decentered reflecting surface disposed on the observer's visual axis 2 to face the observer's pupil 1. The reflected light exits from the ocular optical system 10 through the third surface 3, which is a transmitting surface disposed on the observer's visual axis 2 between the second surface 4 and the observer's pupil 1. The third surface 3 is formed by the first surface 5, which serves as two transmitting surfaces. Then, the light travels along the observer's visual axis 2, enters the observer's pupil 1 without forming an intermediate image, and forms an image on the observer's retina.

Figure 35:
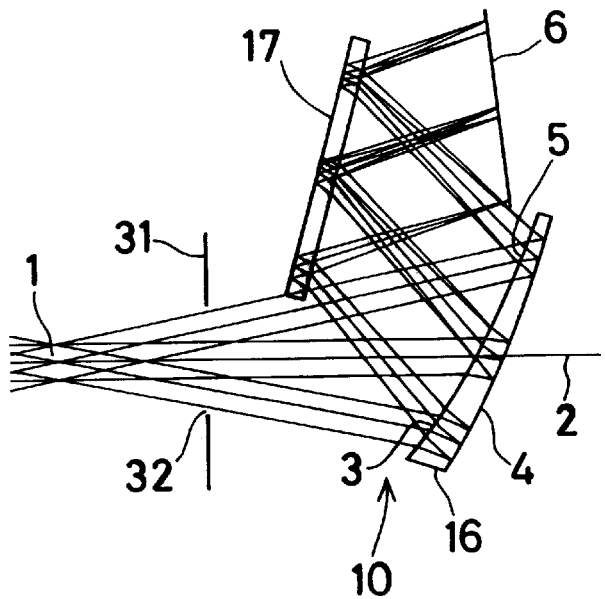
FIG. 35 shows the way in which the light-blocking plate is disposed in a still further image display apparatus.

The ocular optical system 10 shown in FIG. 35 has a decentered back-coated mirror 16, and either another back-coated mirror or surface-coated mirror 17 which is disposed at the entrance side of the back-coated mirror 16. Display light from the image display device 6 enters the decentered back-coated mirror 16 after being reflected by the back-coated mirror or surface-coated mirror 17 disposed to face the image display device 6. The display light enters the back-coated mirror 16 through the first surface 5, which is a transmitting surface, and is reflected by the second surface 4, which is a decentered reflecting surface disposed on the observer's visual axis 2 to face the observer's pupil 1. The reflected light exits from the ocular optical system 10 through the third surface 3, which is a transmitting surface disposed on the observer's visual axis 2 between the second surface 4 and the observer's pupil 1. The third surface 3 is formed by the first surface 5, which serves as two transmitting surfaces. Then, the light travels along the observer's visual axis 2, enters the observer's pupil 1 without forming an intermediate image, and forms an image on the observer's retina.

Figure 36:
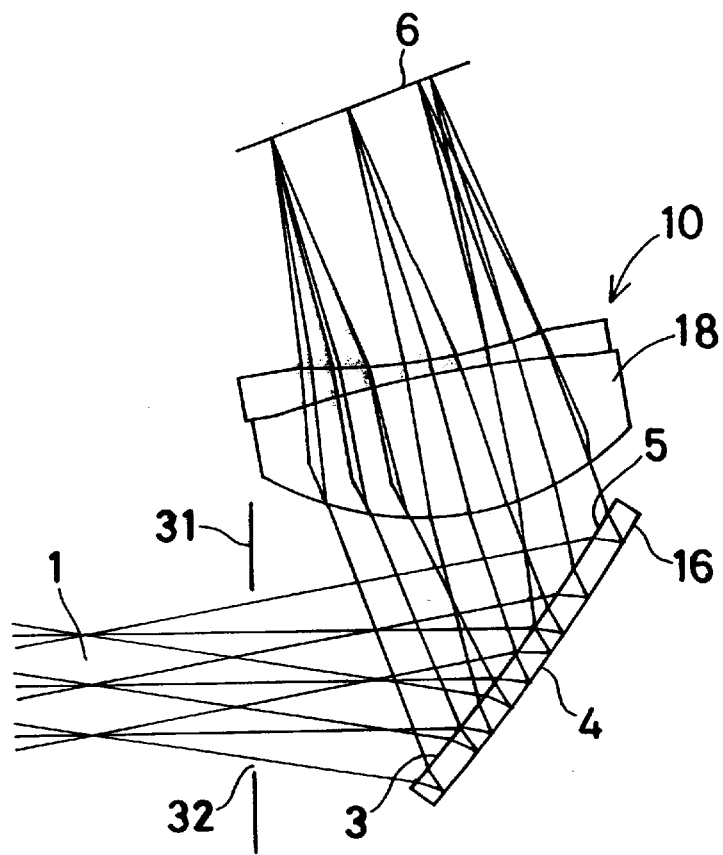
FIG. 36 shows the way in which the light-blocking plate is disposed in a still further image display apparatus.

The ocular optical system 10 shown in FIG. 36 has a ecentered back-coated mirror 16, and a refracting lens system 18 which is disposed at the entrance side of the back-coated mirror 16. Display light from the image display device 6 enters the decentered back-coated mirror 16 through the refracting lens system 18, which is disposed to face the image display device 6. The display light enters the back-coated mirror 16 through the first surface 5, which is a transmitting surface, and is reflected by the second surface 4, which is a decentered reflecting surface disposed on the observer's visual axis 2 to face the observer's pupil 1. The reflected light exits from the ocular optical system 10 through the third surface 3, which is a transmitting surface disposed on the observer's visual axis 2 between the second surface 4 and the observer's pupil 1. The third surface 3 is formed by the first surface 5, which serves as two transmitting surfaces. Then, the light travels along the observer's visual axis 2, enters the observer's pupil 1 without forming an intermediate image, and forms an image on the observer's retina.

Figure 37:
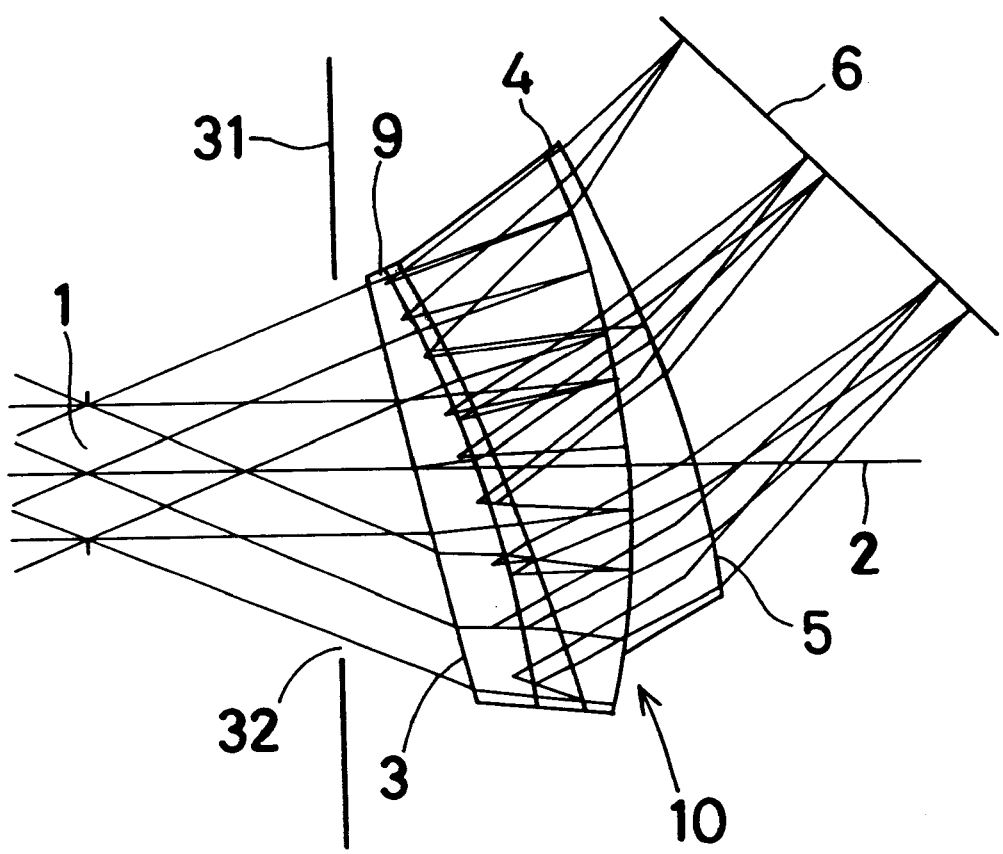
FIG. 37 shows the way in which the light-blocking plate is disposed in a still further image display apparatus.
Figure 38B:
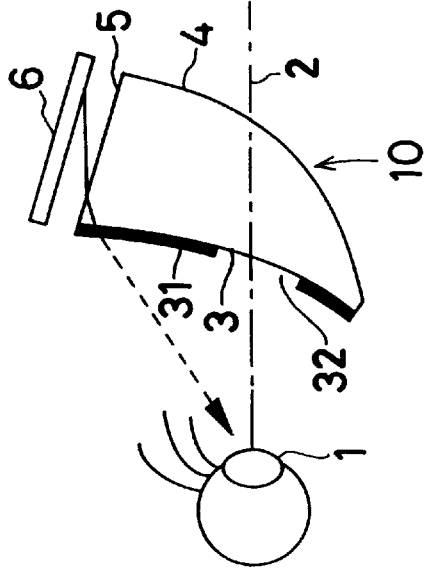
FIGS. 38(a), 38(b), 38(c) and 38(d) are views for explanation of optical paths in an image display apparatus according to a modification of Example 14.
Figure 38D:
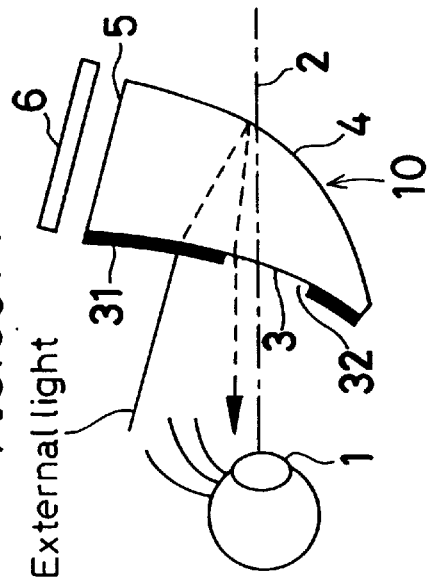
Figure 38A:
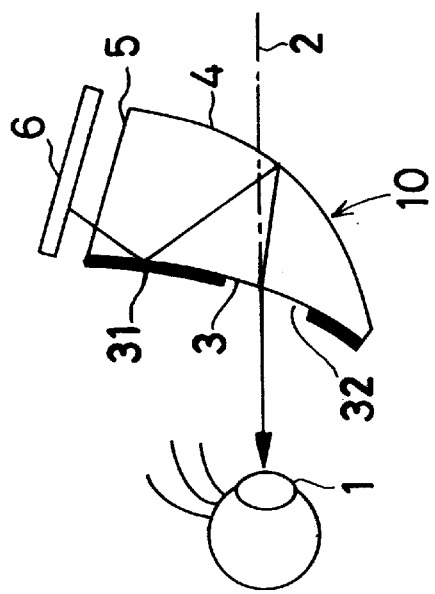
Figure 38C:
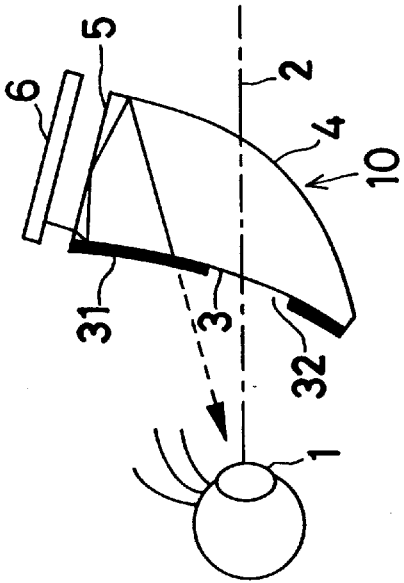

The ocular optical system 10 shown in FIG. 37 is a decentered compound lens which has two optical surfaces 4 and 5 and in which a space formed between these optical surfaces is filled with a medium having a refractive index larger than 1. Display light from the image display device 6 enters the ocular optical system 10 through the first surface 5, which is a transmitting surface disposed to face the image display device 6. The incident light passes through the second surface 4, which is a semitransparent surface, and is then reflected by the fourth surface 9, which is a semitransparent surface. The reflected light is reflected by the second surface 4, which is a decentered semitransparent surface disposed on the observer's visual axis 2 to face the observer's pupil 1. The reflected light exits from the ocular optical system 10 through the third surface 3, which is a transmitting surface disposed on the observer's visual axis 2 between the second surface 4 and the observer's pupil 1. Then, the light travels along the observer's visual axis 2, enters the observer's pupil 1 without forming an intermediate image, and forms an image on the observer's retina.

It should be noted that the above-described first to sixth surfaces may be formed from plane surfaces, spherical surfaces, aspherical surfaces, anamorphic surfaces, or anamorphic aspherical surfaces. At least one of the surfaces has positive power. Reflection at a surface which serves as both transmitting and reflecting surfaces, e.g. a surface constituting both the third and fourth surfaces in FIG. 14, may be total reflection, or effected by a back-coated mirror in a case where transmitting and reflecting regions are separated from each other.

It should be noted that the light-blocking plate 31 may be provided in close contact with the pupil-side surface of the ocular optical system 10 by coating or other similar method. FIGS. 38(a) to 38(d) are views corresponding to FIGS. 24(a) to 24(d). In these figures, the light-blocking plate 31 having the aperture 32 is so shaped as to conform to the pupil-side surface (i.e. the third surface 3 in these figures) of the ocular optical system 10 and stuck fast to that surface. Operations taking place in FIGS. 38(a) to 38(d) are the same as those in FIGS. 24(a) to 24(d); therefore, description thereof is omitted. The same is true of the ocular optical systems 10 shown in FIGS. 26 to 37. However, if the light-blocking plate 31 is placed in close contact with a surface of the ocular optical system 10 in a case where total reflection at that surface is used, the conditions for the total reflection at the surface are destroyed by the close contact of the light-blocking plate 31. Therefore, it is necessary to provide reflective coating on that surface and to bring the light-blocking plate 31 into close contact with the coating.

Figure 39:
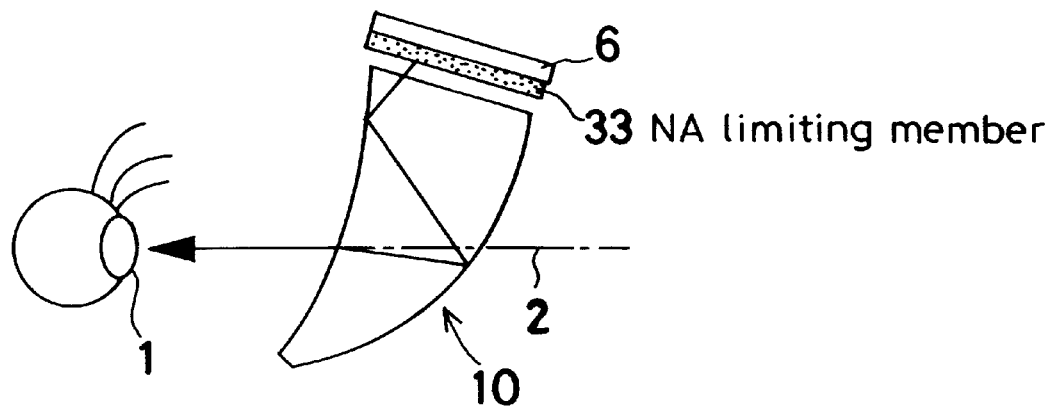
FIG. 39 is a view for explanation of an optical path in an image display apparatus according to a further example.
Figure 41:
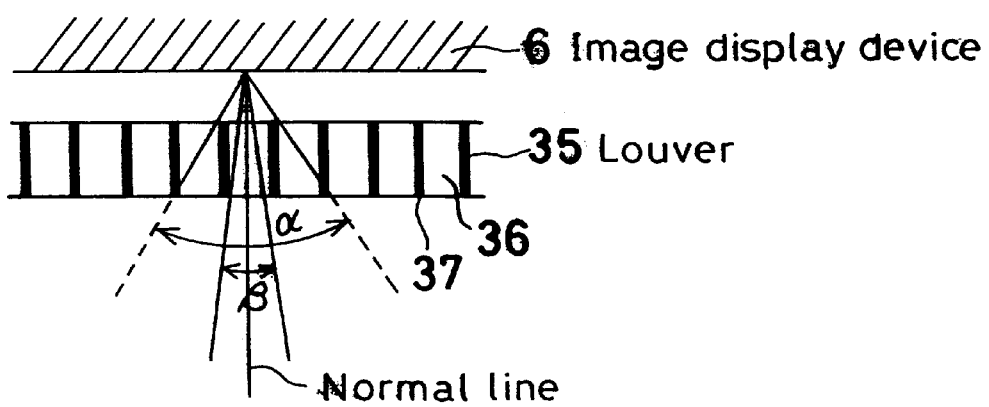
FIG. 41 is a view for explanation of the structure and operation of a louver.

Incidentally, ghost light, particularly one such as that shown in FIG. 44(b), occurs because the angle of divergence of display light from the image display device 6 (i.e. NA: numerical aperture) is excessively large. Assuming that the focal length of the ocular optical system 10 is, for example, 30 mm, and the diameter of the observer's pupil 1, that is, the exit pupil diameter of the ocular optical system 10, is 4 mm, and that the ocular optical system 10 is approximately telecentric on the image display device side, the angle of divergence of necessary light rays, which enter the observer's pupil 1, is 3.8° according to a general formula for NA. In other words, among light rays emitted from the image display device 6, those which are at 3.8° or more with respect to the normal to the image display device 6 have no effect on the image for observation and; rather, they are unwanted light rays and may cause flare or ghost. Accordingly, flare light and ghost light can also be reduced by limiting the NA of display light emitted from the image display device 6. To limit the NA of display light, as shown in FIG. 39, an NA limiting member 33, e.g. a louver, is disposed between the image display device 6 and the ocular optical system 10. A louver is a preferred example of the NA limiting member 33. As shown in the sectional view of FIG. 41, a louver 35 comprises light-transmitting openings 36 and light-blocking (light-absorbing) walls 37, which are alternately arranged in a one- or two-dimensional periodic pattern. The louver 35 selectively transmits only light in the range of a narrow angle $\beta$ in a specific direction. Accordingly, when the louver 35 is disposed between the image display device 6 and the ocular optical system 10, display light emitted from the image display device 6 at a wide divergence angle $\alpha$ is limited to the narrow angle $\beta$. Thus, light emitted from the image display device 6 at a large exit angle, which may cause ghost light, is cut off. Another example of the NA limiting member 33 is an optical fiber plate. The operation of the optical fiber plate is the same as that of the louver 35. It is also possible to use a field selecting glass as the NA limiting member 33. One example of field selecting glass is known as "Angle 21" (trade name; manufactured by Nippon Sheet Glass Co., Ltd.), which transmits light entering it at a small incident angle, but scatters light incident thereon at a large angle, thereby preventing it from passing therethrough.

It is desirable for the NA limiting member 33 to limit the NA such that the angle $\theta$ between the normal to the image display device 6 and a light ray extending at the largest divergence angle on the observer's pupil side satisfies the following condition:

$$\theta < 45° \quad (23)$$

It is more desirable to satisfy the following condition:

$$\theta < 20° \quad (23')$$

Figure 40:
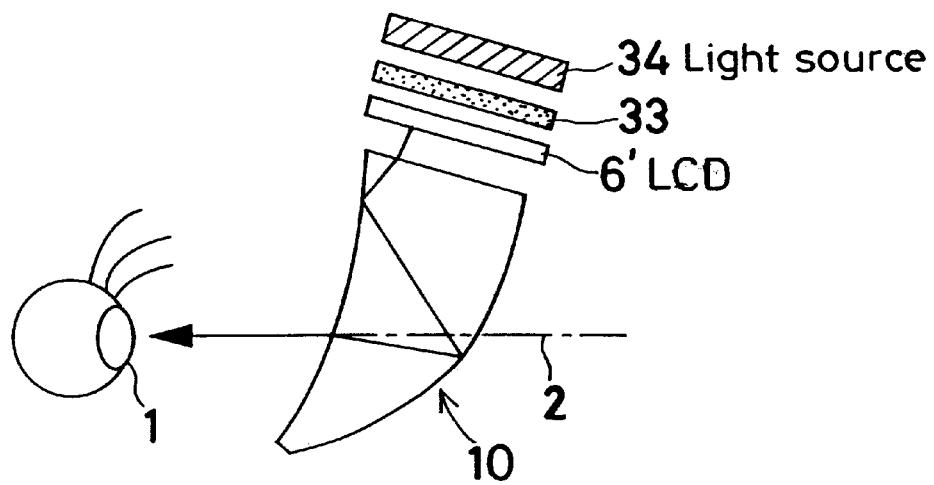
FIG. 40 is a view for explanation of an optical path in an image display apparatus according to a still further example.

FIG. 40 shows another arrangement for limiting the NA of display light emitted from the image display device 6. As shown in the figure, when an LCD 6' is used as the image display device 6, an NA limiting member 33 such as that described above is disposed between the LCD 6' and an illuminating light source 34 therefor. In this case also, display light from the image display device 6 is limited to a narrow angle, and there is no light emanating from the image display device 6 at a large exit angle at which ghost light may be produced.

Figure 43A:
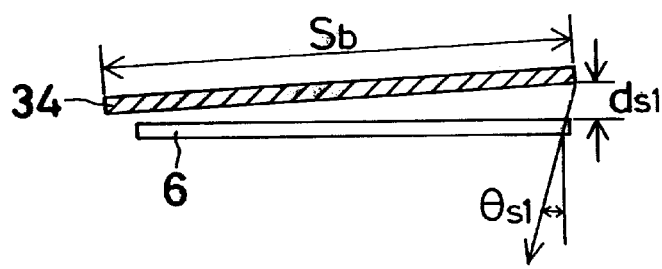
FIGS. 43(a) and 43(b) are views for explanation of the operation of an image display apparatus according to a still further example.
Figure 43B:
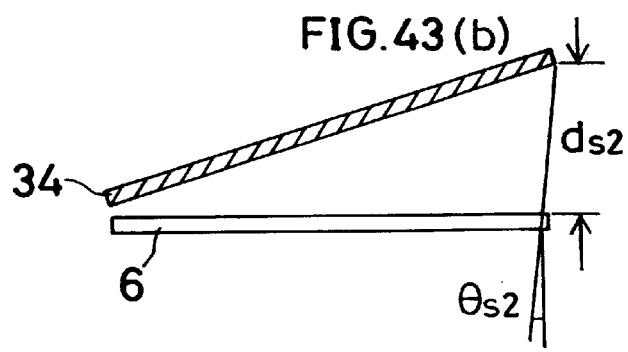

It should be noted that, in the arrangements shown in FIGS. 39 and 40, the angle range of a bundle of transmitted light rays limited by the NA limiting member 33 need not always be symmetric with respect to the normal to the image display device 6 or 6'. There are cases where it is preferable to limit the NA of a ray bundle more at a side opposite to the observer [see FIGS. 43(a) and 43(b)]. In such a case, the principal ray of the transmitted ray bundle shifts from the normal to the image display device 6 or 6'.

When the LCD 6' is used as the image display device 6 in any of the ocular optical systems 10 shown in FIGS. 25 to 37, it is possible to limit the NA of display light entering the ocular optical system 10 so as to prevent occurrence of flare or ghost light by properly selecting the relative position of the LCD 6' and the illuminating light source 34. This scheme will be explained below.

Figure 42A:
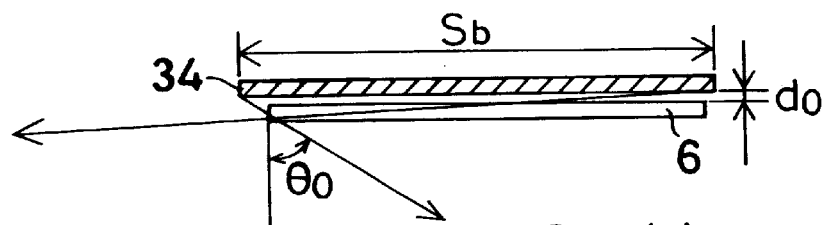
FIGS. 42(a), 42(b) and 42(c) are views for explanation of the operation of an image display apparatus according to a still further example.
Figure 42B:
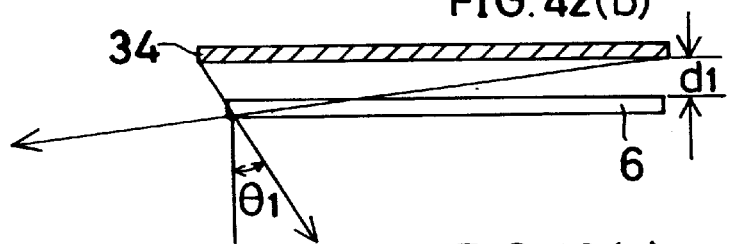
Figure 42C:
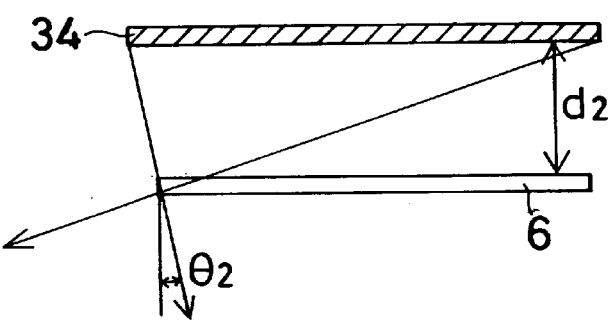

As shown in FIGS. 42(*a*) to 42(*c*), the distance between the display surface of the image display device 6 and the illuminating light source 34 is defined as d, and the angle between the normal to the image display device 6 and an imaginary straight line connecting an end point on the light-emitting surface of the illuminating light source 34 and the corresponding end point on the display surface is defined as θ. As the illuminating light source 34 is moved away from the image display device 6 such that the distance d changes to be $d_0<d_1<d_2$ [FIGS. 42(*a*)→42(*b*)→42(*c*)], the incident angle θ of light rays from the illuminating light source 34 at the edge of the image display area changes to be $\theta_0>\theta_1>\theta_2$. That is, as the distance d between the display surface of the image display device 6 and the illuminating light source 34 increases ($d_0 \to d_1 \to d_2$), the incident angle θ of light rays from the illuminating light source 34 at the edge of the image display area decreases ($\theta_0 \to \theta_1 \to \theta_2$).

Accordingly, it is desirable that the distance d between the display surface of the image display device 6 and the illuminating light source 34 should satisfy the following condition:

$$Sb > d > 1 \text{ mm} \quad (24)$$

where Sb is the length of the illuminating light source 34.

By setting the distance between the display surface of the image display device 6 and the illuminating light source 34 at 1 mm or more, the incident angle of light rays from the illuminating light source 34 at the edge of the image display area, that is, the incident angle at which the light rays enter the ocular optical system 10, becomes satisfactorily small, as shown in FIGS. 42(*a*) to 42(*c*). Thus, it is possible to reduce unwanted light which causes flare or ghost.

It will be apparent that the above-described purpose can be attained by combining the following conditions. That is, it is preferable to satisfy the following condition:

$$Sb > d > 2 \text{ mm} \quad (24')$$

If the distance d between the display surface of the image display device 6 and the illuminating light source 34 is 2 mm or more, the incident angle θ of light rays from the illuminating light source 34 at the edge of the image display area becomes smaller, and unwanted light can be further reduced.

It is more desirable to satisfy the following condition:

$$Sb > d > 3 \text{ mm} \quad (24'')$$

If the condition (24") is satisfied, the incident angle θ of light rays from the illuminating light source 34 at the edge of the image display area becomes further smaller, and unwanted light can be reduced even more effectively. However, because the quantity of light from the illuminating light source 34 reduces, it is preferable to determine an optimum value by trial and error.

Ghost light such as that shown in FIG. 44(*b*) is caused by light rays of large NA emanating from a position on the display surface of the image display device 6 which is more away from the position of the observer's pupil 1.

Incidentally, assuming that, as shown in FIGS. 43(*a*) and 43(*b*), the distance between one end of the illuminating light source 34 and the corresponding end of the image display device 6 is $d_s$, if the illuminating light source 34 is tilted such that $d_{s1}<d_{s2}$ as shown in FIGS. 43(*a*)→43(*b*), the incident angle of light rays from the illuminating light source 34 at the edge of the image display area is $\theta_{s1}>\theta_{s2}$. In other words, as the distance d between the illuminating light source 34 and the image display device 6 increases ($d_{s1} \to d_{s2}$), the incidence angle θ of light rays from the illuminating light source 34 at the edge of the image display area decreases ($\theta_{s1} \to \theta_s$). Accordingly, it is desirable to tilt the illuminating light source 34 and the image display device 6 relative to each other such that the illuminating light source 34 and the image display device 6 diverge from each other at ends thereof which are remote from the observer's pupil 1, and that the tilt angle satisfies the following condition:

$$Sb > d_s > 1 \text{ mm} \quad (25)$$

where $d_s$ is the distance between the illuminating light source 34 and the display surface of the image display device 6 at their respective ends where the illuminating light source 34 and the image display device 6 diverge from each other.

By tilting the illuminating light source 34 and the image display device 6 relative to each other such that the illuminating light source 34 and the image display device 6 diverge from each other at ends thereof which are remote from the observer's eyeball, and that the tilt angle satisfies the condition (25), the inclination angle $\theta_s$ of light rays emanating from the edge of the image display area is reduced, as shown in FIG. 43(*b*). Thus, it is possible to reduce unwanted light such as that shown in FIG. 44(*b*).

It is more desirable to satisfy the following condition:

$$Sb > d_s > 2 \text{ mm} \quad (25')$$

By tilting the illuminating light source 34 and the image display device 6 relative to each other such that the distance between the illuminating light source 34 and the display surface of the image display device 6 at the diverging ends is 2 mm or more, the inclination angle $\theta_s$ of light rays emanating from the edge of the image display area is further reduced, and unwanted light can be further reduced.

It is still more desirable to satisfy the following condition:

$$Sb > d_s > 3 \text{ mm} \quad (25'')$$

By tilting the illuminating light source 34 and the image display device 6 relative to each other such that the distance between the illuminating light source 34 and the display surface of the image display device 6 at the diverging ends is 3 mm or more, the inclination angle $\theta_s$ of light rays emanating from the edge of the image display area is still further reduced, and unwanted light can be reduced very effectively.

Figure 45:
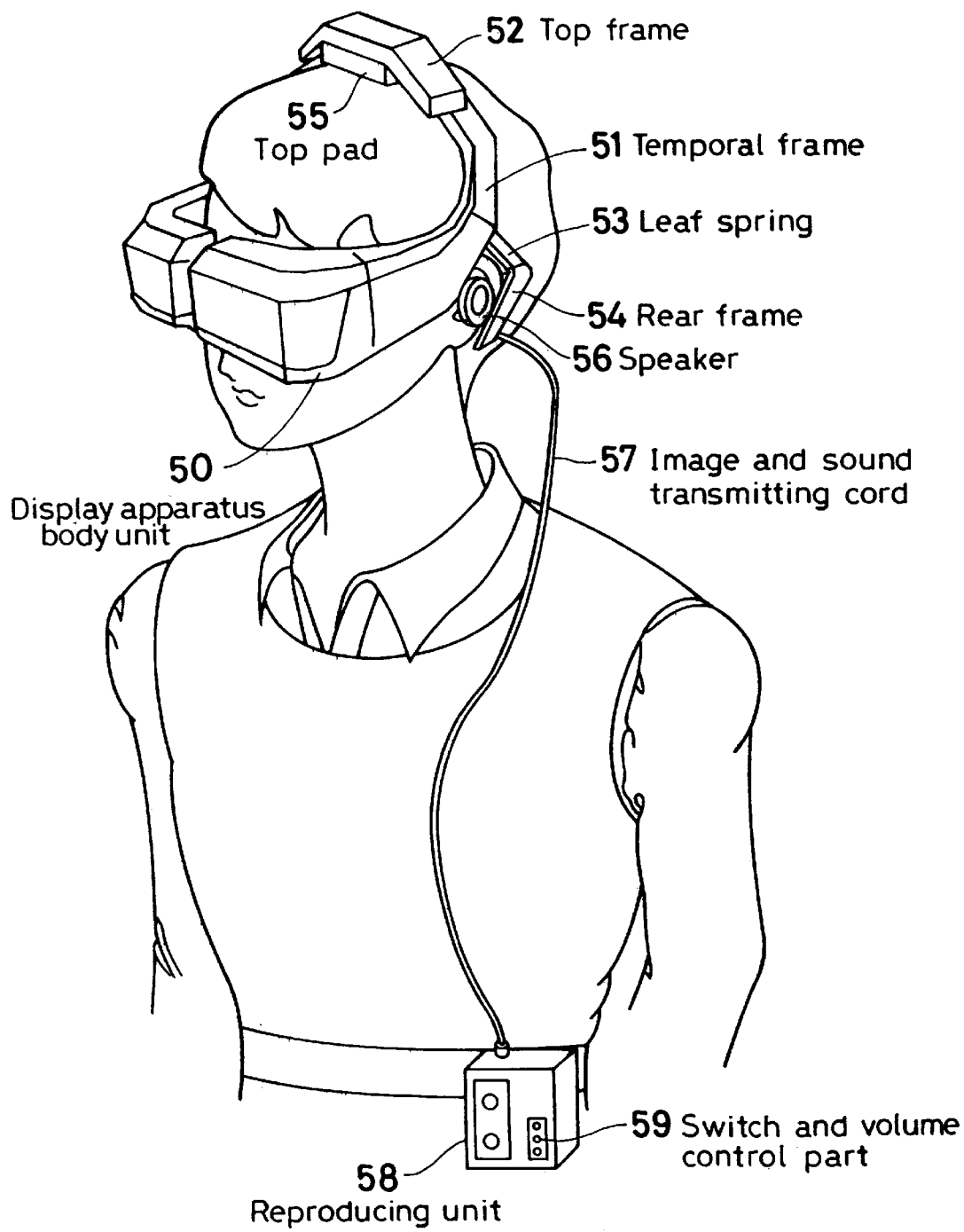
FIG. 45 shows the whole arrangement of one example of a head-mounted image display apparatus which uses an optical system according to the present invention.

It is possible to form a portable image display apparatus, such as a stationary or head-mounted image display apparatus, which enables the observer to see with both eyes by preparing a pair of combinations of an optical system according to the present invention, used as an ocular optical system, and an image display device for the left and right eyes, and supporting them apart from each other by the distance between the eyes. FIG. 45 shows the whole arrangement of an example of such a portable image display apparatus. A display apparatus body unit 50 contains a pair of left and right ocular optical systems such as those described above, and image display devices comprising liquid crystal display devices are disposed at the respective image planes of the two ocular optical systems. The apparatus body unit 50 is provided with a pair of left and right temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50 having the speakers 56 is connected with a reproducing unit 58, e.g. a portable video cassette unit, through an image and sound transmitting cord 57. Therefore, the user can enjoy not only observing an image but also listening to sound with the reproducing unit 58 retained on a desired position, e.g. a belt, as illustrated in the figure. Reference numeral 59 in the figure denotes a switch and volume control part of the reproducing unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display apparatus may be arranged to receive external radio signals through an antenna connected thereto.

Further, the optical system according to the present invention can be used as an imaging optical system. For example, as shown in the perspective view of FIG. 46, the optical system may be used in a finder optical system $F_i$ of a compact camera $C_a$ in which a photographic optical system $O_b$ and the finder optical system $F_i$ are provided separately in parallel to each other. FIG. 47 shows the arrangement of an optical system in a case where the present invention is used as such an imaging optical system. As illustrated, the optical system DS according to the present invention is disposed behind a front lens group GF and an aperture diaphragm D, thereby constituting an objective optical system $L_r$. An image that is formed by the objective optical system $L_t$ is erected by a Porro prism P, in which there are four reflections, provided at the observer side of the objective optical system $L_r$, thereby enabling an erect image to be observed through an ocular lens $O_c$.

Although the optical system according to the present invention, together with the image display apparatus using the optical system as an ocular optical system, has been described above by way of examples, it should be noted that the present invention is not necessarily limited to these examples, and that various modifications may be imparted thereto.

As will be clear from the foregoing description, the optical system according to the present invention makes it possible to provide an imaging optical system which is compact and lightweight and favorably corrected for aberrations, and an optical system suitable for use as an ocular optical system for a head- or face-mounted image display apparatus.

Further, the image display apparatus according to the present invention is arranged such that chromatic aberration, field curvature, etc. which are produced by transmitting surfaces of a single decentered prism which has three or four optical surfaces and in which a space formed between these optical surfaces is filled with a medium having a refractive index larger than 1 are corrected by disposing a correction optical element at a position between the image display device and the observer's pupil such that the correction optical member produces aberrations opposite in sign to aberrations produced by the transmitting surfaces of the decentered prism. As the correction optical element, a DOE or a gradient index lens, which are useful for correction of the above-described aberrations, is used, thereby enabling residual aberrations, particularly chromatic aberration, to be satisfactorily corrected even when the pixel density of the image display device increases. Thus, it is possible to obtain a head- or face-mounted image display apparatus which has a compact size and a wide field angle and is capable of displaying a clear image over the entire image field.

What we claim is:

1. An image display apparatus, comprising:

an image display device constructed and arranged to display an image;

an ocular optical system constructed and arranged to lead the image displayed by said image display device to an observer's eyeball without forming an intermediate real image; and a retainer, said retainer retaining both said image display device and said ocular optical system on an observer's head or face, said image display device being a transmission type liquid crystal having an illumination unit at a back of it, said image display apparatus satisfying the following condition:

$$Sb>d>1 \text{ mm} \tag{24}$$

wherein Sb is a length of said illumination unit, and d is a distance between said illumination unit and said image display device.

2. An image display apparatus according to claim 1, which satisfies the following condition:

$$Sb>d>2 \text{ mm}.$$

3. An image display apparatus according to claim 2, which satisfies the following condition:

$$Sb>d>3 \text{ mm}.$$

4. An image display apparatus according to claim 1, wherein said ocular optical system has two to four optical surfaces, and an area surrounded by said optical surfaces is filled with a transparent medium having a refractive index larger than 1, said optical surfaces including a first surface disposed to face said image display device, a second surface disposed on an observer's visual axis to face an observer's pupil, and a third surface disposed on said observer's visual axis between said second surface and said observer's pupil.

5. An image display apparatus according to claim 4, wherein said second surface is a reflecting surface.

6. An image display apparatus according to claim 4, wherein light rays emitted from said image display device enter said ocular optical system through said first surface and are led to said observer's eyeball through said third surface.

7. An image display apparatus according to claim 6, wherein said third surface is identical with said first surface.

8. An image display apparatus according to claim 4, wherein light rays emitted from said image display device enter said ocular optical system through said first surface and are reflected by a fourth surface and said second surface in the mentioned order before being led to said observer's eyeball through said third surface.

9. An image display apparatus according to claim 8, wherein said fourth surface is identical with said third surface.

10. An image display apparatus according to claim 9, wherein the reflection at said fourth surface is total reflection.

11. An image display apparatus according to claim 8, wherein said fourth surface is identical with said first surface.

12. An image display apparatus according to claim 8, wherein said second surface is identical with said first surface.

13. An image display apparatus, comprising:
 an image display device constructed and arranged to display an image;
 an ocular-optical system constructed and arranged to lead the image displayed by said image display device to an observer's eyeball without forming an intermediate real image; and
 a retainer, said retainer retaining both said image display device and said ocular optical system on an observer's head or face,
 said image display device being a transmission type liquid crystal display device having an illumination unit at a back of it, said illumination unit and said image display device being tilted relative to each other such that said illumination unit and said image display device diverge from each other at ends thereof which are remote from said observer's eyeball.

14. An image display apparatus according to claim 13, which satisfies the following condition:

$$Sb > d_s > 1 \text{ mm} \quad (25)$$

where Sb is a length of said illumination unit, and $d_s$ is a distance between said illumination unit and said image display device at their respective ends where said illumination unit and said image display device diverge from each other.

15. An image display apparatus according to claim 13, which satisfies the following conditions:

$$Sb > d_s > 2 \text{ mm} \quad (25')$$

where Sb is a length of said illumination unit, and $d_s$ is a distance between said illumination unit and said image display device at their respective ends where said illumination unit and said image display device diverge from each other.

16. An image display apparatus according to claim 13, which satisfies the following conditions:

$$Sb > d_s > 3 \text{ mm} \quad (25'')$$

where Sb is a length of said illumination unit, and $d_s$ is a distance between said illumination unit and said image display device at their respective ends where said illumination unit and said image display device diverge from each other.

* * * * *